(12) United States Patent
Tomioka et al.

(10) Patent No.: US 10,576,695 B2
(45) Date of Patent: Mar. 3, 2020

(54) FIBER-REINFORCED PLASTIC AND METHOD FOR PRODUCING SAME

(71) Applicant: Mitsubishi Chemical Corporation, Chiyoda-ku (JP)

(72) Inventors: Masao Tomioka, Tokyo (JP); Takeshi Ishikawa, Tokyo (JP); Takayuki Kobayashi, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 24 days.

(21) Appl. No.: 15/749,612

(22) PCT Filed: Aug. 4, 2016

(86) PCT No.: PCT/JP2016/072981
§ 371 (c)(1),
(2) Date: Feb. 1, 2018

(87) PCT Pub. No.: WO2017/022835
PCT Pub. Date: Feb. 9, 2017

(65) Prior Publication Data
US 2018/0222128 A1    Aug. 9, 2018

(30) Foreign Application Priority Data

Aug. 4, 2015 (JP) ................................. 2015-154209
Aug. 6, 2015 (JP) ................................. 2015-156292
(Continued)

(51) Int. Cl.
*B29C 70/20* (2006.01)
*B29C 70/54* (2006.01)
(Continued)

(52) U.S. Cl.
CPC .......... *B29C 70/205* (2013.01); *B29C 43/003* (2013.01); *B29C 43/48* (2013.01);
(Continued)

(58) Field of Classification Search
CPC .... B29K 2105/0872; B29K 2105/0881; B29K 2105/06; B29K 2105/0809; B29C 70/14;
(Continued)

(56) References Cited

U.S. PATENT DOCUMENTS

2010/0028593 A1    2/2010  Taketa et al.
2010/0092770 A1    4/2010  Wadahara et al.
(Continued)

FOREIGN PATENT DOCUMENTS

EP    2 127 840 A1    12/2009
EP    2 698 396 A1    2/2014
(Continued)

OTHER PUBLICATIONS

Extended European Search Report dated Nov. 26, 2018 in European Patent Application No. 16833114.8.
(Continued)

*Primary Examiner* — Camie S Thompson
(74) *Attorney, Agent, or Firm* — Oblon, McClelland, Maier & Neustadt, L.L.P.

(57) ABSTRACT

A fiber-reinforced plastic producing method capable of easily producing a fiber-reinforced plastic in which swelling and warpage are less likely to occur and of which excellent mechanical characteristics and isotropy are ensured, and a fiber-reinforced plastic in which swelling and warpage are suppressed from occurring. The fiber-reinforced plastic producing method has a step for obtaining a material (A) including a prepreg base material in which a region (B), where reinforcing fibers pulled and aligned in one direction are impregnated with a matrix resin and a plurality of cuts
(Continued)

(b) are formed, and a region (C), where a plurality of cuts (c) are formed, are alternately formed in a direction orthogonal to a fiber axis of the reinforcing fiber, a step for hot-pressing the material (A) while moving the material (A) under specific conditions, and a step for cooling the pressed material (A) to obtain the fiber-reinforced plastic.

18 Claims, 7 Drawing Sheets

(30) Foreign Application Priority Data

| Aug. 11, 2015 | (JP) | ................................ 2015-158699 |
| Aug. 11, 2015 | (JP) | ................................ 2015-159081 |
| Aug. 11, 2015 | (JP) | ................................ 2015-159082 |

(51) Int. Cl.
*B29C 43/00* (2006.01)
*B29C 70/50* (2006.01)
*B29C 70/14* (2006.01)
*B29C 43/48* (2006.01)
*B29C 43/52* (2006.01)
*B29K 105/08* (2006.01)
*B29L 7/00* (2006.01)

(52) U.S. Cl.
CPC .............. *B29C 70/14* (2013.01); *B29C 70/50* (2013.01); *B29C 70/504* (2013.01); *B29C 70/508* (2013.01); *B29C 70/545* (2013.01); *B29C 43/52* (2013.01); *B29C 2043/483* (2013.01); *B29C 2043/486* (2013.01); *B29C 2793/0054* (2013.01); *B29K 2105/0872* (2013.01); *B29K 2105/0881* (2013.01); *B29L 2007/002* (2013.01)

(58) Field of Classification Search
CPC ..... B29C 70/50; B29C 70/545; B29C 70/508; B29C 70/20; B29C 70/202; B29C 70/54; B29C 70/48; B29C 43/20; B29C 43/222; B29C 43/34; B32B 2250/20; B32B 2260/023; B32B 2260/046; B32B 2262/02; B32B 2262/0253; B32B 2262/0269; B32B 2262/06; B32B 2262/08; B32B 2262/10; B32B 2262/101; B32B 2262/103; B32B 2262/105; B32B 2262/106; B32B 3/266; B32B 5/12; B32B 5/26; Y10T 428/24124; Y10T 428/24132; Y10T 428/24314; Y10T 428/24322; Y10T 428/24488; Y10T 428/2457; Y10T 428/249924; Y10T 428/2913
USPC .......... 428/292.1, 136, 167, 295.4, 113, 114, 428/137, 364; 264/258, 145; 442/20, 442/425
See application file for complete search history.

(56) References Cited

U.S. PATENT DOCUMENTS

| 2011/0143110 | A1 | 6/2011 | Tsuchiya et al. |
| 2013/0095282 | A1 | 4/2013 | Taketa et al. |
| 2015/0292145 | A1 | 10/2015 | Sonoda et al. |
| 2016/0009881 | A1 | 1/2016 | Fujita et al. |

FOREIGN PATENT DOCUMENTS

| JP | 63-247012 A | 10/1988 |
| JP | 63-267523 A | 11/1988 |
| JP | 7-41645 A | 2/1995 |
| JP | 7-164439 A | 6/1995 |
| JP | 2002-302557 A | 10/2002 |
| JP | 2007-261141 A | 10/2007 |
| JP | 2008-207544 A | 9/2008 |
| JP | 2008-207545 A | 9/2008 |
| JP | 2009-62474 A | 3/2009 |
| JP | 2009-114612 A | 5/2009 |
| JP | 2009-537691 A | 10/2009 |
| JP | 2009-286817 A | 12/2009 |
| JP | 2011-67957 A | 4/2011 |
| JP | 5102923 B2 | 12/2012 |
| JP | 2013-203835 A | 10/2013 |
| JP | 2013-237602 A | 11/2013 |
| WO | WO 2007/135418 A1 | 11/2007 |
| WO | WO 2008/038591 A1 | 4/2008 |
| WO | WO 2008/099670 A1 | 8/2008 |
| WO | WO 2008/149615 A1 | 12/2008 |
| WO | WO 2010/013645 A1 | 2/2010 |
| WO | WO 2012/140793 A1 | 10/2012 |
| WO | WO 2014/084194 A1 | 6/2014 |
| WO | WO 2014/208626 A1 | 12/2014 |
| WO | WO 2015/037570 A1 | 3/2015 |
| WO | WO 2015/083707 A1 | 6/2015 |
| WO | WO 2016/043156 A1 | 3/2016 |

OTHER PUBLICATIONS

International Search Report dated Oct. 11, 2016 in PCT/JP2016/072981 (with English translation), 8 pages.
Japanese Office Action dated Nov. 7, 2017 in Japanese Patent Application No. 2016-553620, 14 pages.
Japanese Office Action dated Dec. 19, 2017 in Japanese Patent Application No. 2016-553620 (with partial English translation), 18 pages.
Japanese Office Action dated Dec. 12, 2017 in Japanese Patent Application No. 2016-553620 (with partial English translation).
Fei Cheng, et al., "DMA Behaviors of CFRP/SDR Sandwich Laminated with Damping Rubber Sheet", J. Soc. Mat, vol. 54 No. 5, May 2005, pp. 487-493 (with English abstract and partial English translation).
Office Action dated May 15, 2018 in corresponding Japanese Patent Application No. 2016-553620 (with English Translation), 18 pages.
Extended European Search Report dated Aug. 16, 2018 in European Patent Application No. 16833114.8, 16 pages.

FIBER-REINFORCED PLASTIC AND METHOD FOR PRODUCING SAME

TECHNICAL FIELD

The present invention relates to a fiber-reinforced plastic and a method for producing the same.

This application is based upon and claims the benefit of priority of the prior Japanese Patent Application No. 2015-159082 filed in Japan on Aug. 11, 2015, the prior Japanese Patent Application No. 2015-159081 filed in Japan on Aug. 11, 2015, the prior Japanese Patent Application No. 2015-158699 filed in Japan on Aug. 11, 2015, the prior Japanese Patent Application No. 2015-154209 filed in Japan on Aug. 4, 2015, and the prior Japanese Patent Application No. 2015-156292 filed in Japan on Aug. 6, 2015, the entire contents of which are incorporated herein by reference.

BACKGROUND ART

Structural materials obtained by shaping sheet-like fiber-reinforced plastics through stamping molding are widely used in various fields such as aircraft members, automobile members, wind turbine members for wind power generation, and sports goods. The fiber-reinforced plastic is formed, for example, by laminating and integrating a plurality of prepreg base materials in which reinforcing fibers are impregnated with a thermoplastic resin.

Examples of the prepreg base material may include those obtained by impregnating those obtained by pulling and aligning continuous reinforcing fibers having a long fiber length in one direction with a thermoplastic resin and then forming into a sheet shape. A structural material exhibiting excellent mechanical properties can be produced from a fiber-reinforced plastic formed from a prepreg base material using such a continuous long reinforcing fiber. However, it is difficult to shape the fiber-reinforced plastic into a complicated shape such as a three-dimensional shape since it is formed from a continuous reinforcing fiber and the fluidity at the time of shaping is thus low. Hence, the structural material to be produced is limited mainly to those close to a planar shape in the case of using the fiber-reinforced plastic.

As a method for enhancing the fluidity at the time of shaping, for example, a method (I) in which a plurality of prepreg base materials obtained by impregnating reinforcing fibers pulled and aligned in one direction with a thermoplastic resin and forming cuts intersecting the fiber axis are laminated and integrated into a fiber-reinforced plastic are proposed (Patent Literatures 1 to 5). The fiber-reinforced plastic obtained by the method (I) exhibits favorable fluidity at the time of shaping since cuts are formed on the prepreg base material and the reinforcing fibers are thus cut. In addition, it is possible to obtain a fiber-reinforced plastic exhibiting favorable isotropy of mechanical properties and small variations by laminating a plurality of prepreg base materials so that the fiber axis directions of the reinforcing fibers are not biased in a specific direction, for example, fiber axis directions are deviated by 45° in a planar view. The anisotropy can also be controlled by laminating the prepreg base materials so that the fiber axe directions are aligned in an arbitrary direction.

However, in the method (I), problems such as deteriorated handleability arises in some cases as swelling and warpage occur to increase the wound diameter when a long fiber-reinforced plastic is produced and wound up.

In addition, the method (I) is not yet satisfactory from the viewpoint of ease of production and cost. Particularly in the industrial production of fiber-reinforced plastics and structural materials (molded articles), it is important to be able to produce them more easily and inexpensively. In addition, it is important to further enhance the fluidity at the time of shaping of the fiber-reinforced plastic in order to obtain a structural material having a more complicated shape.

In addition, as a method for enhancing the fluidity at the time of shaping, there is a method in which discontinuous reinforcing fibers are randomly disposed. For example, a method (II) in which a plurality of prepreg pieces cut at a certain length from a tape-like prepreg base material having a narrow width are dispersed on a flat surface and integrated into a sheet-like fiber-reinforced plastic through press molding is disclosed (Patent Literature 6).

However, in the method (II), it is extremely difficult to uniformly disperse the prepreg pieces so that the fiber axis directions of the reinforcing fibers are directed in completely random directions since the prepreg pieces are dispersed by flying the prepreg pieces in the air or diffusing the prepreg pieces in a liquid fluid and then depositing them. Hence, a fiber-reinforced plastic having different mechanical properties such as strength depending on the location and direction is obtained even in the same sheet. It is often demanded to a structural material that the variations in mechanical properties such as strength are small and the mechanical properties are isotropic or the anisotropy thereof is controlled. However, by the method (II), it is difficult to obtain a fiber-reinforced plastic in which isotropy of mechanical properties is favorable or anisotropy thereof is controlled and further the variations in mechanical properties are small.

Moreover, a fiber-reinforced plastic is also demanded to exhibit favorable heat resistance. Generally, the heat resistance of fiber-reinforced plastic is greatly affected by the heat resistance of the matrix resin to be used in the fiber-reinforced plastic. Usually, the mechanical properties of a resin simple substance tend to decrease at temperatures equal to or higher than the glass transition temperature of the resin. The mechanical properties of the fiber-reinforced plastic also tend to decrease at temperatures equal to or higher than the glass transition temperature of the matrix resin in the same manner. In order to minimize this decrease in mechanical properties, it is required to uniformly disperse the reinforcing fibers in the matrix resin in the fiber-reinforced plastic. However, in the method (II), only the molten matrix resin flows into the gaps between the deposited prepreg pieces in the step of heating and integrating the deposited prepreg pieces. Hence, a resin-rich portion is locally formed in the fiber-reinforced plastic obtained. The fiber-reinforced plastic obtained by the method (II) has a problem of inferior heat resistance due to the influence of this resin-rich portion.

In addition, the fiber-reinforced plastic obtained by the method (I) has a problem that mechanical properties decrease as the cut portion serves as a starting point of fracture in a case in which a stress is generated in the direction along the shape of cut. In addition, there is a problem that the heat resistance is inferior at temperatures equal to or higher than the glass transition temperature of the matrix resin in the same manner as in the method (II) disclosed in Patent Literature 6 since only the resin is substantially present at this cut portion.

In addition, in the method (I), it is required to separately produce band-like prepreg base materials in which the fiber axis directions of the reinforcing fibers are set to different directions (for example, 0°, 45°, 90°, and −45° with respect to the machine direction) in a planar view and to laminate them in the case of continuously producing a band-like fiber-reinforced plastic exhibiting favorable isotropy of mechanical properties.

Hence, the production process is complicated, the control is difficult, and the cost increases. In addition, it is required to laminate the prepreg base materials while rotating each prepreg base material at a predetermined rotation angle (0°, 45°, 90°, −45°, or the like) at all times so that the fiber axis directions of the reinforcing fibers are not biased in a planar view in the case of producing a sheet-like fiber-reinforced plastic as well. Hence, the laminating operation is complicated, the control is difficult, and the cost increases in this case as well.

Patent Literature 7 discloses a method (III) for producing a fiber-reinforced plastic by dispersing reinforcing fibers through papermaking. The fiber-reinforced plastic obtained by the method (III) exhibits excellent isotropy of mechanical properties, small variations, and favorable heat resistance since the reinforcing fibers are almost uniformly dispersed in the fiber-reinforced plastic.

However, the fiber-reinforced plastic obtained by the method (III) exhibits inferior fluidity at the time of shaping since the reinforcing fibers are three-dimensionally entangled in the fiber-reinforced plastic. In addition, the production process is also extremely complicated and the fiber-reinforced plastic is inferior in cost. Moreover, it is required to conduct papermaking of reinforcing fibers in a denser state in the case of attempting to produce a fiber-reinforced plastic having a high content of reinforcing fibers by the method (III). However, particularly the reinforcing fibers oriented in the thickness direction (impregnated direction) are responsible for the stress of the pressing force at the time of impregnation among the three-dimensionally entangled reinforcing fibers when it is attempted to impregnate the reinforcing fibers subjected to such papermaking in a high density with a matrix resin, and thus the pressure is not transmitted to the resin and the impregnation is extremely difficult. In addition, three-dimensional entanglement is strengthened in a case in which the fiber length of the reinforcing fibers is long as well, and the impregnation is thus difficult in the same manner.

In addition, the conventional fiber-reinforced plastics in which discontinuous fibers are randomly disposed do not necessarily exhibit sufficient mechanical characteristics and an improvement in modulus of elasticity is desired.

In the case of producing a structural material by shaping a fiber-reinforced plastic into a complicated shape such as a three-dimensional shape, a relatively short reinforcing fiber having a fiber length of 100 mm or less is generally used in order to ensure the fluidity at the time of shaping. However, the mechanical properties of the structural material after shaping are likely to decrease when the fiber length of the reinforcing fibers is shortened.

As a fiber-reinforced plastic which can provide a structural material exhibiting high mechanical properties while a using discontinuous reinforcing fiber, the following ones are proposed.

(1) A fiber-reinforced plastic which is constituted by a reinforcing fiber having a fiber length of from 5 to 100 mm and a thermoplastic resin and in which the average value of tan δ' in a range of the melting point of the thermoplastic resin±25° C. satisfies 0.01≤tan δ' (average value)≤0.2 (Patent Literature 8). Tan δ' is defined by the following two equations.

$$\tan \delta = G''/G'$$

$$\tan \delta' = Vf \times \tan \delta/(100-Vf)$$

(where Vf is the volume fraction (%) of the reinforcing fiber in the fiber-reinforced plastic, G' is the storage modulus of elasticity (Pa) of the fiber-reinforced plastic, and G" is the loss modulus of elasticity (Pa) of the fiber-reinforced plastic).

The fiber-reinforced plastic of (1) exhibits favorable mechanical properties as tan δ' (average value) is controlled in a specific range.

However, in the fiber-reinforced plastic of (1), tan δ' hardly changes even in a state in which the nylon resin (melting point: 225° C.) of a thermoplastic resin is heated to the melting point as described in Examples 1 and 2. The fact that tan δ' hardly changes indicates that the value of tan δ itself hardly changes since Vf/(100−Vf) is constant, but the reinforcing fibers and the thermoplastic resin do not exhibit sufficiently high fluidity when being heated at the time of shaping and the reinforcing fibers are cut and shortened at the time of shaping when the value of tan δ is small even in a temperature range to be equal to or higher than the melting point and the property as an elastic body is great, and there is thus a possibility that the mechanical properties of the structural material after shaping are insufficient.

CITATION LIST

Patent Literature

Patent Literature 1: JP 63-247012 A
Patent Literature 2: JP 63-267523 A
Patent Literature 3: JP 2008-207544 A
Patent Literature 4: JP 2008-207545 A
Patent Literature 5: JP 2009-286817 A
Patent Literature 6: JP 07-164439 A
Patent Literature 7: WO 2010/013645 A
Patent Literature 8: WO 2012/140793 A

SUMMARY OF THE INVENTION

Problem to be Solved by the Invention

A first object of the invention is to provide a method for producing a fiber-reinforced plastic, which can easily produce a fiber-reinforced plastic hardly causing swelling and warpage while exhibiting excellent fluidity at the time of shaping and ensuring excellent mechanical characteristics and the isotropy thereof and a fiber-reinforced plastic in which the occurrence of swelling and warpage is suppressed.

A second object of the invention is to provide a fiber-reinforced plastic which can achieve both excellent fluidity at the time of shaping and excellent mechanical properties of a structural material to be obtained after shaping.

A third object of the invention is to provide a fiber-reinforced plastic in which excellent mechanical characteristics and isotropy thereof and more favorable fluidity at the time of shaping are ensured and which can be easily and inexpensively produced, and a method for producing the same.

A fourth object of the invention is to provide a method for producing a fiber-reinforced plastic, which can easily and inexpensively produce a fiber-reinforced plastic exhibiting excellent mechanical characteristics, controlled isotropy and anisotropy of mechanical properties, small variations, excellent heat resistance, and favorable fluidity at the time of shaping.

A fifth object of the invention is to provide a fiber-reinforced plastic exhibiting excellent modulus of elasticity as well as favorable shaping property and a method for producing the same.

Means for Solving Problem

The invention has the following configuration.

[1] A method for producing a fiber-reinforced plastic, the method including the following steps (i) to (iii):
  (i) a step of obtaining a material (A) containing the following prepreg base material;
  (ii) a step of pressing the material (A) in a state of being heated to a temperature T equal to or higher than a melting point of a matrix resin or equal to or higher than a glass transition temperature of the matrix resin when the matrix resin does not have a melting point while moving the material (A) in one direction by setting angles formed by fiber axis directions of all reinforcing fibers with respect to a direction orthogonal to a moving direction of the material (A) to from −20° to 20° by using a pressing device which substantially uniformly presses the material (A) in the orthogonal direction; and
  (iii) a step of cooling the material (A) pressed by the pressing device to obtain a fiber-reinforced plastic:
  (prepreg base material)
  a prepreg base material in which a reinforcing fiber pulled and aligned in one direction is impregnated with a matrix resin and a cut is formed so as to intersect a fiber axis of the reinforcing fiber and
  a region in which a plurality of cuts to form an angle θ of 0°<θ<90° with the fiber axis of the reinforcing fiber are formed in a fiber axis direction of the reinforcing fiber and a region in which a plurality of cuts to form an angle θ of −90°<θ<0° with the fiber axis of the reinforcing fiber are formed in a fiber axis direction of the reinforcing fiber when anticlockwise rotation with respect to the fiber axis of the reinforcing fiber in a planar view is defined as a positive are alternately formed in a direction orthogonal to the fiber axis of the reinforcing fiber.

[2] The method for producing a fiber-reinforced plastic according to [1], in which a void fraction in a cross section obtained by cutting the prepreg base material in a thickness direction is from 5% to 75%.

[3] The method for producing a fiber-reinforced plastic according to [1] or [2], in which a material (A1) containing a tow prepreg base material in which a reinforcing fiber tow having a plurality of tows having from 20,000 to 200,000 single fibers bundled pulled and aligned in one direction is impregnated with a matrix resin and a cut intersecting a fiber axis of the reinforcing fiber tow is formed as the prepreg base material is obtained in the step (i).

[4] The method for producing a fiber-reinforced plastic according to any one of [1] to [3], in which a prepreg base material (X1) in which the reinforcing fiber is a carbon fiber (X) having a tensile modulus of elasticity of 350 GPa or more and a prepreg base material (Y1) in which the reinforcing fiber is a carbon fiber (Y) having a tensile modulus of elasticity of 200 GPa or more and less than 350 GPa are respectively formed as the prepreg base material and
  a laminate in which the prepreg base material (X1) is positioned on an outer side of the prepreg base material (Y1) in a thickness direction and fiber axis directions of the carbon fiber (X) and carbon fiber (Y) in the laminate are substantially the same is formed and used as a material (A2) in the step (i).

[5] A method for producing a fiber-reinforced plastic, the method including:
  (i) a step of obtaining a material (A) containing a prepreg base material in which a reinforcing fiber pulled and aligned in one direction is impregnated with a matrix resin and a cut is formed so as to intersect a fiber axis of the reinforcing fiber and a region in which a plurality of cuts to form an angle θ of 0°<θ<90° with the fiber axis of the reinforcing fiber are formed in a fiber axis direction of the reinforcing fiber and a region in which a plurality of cuts to form an angle θ of −90°<θ<0° with the fiber axis of the reinforcing fiber are formed in a fiber axis direction of the reinforcing fiber when anticlockwise rotation with respect to the fiber axis of the reinforcing fiber in a planar view is defined as a positive are alternately formed in a direction orthogonal to the fiber axis of the reinforcing fiber;
  (ii) a step of pressing the material (A) in a state of being heated to a temperature T equal to or higher than a melting point of a matrix resin or equal to or higher than a glass transition temperature of the matrix resin when the matrix resin does not have a melting point while moving the material (A) in one direction by setting angles formed by fiber axis directions of all reinforcing fibers with respect to a direction orthogonal to a moving direction of the material (A) to from −20° to 20° by using a pressing device which substantially uniformly presses the material (A) in the orthogonal direction; and
  (iii) a step of cooling the material (A) pressed by the pressing device to obtain a fiber-reinforced plastic, in which
  a fiber-reinforced plastic (X2) is formed by performing the steps (i) to (iii) by using a material (A-X) containing a prepreg base material (X1) in which the reinforcing fiber is a carbon fiber (X) having a tensile modulus of elasticity of 350 GPa or more as the material (A),
  a fiber-reinforced plastic (Y2) is formed by performing the steps (i) to (iii) by using a material (A-Y) containing a prepreg base material (Y1) in which the reinforcing fiber is a carbon fiber (Y) having a tensile modulus of elasticity of 200 GPa or more and less than 350 GPa as the material (A), and
  the fiber-reinforced plastic (X2) and fiber-reinforced plastic (Y2) thus obtained are integrated so that an outermost fiber-reinforced plastic is the fiber-reinforced plastic (X2).

[6] A fiber-reinforced plastic containing:
  reinforcing fibers having an average fiber length of from 1 to 100 mm; and a matrix resin, in which
  a wound diameter D (m) when the fiber-reinforced plastic is wound around a core material having a diameter of 0.091 m at a winding torque of 40 N·m by a length of 10 m satisfies a condition of the following Equation (a1).

[Math. 1]

$$1.0 < \frac{D}{\sqrt{\frac{4LW}{\pi \rho} + d^2}} < 1.5 \qquad (a1)$$

Where symbols in Equation (a1) have the following meanings:
d: diameter (m) of core material,
W: weight per unit area (g/m$^2$) of fiber-reinforced plastic, ρ: true density (g/m³) of fiber-reinforced plastic, and L: wound length (m) of fiber-reinforced plastic.

[7] A fiber-reinforced plastic containing:

a reinforcing fiber; and a matrix resin, in which an average fiber length of the reinforcing fibers is from 1 to 100 mm, and tan δ (ave) is from 0.01 to 0.25 and tan δ (max)−tan δ (ave) is 0.15 or more when an average value of viscoelastic property tan δ of the fiber-reinforced plastic in a temperature range of from T−30 (° C.) to T−10 (° C.) (where T is a melting point of the matrix resin or a glass transition temperature of the matrix resin when the matrix resin does not have a melting point) expressed by the following Equation (b1) is defined as tan δ (ave) and a maximum value of the viscoelastic property tan δ in a temperature range of from T−10 (° C.) to T+10 (° C.) is defined as tan δ (max):

$$\tan \delta = G''/G' \quad (b1)$$

where symbols in Equation (b1) have the following meanings:

G'': loss modulus of elasticity, and

G': storage modulus of elasticity.

[8] A fiber-reinforced plastic containing:

a reinforcing fiber; and a matrix resin, in which a fiber-containing resin layer containing both the reinforcing fiber and the matrix resin and a fiber-free resin layer which does not contain the reinforcing fiber but contains the matrix resin form a layer structure in a thickness direction, and a void fraction in the fiber-containing resin layer is less than 4% and a void fraction in the fiber-free resin layer is 4% or more and less than 40%.

[9] A fiber-reinforced plastic containing:

a reinforcing fiber; and a matrix resin, in which a volume fraction Vf(a) of fiber and a void content Vv(a) in the fiber-reinforced plastic and a volume fraction Vf(b) of fiber and void content Vv(b) in a cross section obtained by cutting the fiber-reinforced plastic in a thickness direction satisfy the following Equation (c1) and the following Equation (c2):

$$Vf(a)-3(\%) < Vf(b) < Vf(a) < 70(\%) \quad (c1)$$

$$2(\%) < Vv(b)-3(\%) < Vv(a) < Vv(b) \quad (c2).$$

[10] The fiber-reinforced plastic according to any one of [6] to [9], in which carbon fibers having an average fiber length of from 5 to 100 mm are randomly disposed as the reinforcing fiber, the carbon fiber includes a carbon fiber (X) having a tensile modulus of elasticity of 350 GPa or more and a carbon fiber (Y) having a tensile modulus of elasticity of 200 GPa or more and less than 350 GPa, and the carbon fiber (X) is locally present in the surface layer.

[11] The fiber-reinforced plastic according to [10], including a layer containing only the carbon fiber (X) and a layer containing the carbon fiber (X) and the carbon fiber (Y).

[12] The fiber-reinforced plastic according to [11], further including a layer containing only the carbon fiber (Y).

[13] The fiber-reinforced plastic according to any one of [6] to [12], in which a degree of orientation pf of the reinforcing fiber in a direction perpendicular to a thickness direction is from 0.001 to 0.8.

[14] The fiber-reinforced plastic according to any one of [6] to [13], in which an elliptic divergence coefficient ec in an orientation profile of the reinforcing fiber on a plane perpendicular to a thickness direction is from $1 \times 10^{-5}$ to $9 \times 10^{-5}$.

[15] The fiber-reinforced plastic according to any one of [6] to [14], in which a dispersion parameter dp of the reinforcing fiber is from 100 to 80 in a cross section in a thickness direction.

[16] The fiber-reinforced plastic according to any one of [6] to [15], in which the matrix resin is a thermoplastic resin.

[17] The fiber-reinforced plastic according to any one of [6] to [16], in which a volume fraction of the reinforcing fiber is from 5% to 70% by volume.

[18] The fiber-reinforced plastic according to any one of [6] to [17], in which an average fiber length of the reinforcing fibers is from 10 to 50 mm.

Another aspect of the invention has the following configuration.

[A1] A fiber-reinforced plastic containing a reinforcing fiber and a matrix resin, in which an average fiber length of the reinforcing fibers is from 1 to 100 mm and tan δ (ave) is from 0.01 to 0.25 and tan δ (max)−tan δ (ave) is 0.15 or more when an average value of viscoelastic property tan δ of the fiber-reinforced plastic in a temperature range of from T−30 (° C.) to T−10 (° C.) (where T is a melting point of the matrix resin or a glass transition temperature of the matrix resin when the matrix resin does not have a melting point) expressed by the following Equation (b1) is defined as tan δ (ave) and a maximum value of the viscoelastic property tan δ in a temperature range of from T−10 (° C.) to T+10 (° C.) is defined as tan δ (max):

$$\tan \delta = G''/G' \quad (b1)$$

(where G'' is the loss modulus of elasticity and G' is the storage modulus of elasticity).

[A2] The fiber-reinforced plastic according to [A1], in which a degree of orientation pf of the reinforcing fiber in a direction orthogonal to a thickness direction is from 0.001 to 0.8 and an elliptic divergence coefficient ec in an orientation profile of the reinforcing fiber on a plane orthogonal to a thickness direction is from $1 \times 10^{-5}$ to $9 \times 10^{-5}$.

[A3] The fiber-reinforced plastic according to [A1] or [A2], in which a dispersion parameter dp of the reinforcing fiber is from 100 to 80 in a cross section in a thickness direction.

[A4] The fiber-reinforced plastic according to any one of [A1] to [A3], in which the matrix resin is a thermoplastic resin.

[A5] The fiber-reinforced plastic according to any one of [A1] to [A4], in which a volume fraction of the reinforcing fiber is from 5% to 70% by volume.

[A6] The fiber-reinforced plastic according to any one of [A1] to [A5], in which an average fiber length of the reinforcing fibers is from 10 to 50 mm.

Another aspect of the invention has the following configuration.

[B1] A method for producing a fiber-reinforced plastic, the method including the following steps (i) to (iii):

(i) a step of obtaining a material (A) containing the following prepreg base material;

(ii) a step of pressing the material (A) in a state of being heated to a temperature T equal to or higher than a melting point of a matrix resin or equal to or higher than a glass transition temperature of the matrix resin when the matrix resin does not have a melting point while moving the material (A) in one direction so that a fiber axis direction of the reinforcing fiber in the prepreg base material intersects a moving direction of the material (A) by using a pressing device which substantially uniformly presses the material (A) in a direction orthogonal to the moving direction; and (iii) a step of cooling the material (A) pressed by the pressing device to obtain a fiber-reinforced plastic:

(prepreg base material)

a prepreg base material in which a reinforcing fiber pulled and aligned in one direction is impregnated with a matrix resin and a cut is formed so as to intersect a fiber axis of the reinforcing fiber and a void fraction in a cross section cut in a thickness direction is from 5% to 75%.

[B2] The method for producing a fiber-reinforced plastic according to [B1], in which a theoretical thickness of the prepreg base material is from 0.2 to 2.0 mm.

[B3] The method for producing a fiber-reinforced plastic according to [B1] or [B2], in which an angle θ formed by a fiber axis direction of the reinforcing fiber with respect to a direction orthogonal to a moving direction of the material (A) is set to from −20° to 20° in the step (ii).

[B4] A fiber-reinforced plastic containing a reinforcing fiber and a matrix resin, in which an average fiber length of the reinforcing fibers is from 1 to 100 mm, a fiber-containing resin layer containing both the reinforcing fiber and the matrix resin and a fiber-free resin layer which does not contain the reinforcing fiber but contains the matrix resin form a layer structure in a thickness direction, and a void fraction in the fiber-containing resin layer is less than 4% and a void fraction in the fiber-free resin layer is 4% or more and less than 40% in a cross section cut in a thickness direction.

[B5] A method for producing a structural material, the method including the following steps (i) to (iv):

(i) a step of obtaining a material (A) containing the following prepreg base material;

(ii) a step of pressing the material (A) in a state of being heated to a temperature T equal to or higher than a melting point of a matrix resin or equal to or higher than a glass transition temperature of the matrix resin when the matrix resin does not have a melting point while moving the material (A) in one direction so that a fiber axis direction of the reinforcing fiber in the prepreg base material intersects a moving direction of the material (A) by using a pressing device which substantially uniformly presses the material (A) in a direction orthogonal to the moving direction;

(iii) a step of cooling the material (A) pressed by the pressing device to obtain a fiber-reinforced plastic; and (iv) a step of stamping-molding the fiber-reinforced plastic to obtain a structural material.

(prepreg base material)

a prepreg base material in which a reinforcing fiber pulled and aligned in one direction is impregnated with a matrix resin and a cut is formed so as to intersect a fiber axis of the reinforcing fiber and a void fraction in a cross section cut in a thickness direction is from 5% to 75%.

Another aspect of the invention has the following configuration.

[C1] A method for producing a fiber-reinforced plastic, the method including the following steps (i) to (iii).

(i) a step of obtaining a material (A) containing a tow prepreg base material in which a reinforcing fiber tow having a plurality of tows having from 20,000 to 200,000 single fibers bundled pulled and aligned in one direction is impregnated with a matrix resin and a cut intersecting a fiber axis of the reinforcing fiber tow is formed;

(ii) a step of pressing the material (A) in a state of being heated to a temperature T equal to or higher than a melting point of a matrix resin or equal to or higher than a glass transition temperature of the matrix resin when the matrix resin does not have a melting point while moving the material (A) in one direction so that a fiber axis direction of the reinforcing fiber tow intersects a moving direction of the material (A) by using a pressing device which substantially uniformly presses the material (A) in a direction orthogonal to the moving direction; and (iii) a step of cooling the material (A) pressed by the pressing device to obtain a fiber-reinforced plastic.

[C2] The method for producing a fiber-reinforced plastic according to [C1], in which an angle θ formed by a fiber axis direction of the reinforcing fiber tow with respect to a direction orthogonal to a moving direction of the material (A) is set to from −20° to 20° in the step (ii).

Another aspect of the invention has the following configuration.

[D1] A fiber-reinforced plastic containing carbon fibers which are randomly disposed and has an average fiber length of from 5 to 100 mm and a matrix resin, in which the carbon fiber includes a carbon fiber (X) having a tensile modulus of elasticity of 350 GPa or more and a carbon fiber (Y) having a tensile modulus of elasticity of 200 GPa or more and less than 350 GPa, and the carbon fiber (X) is locally present in the surface layer.

[D2] The fiber-reinforced plastic according to [D1], in which a degree of orientation pf of the carbon fiber in a direction orthogonal to a thickness direction is from 0.001 to 0.8 and an elliptic divergence coefficient ec in an orientation profile of the carbon fiber on a plane orthogonal to a thickness direction is from $1 \times 10^{-5}$ to $9 \times 10^{-5}$.

[D3] The fiber-reinforced plastic according to [D1] or [D2], in which a dispersion parameter dp of the carbon fiber is from 100 to 80 in a cross section in a thickness direction.

[D4] The fiber-reinforced plastic according to any one of [D1] to [D3], in which $\sigma_M/\sigma_T$ representing a bending strength ratio in a MD direction and a TD direction is less than 3.0.

[D5] The fiber-reinforced plastic according to any one of [D1] to [D4], including a layer containing only the carbon fiber (X) as the carbon fiber and a layer containing the carbon fiber (X) and the carbon fiber (Y).

[D6] The fiber-reinforced plastic according to [D5], further including a layer containing only the carbon fiber (Y) as the carbon fiber.

[D7] The fiber-reinforced plastic according to any one of [D1] to [D6], in which the carbon fiber (X) is a pitch-based carbon fiber.

[D8] The fiber-reinforced plastic according to any one of [D 1] to [D6], in which the carbon fiber (Y) is a polyacrylonitrile-based carbon fiber.

[D9] The fiber-reinforced plastic according to any one of [D] to [D6], in which the carbon fiber (X) is a pitch-based carbon fiber and the carbon fiber (Y) is a polyacrylonitrile-based carbon fiber.

[D10] The fiber-reinforced plastic according to any one of [D1] to [D9], in which the matrix resin is a thermoplastic resin.

[D11] The fiber-reinforced plastic according to any one of [D1] to [D10], in which a volume fraction of the carbon g fiber is from 5% to 70% by volume.

[D12] The fiber-reinforced plastic according to any one of [D1] to [D11], in which an average fiber length of the carbon fibers is from 10 to 50 mm.

[D13] A method for producing a fiber-reinforced plastic, the method including (i) a step of obtaining a material (A) containing a prepreg base material in which a carbon fiber pulled and aligned in one direction is impregnated with a matrix resin and a cut is formed so as to intersect a fiber axis of the carbon fiber, (ii) a step of pressing the material (A) in a state of being heated to a temperature T equal to or higher than a melting point of a matrix resin or equal to or higher than a glass transition temperature of the matrix resin when the matrix resin does not have a melting point while moving the material (A) in one direction so that a fiber axis direction of the carbon fiber in the prepreg base material intersects a moving direction of the material (A) with respect to a direction orthogonal to the moving direction by using a pressing device which substantially uniformly presses the material (A) in the orthogonal; and (iii) a step of cooling the material (A) pressed by the pressing device to obtain a fiber-reinforced plastic, in which a prepreg base material (X1) in which the carbon fiber is a carbon fiber (X) having a tensile modulus of elasticity of 350 GPa or more and a prepreg base material (Y1) in which the carbon fiber is a carbon fiber (Y) having a tensile modulus of elasticity of 200 GPa or more and less than 350 GPa are respectively formed and a laminate which contains the prepreg base material (X1) and prepreg base material (Y1) thus obtained and in which an outermost prepreg base material is the prepreg base material (X1), and fiber axis directions of the carbon fiber (X) and the carbon fiber (Y) in the laminate are substantially the same is formed and used as the material (A) in the step (i).

[D14] A method for producing a fiber-reinforced plastic, the method including (i) a step of obtaining a material (A) containing a prepreg base material in which a carbon fiber pulled and aligned in one direction is impregnated with a matrix resin and a cut is formed so as to intersect a fiber axis of the reinforcing fiber, (ii) a step of pressing the material (A) in a state of being heated to a temperature T equal to or higher than a melting point of a matrix resin or equal to or higher than a glass transition temperature of the matrix resin when the matrix resin does not have a melting point while moving the material (A) in one direction so that a fiber axis direction of the carbon fiber in the prepreg base material intersects a moving direction of the material (A) with respect to a direction orthogonal to the moving direction by using a pressing device which substantially uniformly presses the material (A) in the orthogonal; and (iii) a step of cooling the material (A) pressed by the pressing device to obtain a fiber-reinforced plastic, in which a fiber-reinforced plastic (X2) is formed by performing the steps (i) to (iii) by using a material (A-X) containing a prepreg base material (X1) in which the carbon fiber is a carbon fiber (X) having a tensile modulus of elasticity of 350 GPa or more as the material (A), a fiber-reinforced plastic (Y2) is formed by performing the steps (i) to (iii) by using a material (A-Y) containing a prepreg base material (Y1) in which the carbon fiber is a carbon fiber (Y) having a tensile modulus of elasticity of 200 GPa or more and less than 350 GPa as the material (A), and the fiber-reinforced plastic (X2) and fiber-reinforced plastic (Y2) thus obtained are integrated so that an outermost fiber-reinforced plastic is the fiber-reinforced plastic (X2).

[D15] The method for producing a fiber-reinforced plastic according to [D13] or [D14], in which an angle θ formed by a fiber axis direction of the reinforcing fiber with respect to a direction orthogonal to a moving direction of the material (A) is set to from −20° to 20° in the step (ii).

Effect of the Invention

According to the method for producing a fiber-reinforced plastic of the invention, it is possible to easily produce a fiber-reinforced plastic hardly causing swelling and warpage while exhibiting excellent fluidity at the time of shaping and ensuring excellent mechanical characteristics and the isotropy thereof.

In the fiber-reinforced plastic of [6], occurrence of swelling and warpage is suppressed.

By using the fiber-reinforced plastic of [7], it is possible to achieve both excellent fluidity at the time of shaping and excellent mechanical properties of a structural material to be obtained after shaping.

The fiber-reinforced plastics of [8] and [9] can be easily and inexpensively produced while ensuring excellent mechanical characteristics and isotropy thereof and more favorable fluidity at the time of shaping.

According to the method for producing a fiber-reinforced plastic of [2], it is possible to easily and inexpensively produce a fiber-reinforced plastic while ensuring excellent mechanical characteristics of the fiber-reinforced plastic, excellent isotropy of the mechanical characteristics, and fluidity at the time of shaping.

According to the method for producing a fiber-reinforced plastic of [3], it is possible to easily and inexpensively produce a fiber-reinforced plastic which exhibits excellent mechanical characteristics, controlled isotropy and anisotropy of mechanical properties, small variations, excellent heat resistance, and fluidity at the time of shaping.

The fiber-reinforced plastic of [10] has an excellent modulus of elasticity as well as exhibits favorable shaping property.

According to the method for producing a fiber-reinforced plastic of [4] and [5], it is possible to produce a fiber-reinforced plastic which has an excellent modulus of elasticity as well as exhibits favorable shaping property.

MODE(S) FOR CARRYING OUT THE INVENTION

Figure 1:
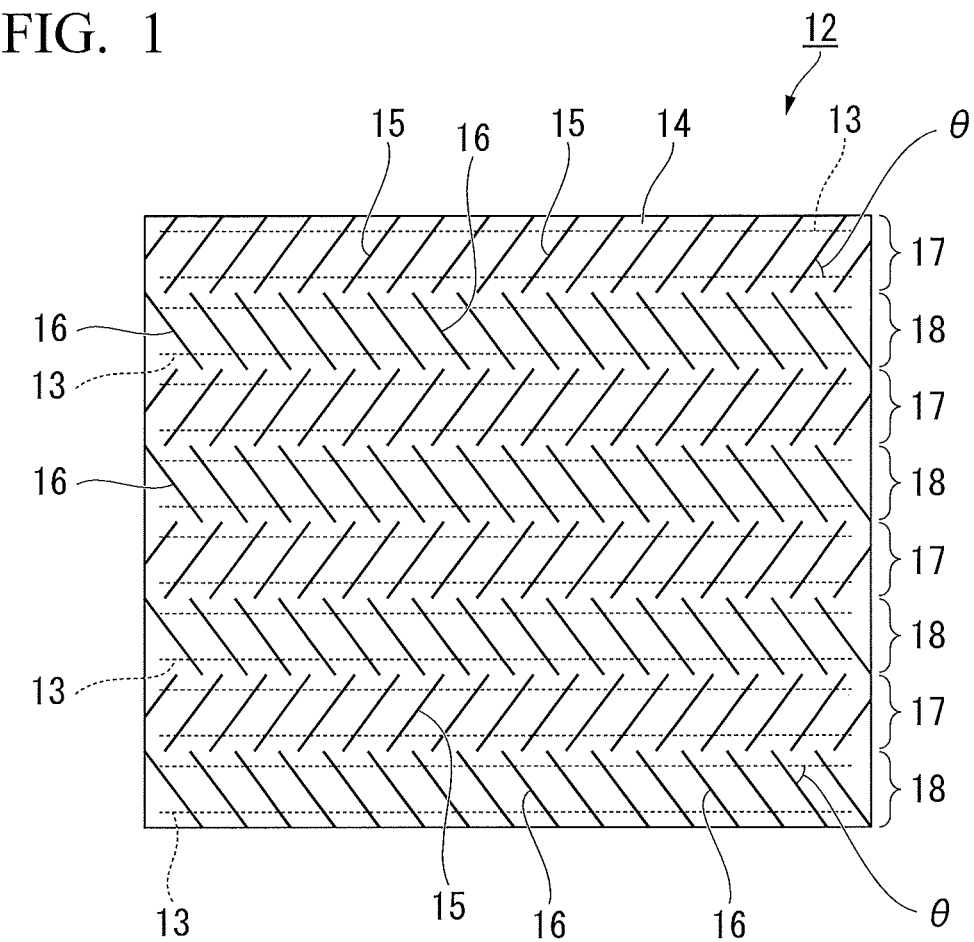
FIG. 1 is a plan view illustrating an example of a prepreg base material to be used in a method for producing a fiber-reinforced plastic of the invention.

<First Invention>
[Method for Producing Fiber-Reinforced Plastic]

A method for producing a fiber-reinforced plastic according to the first invention for achieving the first object has the following steps (i) to (iii).

(i) A step of obtaining a material (A) containing a prepreg base material to be described later.

(ii) A step of pressing the material (A) in a state of being heated to a temperature T equal to or higher than a melting point of a matrix resin or equal to or higher than a glass transition temperature of the matrix resin when the matrix resin does not have a melting point while moving the material (A) in one direction by setting angles formed by fiber axis directions of all reinforcing fibers with respect to a direction orthogonal to a moving direction of the material (A) to from −20° to 20° by using a pressing device which substantially uniformly presses the material (A) in the orthogonal direction.

(iii) A step of cooling the material (A) pressed by the pressing device to obtain a fiber-reinforced plastic.

(Step (i))

The material (A) may be a single layer material compose only of one prepreg base material or a prepreg laminate formed by laminating two or more prepreg base materials.

The prepreg base material to be used in the step (i) is one in which reinforcing fibers pulled and aligned in one direction are impregnated with a matrix resin.

The reinforcing fiber is not particularly limited, and for example, an inorganic fiber, an organic fiber, a metal fiber, or a reinforcing fiber having a hybrid configuration in which these are combined together can be used. One kind of reinforcing fiber may be used singly or two or more kinds thereof may be used concurrently.

Examples of the inorganic fiber may include a carbon fiber, a graphite fiber, a silicon carbide fiber, an alumina fiber, a tungsten carbide fiber, a boron fiber, and a glass fiber. Examples of the organic fiber may include a general nylon fiber and a polyester fiber in addition to an aramid fiber, and a high-density polyethylene fiber. Examples of the metal fiber may include fibers of stainless steel, iron, and the like, and the metal fiber may be a carbon fiber coated with a metal. Among these, a carbon fiber is preferable in consideration of mechanical properties such as strength of the structural material which is the final molded product.

The carbon fiber is not particularly limited, and examples thereof may include a polyacrylonitrile (PAN)-based carbon fiber and a pitch-based carbon fiber.

A preferred carbon fiber is a carbon fiber having a strand tensile strength of 1.0 GPa or more and 9.0 GPa or less and a strand tensile modulus of elasticity of 150 GPa or more and 1000 GPa or less measured in conformity to JIS R7601 (1986).

A more preferred carbon fiber is a carbon fiber having a strand tensile strength of 1.5 GPa or more and 9.0 GPa or less and a strand tensile modulus of elasticity of 200 GPa or more and 1000 GPa or less measured in conformity to JIS R7601 (1986).

The average fiber length of the reinforcing fibers in the prepreg base material is preferably from 1 to 100 mm, more preferably from 3 to 70 mm, still more preferably from 5 to 50 mm, particularly preferably from 10 to 50 mm, and most preferably from 10 to 35 mm.

Generally, a structural material exhibiting superior mechanical properties is obtained as the reinforcing fiber is longer, but it is difficult to obtain a structural material having a complicated three-dimensional shape since the fluidity decreases particularly at the time of stamping molding. Excellent fluidity is obtained at the time of shaping and the reinforcing fiber and the matrix resin are likely to flow when the average fiber length of the reinforcing fibers is equal to or shorter than the upper limit value. Hence, it is easy to obtain a structural material having a complicated three-dimensional shape such as ribs and bosses. In addition, a structural material exhibiting excellent mechanical properties can be produced when the average fiber length of the reinforcing fibers is equal to or longer than the lower limit value.

The average fiber diameter of the reinforcing fibers is preferably from 1 to 50 μm and more preferably from 5 to 20 μm.

The matrix resin may be a thermoplastic resin or a thermosetting resin. One kind of matrix resin may be used singly or two or more kinds thereof may be used concurrently.

As the matrix resin, a thermoplastic resin is preferable. A thermoplastic resin generally has a higher toughness value than a thermosetting resin, and it is thus likely to obtain a structural material exhibiting excellent strength, particularly impact resistance by using a thermoplastic resin as the matrix resin. In addition, the shape of the thermoplastic resin is determined by cooling and solidification without a chemical reaction. Hence, in the case of using a thermoplastic resin, short-time molding is possible and the productivity of fiber-reinforced plastics and structural materials is excellent.

The thermoplastic resin is not particularly limited, and examples thereof may include a polyamide resin (nylon 6 (melting point: 220° C.), nylon 66 (melting point: 260° C.), nylon 12 (melting point: 175° C.), or nylon MXD 6 (melting point: 237° C.), or the like), a polyolefin resin (low-density polyethylene (melting point: 95° C. to 130° C.), high-density polyethylene (melting point: 120° C. to 140° C.), polypropylene (melting point: 165° C.), or the like), a modified polyolefin resin (modified polypropylene resin (melting point: 160° C. to 165° C.), or the like), a polyester resin (polyethylene terephthalate, polybutylene terephthalate, or the like), a polycarbonate resin (glass transition temperature: 145° C.), a polyamide imide resin, a polyphenylene oxide resin, a polysulfone resin, a polyether sulfone resin, a polyether ether ketone resin, a polyether imide resin, a polystyrene resin, an ABS resin, a polyphenylene sulfide resin, a liquid crystal polyester resin, a copolymer of acrylonitrile and styrene, and a copolymer of nylon 6 and nylon 66.

Examples of the modified polyolefin resin may include a resin obtained by modifying a polyolefin resin with an acid such as maleic acid.

One kind of thermoplastic resin may be used singly, two or more kinds thereof may be used concurrently, or two or more kinds thereof may be used as a polymer alloy.

It is preferable to contain at least one kind selected from the group consisting of a polyolefin resin, a modified polypropylene resin, a polyamide resin, and a polycarbonate resin as the thermoplastic resin from the viewpoint of balance among the adhesive property to the reinforcing fiber, impregnating property into the reinforcing fiber, and the cost for the raw material of the thermoplastic resin.

The thermosetting resin is not particularly limited, and examples thereof may include an epoxy resin, a phenol resin, an unsaturated polyester resin, a urethane-based resin, a urea resin, a melamine resin, and an imide-based resin.

One kind of thermosetting resin may be used singly or two or more kinds thereof may be used concurrently.

As the thermosetting resin, an epoxy resin, a phenol resin, an unsaturated polyester resin, and an imide-based resin are preferable from the viewpoint of exertion of the mechanical properties of the fiber-reinforced plastic after curing of the thermosetting resin and an epoxy resin and an unsaturated polyester resin are more preferable from the viewpoint of ease of production of the prepreg base material.

Additives may be added to the prepreg base material according to the characteristics required to the intended structural material.

Examples of the additives may include a flame retardant, a weathering resistance improver, an antioxidant, a thermal stabilizer, an ultraviolet absorber, a plasticizer, a lubricant, a colorant, a compatibilizer, a non-fibrous filler, a conductive filler, a release agent, and a surfactant, and a thermoplastic resin may be used as an additive.

A cut (hereinafter also referred to as the cut (b)) to form an angle θ of 0°<θ<90° with the fiber axis of the reinforcing fiber and a cut (hereinafter also referred to as the cut (c)) to form an angle θ of −90°<θ<0° with the fiber axis of the reinforcing fiber are formed on the prepreg base material to be used in the step (i). Incidentally, the angle θ takes the anticlockwise rotation with respect to the fiber axis of the reinforcing fiber in a planar view as the positive.

In addition, in the prepreg base material to be used in the step (i), a region (hereinafter also referred to as the region (B)) in which a plurality of cuts (b) are formed in the fiber axis direction of the reinforcing fiber and a region (hereinafter also referred to as the region (C)) in which a plurality of cuts (c) are formed in the fiber axis direction of the reinforcing fiber are alternately formed in the direction orthogonal to the fiber axis of the reinforcing fiber. In the prepreg base material to be used in the step (i), a region (B) in which a plurality of cuts (b) having a straight line shape and a downward left shoulder are formed and a region (C) in which a plurality of cuts (c) having a straight line shape and a downward right shoulder are formed are alternately formed in the direction orthogonal to the fiber axis of the reinforcing fiber in a planar view in a state in which the reinforcing fiber pulled and aligned in one direction is disposed so that the fiber axis direction of the reinforcing fiber is the transverse direction in this manner.

The randomization of the fiber axis directions of the reinforcing fibers more uniformly occurs in the entire base material and the bias of the fiber axis directions of the reinforcing fibers decreases in the step (ii) as the region (B) and the region (C) are alternately formed in the direction orthogonal to the fiber axis of the reinforcing fiber in the prepreg base material. Hence, swelling and warpage of the fiber-reinforced plastic are less likely to occur and the wound diameter when the fiber-reinforced plastic is wound decreases. In addition, a fiber-reinforced plastic exhibiting excellent mechanical characteristics and excellent isotropy thereof is obtained.

Incidentally, in the first invention, the aspect in which the region (B) and the region (C) are alternately formed in the direction orthogonal to the fiber axis of the reinforcing fiber is not limited to an aspect in which the region (B) composed of one row of cuts (b) and the region (C) composed of one rows of cuts (c) are alternately formed. The aspect may be an aspect in which the region (B) composed of two rows of cuts (b) and the region (C) composed of two rows of cuts (c) are alternately formed or an aspect in which the region (B) composed of three rows of cuts (b) and the region (C) composed of three rows of cuts (c) are alternately formed.

The angles θ of the respective cuts (b) in the region (B) are preferably from 10° to 89° more preferably from 25° to 89°. The randomization of the fiber axis directions of the reinforcing fibers is likely to more uniformly occur when the angles θ of the respective cuts (b) in the region (B) are in the above range.

The angles θ of the respective cuts (b) in the region (B) may be the same as or different from one another. It is preferable that the angles θ of the respective cuts (b) in the region (B) are the same as one another from the viewpoint that the randomization of the fiber axis directions of the reinforcing fibers is likely to more uniformly occur.

The length of the cut (b) is not particularly limited and can be appropriately set. It is preferable that the lengths of the respective cuts (b) are the same as one another. Incidentally, the lengths of the respective cuts (b) may be different from one another.

The number of cuts (b) in the fiber axis direction of the reinforcing fiber in the region (B) is not particularly limited and may be appropriately determined so that the length of the reinforcing fiber cut by the cuts is a desired length.

The number of rows of cuts (b) in the region (B) may be one row or two or more rows.

The angles θ of the respective cuts (c) in the region (C) are preferably from −89° to −10° more preferably from −89° to −20°. The randomization of the fiber axis directions of the reinforcing fibers is likely to more uniformly occur when the angles θ of the respective cuts (c) in the region (C) are in the above range.

The angles θ of the respective cuts (c) in the region (C) may be the same as or different from one another. It is preferable that the angles θ of the respective cuts (c) in the region (C) are the same as one another from the viewpoint that the randomization of the fiber axis directions of the reinforcing fibers is likely to more uniformly occur.

It is more preferable that the absolute value of the angles θ of the respective cuts (b) in the region (B) and the absolute value of the angles θ of the respective cuts (c) in the region (C) are the same as each other from the viewpoint that the randomization of the fiber axis directions of the reinforcing fibers is likely to still more uniformly occur. Incidentally, the absolute value of the angles θ of the respective cuts (b) in the region (B) and the absolute value of the angles θ of the respective cuts (c) in the region (C) may be different from each other, but the difference between the absolute values thereof is preferably as small as possible.

The length of the cut (c) is not particularly limited and can be appropriately set. It is preferable that the lengths of the respective cuts (c) are the same as one another. Incidentally, the lengths of the respective cuts (c) may be different from one another.

The length of the cut (c) is preferably the same as the length of the cut (b). Incidentally, the length of the cut (c) and the length of the cut (b) may be different from each other.

The number of cuts (c) in the fiber axis direction of the reinforcing fiber in the region (C) is not particularly limited and may be appropriately determined so that the length of the reinforcing fiber cut by the cuts is a desired length.

The number of rows of cuts (c) in the region (C) may be one row or two or more rows. The number of rows of cuts (c) in the region (C) is preferably the same as the number of rows of cuts (b) in the region (B).

The relation between the region (B) and the region (C) in the prepreg base material is preferably a relation in which the region (B) has the same aspect as the region (C) when being reversed so as to be line-symmetrical with respect to the direction orthogonal to the fiber axis of the reinforcing fiber. By this, the randomization of the fiber axis directions of the reinforcing fibers is likely to more uniformly occur.

In addition, it is preferable that the end portion of the cut (b) closest to the region (C) in the region (B) and the end portion of the cut (c) closest to the region (B) in the region (C) are alternate with each other in the fiber axis directions of the reinforcing fibers. By this, the randomization of the fiber axis directions of the reinforcing fibers is likely to more uniformly occur.

It is preferable that the length in the direction orthogonal to the fiber axis of the reinforcing fibers in the region (B) and the length in the direction orthogonal to the fiber axis of the reinforcing fibers in the region (C) are the same as each other.

Specific examples of the prepreg base material may include a prepreg base material 12 illustrated in FIG. 1.

In the prepreg base material 12, a reinforcing fiber 13 pulled and aligned in one direction is impregnated with a matrix resin 14 and a cut (b) 15 and a cut (c) 16 are formed so as to intersect the fiber axis of the reinforcing fiber 13. The cut (b) 15 is a cut to form an angle θ of 0°<θ<90° with the fiber axis of the reinforcing fiber 13. The cut (c) 16 is a cut to form an angle θ of −90°<θ<0° with the fiber axis of the reinforcing fiber 13.

In the prepreg base material 12, a region (B) 17 composed of a plurality of cuts (b) 15 formed in the fiber axis direction of the reinforcing fiber 13 in one row and a region (C) 18 composed of a plurality of cuts (c) 16 formed in the fiber axis direction of the reinforcing fiber 13 in one row are alternately formed in the direction orthogonal to the fiber axis of the reinforcing fiber 13. In other words, in the prepreg base material 12, the row composed of cuts (b) 15 and the row composed of cuts (c) 16 are alternately formed in the direction orthogonal to the fiber axis of the reinforcing fiber 13.

Figure 2:
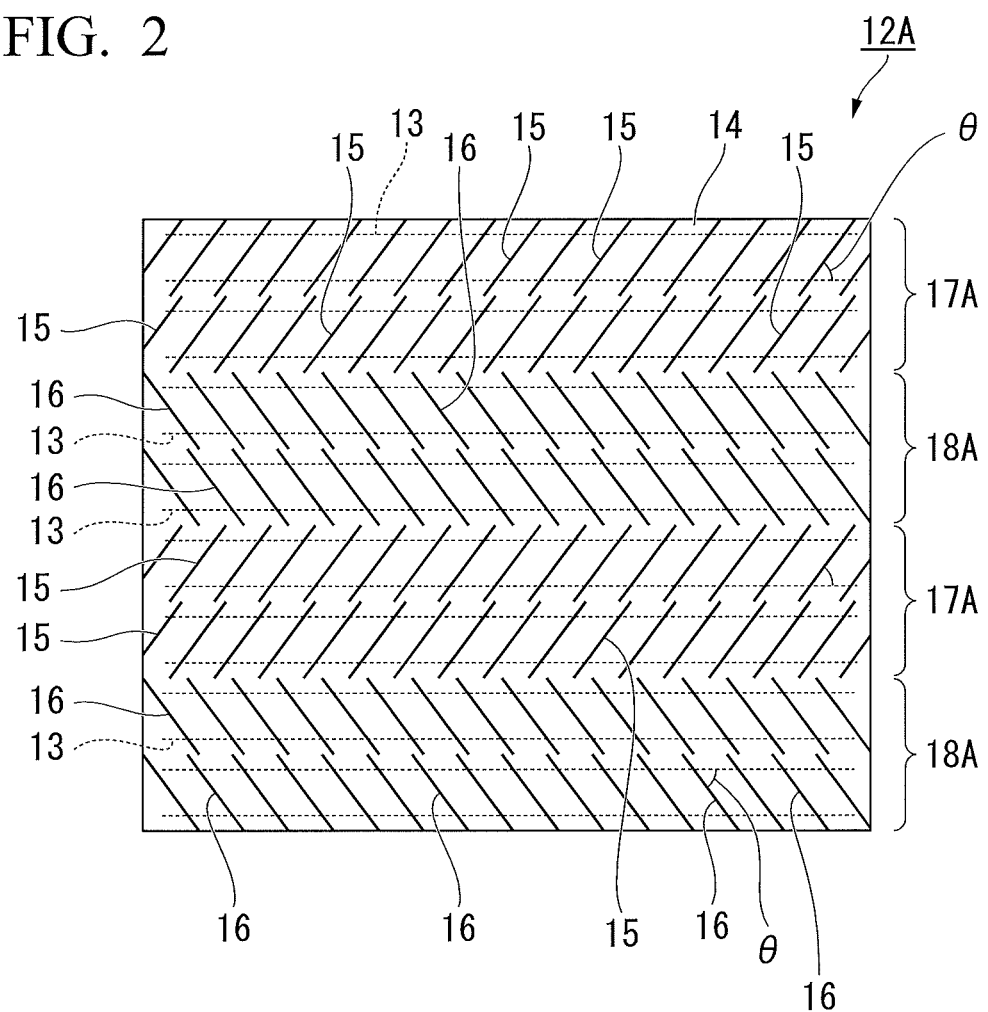
FIG. 2 is a plan view illustrating another example of a prepreg base material to be used in a method for producing a fiber-reinforced plastic of the invention.

In addition, the prepreg base material may be a prepreg base material 12A illustrated in FIG. 2.

The prepreg base material 12A is the same as the prepreg base material 12 except that it is equipped with a region (B) 17A instead of the region (B) 17 and a region (C) 18A instead of the region (C) 18. The region (B) 17A is the same as the region (B) 17 except that two rows of cuts (b) 15 are formed in the fiber axis direction of reinforcing fiber 13. The region (C) 18A is the same as the region (C) 18 except that two rows of cuts (c) 16 are formed in the fiber axis direction of the reinforcing fiber 13. In the prepreg base material 12A, the row composed of cuts (b) 15 and the row composed of cuts (c) 16 are alternately formed two by two in the direction orthogonal to the fiber axis of the reinforcing fiber 13.

The volume fraction (Vf) of fiber in the prepreg base material is preferably from 5% to 70% by volume, more preferably from 10% to 60% by volume, and still more preferably from 15% to 50% by volume. It is likely to obtain a structural material exhibiting sufficient mechanical properties when Vf is equal to or higher than the lower limit value. It is likely to obtain favorable fluidity at the time of shaping when Vf is equal to or lower than the upper limit value.

Incidentally, the Vf value in the prepreg base material means the proportion of the volume of the reinforcing fiber with respect to the total volume of other components such as additives excluding the reinforcing fiber, the matrix resin, and the void (gas) in the prepreg base material. The Vf value measured based on JIS K7075 is a value which fluctuates depending on the abundance of voids in the prepreg base material, and a volume fraction of fiber which does not depend on the abundance of voids is thus adopted in the invention.

The thickness of the prepreg base material is preferably from 0.2 to 2 mm and more preferably from 50 to 500 µm. It is easy to handle the prepreg base material when the thickness of the prepreg base material is equal to or thicker than the lower limit value. In addition, it is possible to suppress an excessive increase in the number of prepreg base materials to be laminated in the case of obtaining a material (A) having a desired thickness by laminating two or more prepreg base materials, and the productivity thus increases. When the thickness of the prepreg base material is equal to or thinner than the upper limit value, it is possible to suppress the voids (pores) inside the prepreg base material to be generated at the time of production of the prepreg base material and it is likely to obtain a fiber-reinforced plastic exhibiting sufficient mechanical properties.

In the first invention, the thickness of the prepreg base material hardly affects the strength of the structural material to be finally obtained.

The method for producing the prepreg base material is not particularly limited, and a known method can be adopted. As the prepreg base material, a commercially available prepreg base material may be used.

Examples of the method for forming a cut on the prepreg base material may include a method using a laser marker, a cutting plotter, a trimming die, or the like. The method using a laser marker is preferable in that a cut having a complicated shape such as a curved line shape or a zigzag line shape can be formed at a high speed. The method using a cutting plotter is preferable in that a cut is easily formed even on a prepreg base material having a large size of 2 m or more. The method using a trimming die is preferable in that a cut can be formed at a high speed.

In a case in which the material (A) is a prepreg laminate, it is preferable to laminate a resin sheet between the prepreg base materials to be laminated to form a resin layer in the prepreg laminate. By this, the fluidity is improved in the step (ii) and a fiber-reinforced plastic exhibiting excellent isotropy of mechanical properties and small variations in mechanical properties is likely to be obtained.

The resin to be used in the resin layer is not particularly limited, and examples thereof may include the same ones as the matrix resin to be used in the prepreg base material. The resin to be used in the resin layer is preferably the same resin as the matrix resin to be used in the prepreg base material. Incidentally, the resin to be used in the resin layer may be a resin different from the matrix resin to be used in the prepreg base material.

In a case in which the material (A) is a prepreg laminate, the aspect to laminate a plurality of prepreg base materials in the step (i) may be an aspect in which the fiber axis directions of the reinforcing fibers in all the prepreg base materials intersect the moving direction of the material (A) and the angle formed by the direction orthogonal to the moving direction and the fiber axis direction is from −20° to 20° in the step (ii).

Specific examples of the aspect of the prepreg laminate may include an aspect in which two or more prepreg base materials are arranged and laminated so that the fiber axes of the reinforcing fibers in the respective prepreg base materials are in the same direction. In the aspect, the fiber axis directions of the reinforcing fibers in the respective prepreg base materials are arranged, and it is thus easy to control the angular relation of the respective prepreg base materials in the step (ii) so that the fiber axis directions of the reinforcing fibers and the moving direction of the material (A) intersect each other.

In addition, it may be an aspect in which the fiber axis directions of the reinforcing fibers are deviated from each other between the respective prepreg base materials forming the prepreg laminate. In other words, it is not required to strictly control the angles of the respective prepreg base materials so that the fiber axis directions of the reinforcing fibers in the respective prepreg base materials are always completely arranged when laminating a plurality of prepreg base materials.

In addition, in a case in which the fiber axis directions of the reinforcing fibers are deviated from each other between the respective prepreg base materials laminated as well, the deviation of the fiber axis directions of the reinforcing fibers between the respective prepreg base materials in the prepreg laminate is preferably 40° or less and more preferably 100 or less. It is easier to control the angular relation between the direction orthogonal to the moving direction of the material (A) and the fiber axis directions of the reinforcing fibers in the respective prepreg base materials in the step (ii) as the deviation of the fiber axis directions of the reinforcing fibers between the respective prepreg base materials is smaller.

The number of prepreg base materials laminated in the prepreg laminate is preferably from 2 to 16 and more preferably from 4 to 12. It is likely to obtain a fiber-reinforced plastic exhibiting sufficient mechanical properties when the number of prepreg base materials laminated is equal to or larger than the lower limit value. The laminating work is facilitated and the productivity is excellent when the number of prepreg base materials laminated is equal to or smaller than the upper limit value.

The thickness of the material (A) is preferably from 0.25 to 6.0 mm, more preferably from 0.4 to 6.0 mm, and still more preferably from 0.5 to 4.0 mm. It is likely to obtain a fiber-reinforced plastic exhibiting sufficient mechanical properties when the thickness of the material (A) is equal to thicker than the lower limit value. When the thickness of the material (A) is equal to or thinner than the upper limit value, the fiber axis directions of the reinforcing fibers in the material (A) are more likely to be randomized by pressing in the step (ii) to be described later and it is likely to obtain a fiber-reinforced plastic exhibiting excellent isotropy of mechanical properties and small variations in mechanical properties.

(Step (ii))

In the step (ii), the material (A) is pressed in a state of being heated to a temperature T equal to or higher than the melting point of the matrix resin or equal to or higher than the glass transition temperature of the matrix resin when the matrix resin does not have a melting point while moving the material (A) in one direction by using a pressing device capable of pressing the material (A) in the thickness direction so that pressing is substantially uniformly conducted over the direction orthogonal to the moving direction of the material (A).

In the step (ii), the fiber axis direction of the reinforcing fiber in the material (A) is set to intersect the moving direction of the material (A) at the time of pressing by the pressing device. Moreover, the angles formed by the fiber axis directions of all the reinforcing fibers with respect to the direction orthogonal to the moving direction of the material (A) are set to from −20° to 20°. By this, the reinforcing fibers cut by the cuts flow together with the matrix resin and the fiber axis directions of the reinforcing fibers change to various directions. As a result, the fiber axis directions of the reinforcing fibers in the material (A) are randomized.

In the step (ii), the angle φ formed by the direction orthogonal to the moving direction of the material (A) and the fiber axis directions of the reinforcing fibers in the material (A) is from −20° to 20° and preferably from −5° to 5°. The fiber axis directions of the reinforcing fibers are more likely to be randomized when the angle φ is in the above range.

The angle φ formed by the direction orthogonal to the moving direction of the material (A) and the fiber axis direction of the reinforcing fiber is an angle formed by the direction orthogonal to the moving direction of the material (A) when pressing the material (A) while moving the material (A) in the step (ii) and the fiber axis direction of the reinforcing fiber in the prepreg base material of the material (A). The angle φ takes the anticlockwise rotation of the material (A) in a planar view when viewed from above as the positive and the clockwise rotation thereof as the negative.

In the case of using a pressing device which is equipped with at least a pair of press rolls and in which the axial direction of the roll coincides with the direction orthogonal to the moving direction of the material (A) as the pressing device in the step (ii), the angle φ coincides with the angle formed by the axial direction of the press roll and the fiber axis direction of the reinforcing fiber in the prepreg base material of the material (A).

The temperature T is a temperature equal to or higher than the melting point of the matrix resin impregnated into the prepreg base material or equal to or higher than the glass transition temperature of the matrix resin when the matrix resin does not have a melting point. In a case in which the material (A) contains two or more kinds of matrix resins, the temperature T is one based on the highest temperature among the melting points or glass transition temperatures of the matrix resins.

The temperature T varies depending on the kind of the matrix resin, but it is preferably from 150° C. to 450° C. and more preferably from 200° C. to 400° C. as long as the matrix resin melts. When the temperature T is in the above range, the reinforcing fiber is likely to flow together with the matrix resin and a fiber-reinforced plastic exhibiting excellent isotropy of mechanical properties and small variations in mechanical properties is likely to be obtained.

In the step (ii), the material (A) may be preheated before heating the material (A) to the temperature T. In the case of conducting preheating, the temperature for preheating is preferably from 150° C. to 400° C. and more preferably from 200° C. to 380° C. In the stage of preheating, the matrix resin in the material (A) may be melted or not melted.

The method for preheating the material (A) is not particularly limited, and examples thereof may include a method using an IR heater, a circulating hot air oven, or the like.

The linear pressure when pressing the material (A) is preferably from 3 to 200 N/m, more preferably from 5 to 150 N/m, still more preferably from 10 to 100 N/m, and yet still more preferably from 15 to 50 N/m. It is likely to obtain a fiber-reinforced plastic exhibiting excellent isotropy of mechanical properties and small variations in mechanical properties when the linear pressure is in the above range.

The time for pressing the material (A) is preferably from 0.05 to 30 minutes and more preferably from 0.1 to 10 minutes. The time for pressing can be adjusted by the moving speed of the material (A), the number of sets of press rolls to be used in the case of using a pressing device equipped with a press roll as to be described later, and the like.

The fiber-reinforced plastic to be obtained can exhibit mechanical properties excellent in isotropy when the linear pressure, time, and temperature T when pressing the material (A) in the step (ii) are controlled.

The moving speed of the material (A) in the step (ii) is preferably from 0.1 to 25 m/min, more preferably from 0.2 to 20 m/min, and still more preferably from 0.5 to 15 m/min. The productivity increases when the moving speed of the material (A) is equal to or higher than the lower limit value. It is likely to obtain a fiber-reinforced plastic exhibiting excellent isotropy of mechanical properties and small variations in mechanical properties when the moving speed of the material (A) is equal to or lower than the upper limit value.

As the step (ii), a step (ii-1) of pressing the material (A) in the state of being heated to the temperature T while moving the material (A) in one direction by a pressing device which is equipped with at least a pair of press rolls and in which the axial direction of the roll is the direction orthogonal to the moving direction of the material (A) is preferable.

Figure 3:
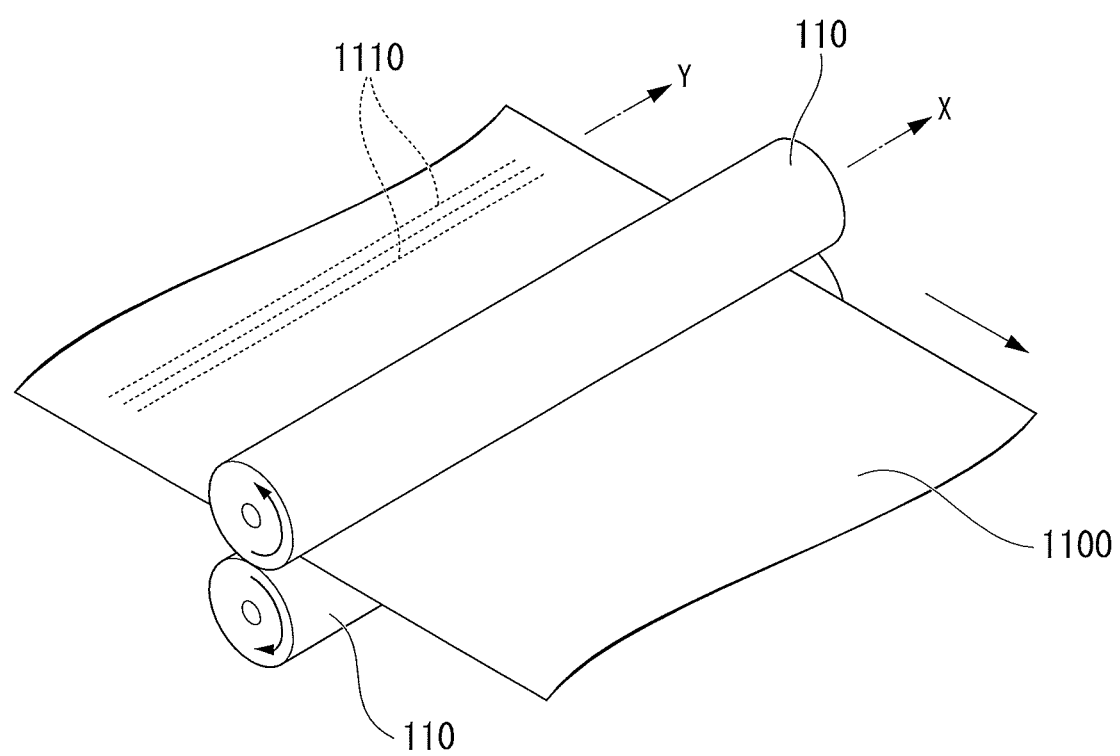
FIG. 3 is a perspective view illustrating a situation in which a material (A) is pressed by a pair of press rolls.

In the step (ii-1), the axial direction of a pair of press rolls 110 coincides with a direction X orthogonal to the moving direction of the material (A) as illustrated in FIG. 3. A material (A) 1100 is pressed in the state of being heated to the temperature T while moving the material (A) 1110 in one direction by the pair of press rolls 110. At this time, the material (A) 1100 is pressed so that a fiber axis direction Y of a reinforcing fiber 1110 in the material (A) 1100 intersects the moving direction of the material (A) 1100.

In the pair of press rolls, the axial directions of the upper and lower press rolls coincide with each other.

As the method for heating the material (A) to the temperature T in the step (ii-1), it is preferable to press the material (A) while heating the material (A) by using a heating roll as the press roll.

A press roll which does not have a heating function may be used in a case in which it is possible to ensure a state in which the material (A) is heated to the temperature T when being pressed by the press roll only by heating the material (A) before pressing. In addition, preheating may not be conducted in the case of being able to heat the material (A) to the temperature T only by using a heating roll to be used as the press roll.

In step (ii-1), a pair of press rolls may be used only in one stage or in two or more stages. In the case of providing the press rolls paired by an upper press roll and a lower press roll or in two or more stages in the step (ii-1), the axial directions of all the press rolls are set to coincide with the direction X orthogonal to the moving direction of the material (A).

In the step (ii-1), it is preferable to use a double belt hot press in which the material (A) is sandwiched by at least a pair of belts and heated while being moved so as to pass between at least a pair of press rolls and pressed by at least the pair of press rolls. In this case, it is preferable to dispose a release paper or a release film between the material (A) and the belt or to subject the belt surface to a release treatment in advance. The material for the belt is not particularly limited, and a metal is preferable from the viewpoint of heat resistance and durability.

Incidentally, the step (ii-1) is not limited to the aspect using the double belt hot press. For example, the aspect may be an aspect in which a band-like material (A) is pressed by a pair of press rolls while being moved without being sandwiched between a pair of belts.

The step (ii) is not limited to the aspect using a pressing device equipped with at least a pair of press rolls. For example, the aspect may be an aspect in which pressing is conducted by using a pressing device which presses the material (A) by a flat surface and a press roll, a pressing device by a press plate which presses the material (A) by a flat surface and a flat surface, or a pressing device equipped with a plurality of spherical presses.

(Step (iii))

In the step (iii), the material (A) pressed by the pressing device in the step (ii) is cooled to obtain a fiber-reinforced plastic. In a case in which the matrix resin is a thermoplastic resin, the temperature of the material (A) is lowered to a temperature lower than the melting point of the matrix resin or the glass transition temperature of the matrix resin when the matrix resin does not have a melting point and solidified to obtain a fiber-reinforced plastic.

In the case of using a prepreg laminate as the material (A), the fiber-reinforced plastic to be obtained has a sheet shape in which the respective prepreg base materials are bonded to each other and integrated. Hence, it is easy to handle the fiber-reinforced plastic to be obtained in the case of using a prepreg laminate as well.

The method for cooling the material (A) is not particularly limited, and examples thereof may include a method using a hot water roll. A method in which the material (A) is cooled by being left to cool may be adopted.

The time for cooling is preferably from 0.5 to 30 minutes.

EXAMPLE OF EMBODIMENT

Figure 4:
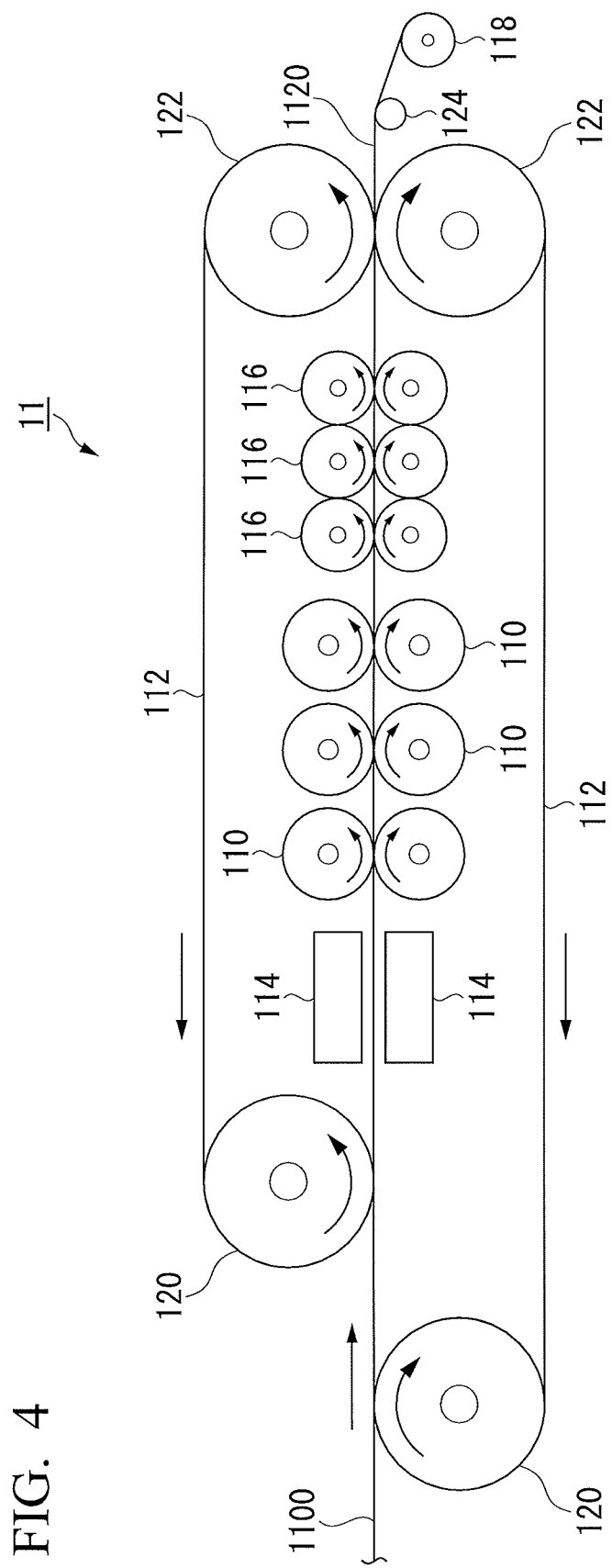
FIG. 4 is a schematic view illustrating an example of a double belt hot press.

Hereinafter, an example in which a double belt hot press 11 (hereinafter, simply referred to as a hot press 11) illustrated in FIG. 4 is used will be described as an example of the aspect to perform the step (ii-1) and the step (iii). Incidentally, the aspect to perform the step (ii) and the step (iii) is not limited to the aspect using the hot press 11.

The hot press 11 includes a pair of belts 112 to move the band-like material (A) 1100 in one direction in a state of sandwiching the band-like material (A) 1100 from above and below, a pair of IR heaters 114 to preheat the material (A) 1100, three stages of a pair of press rolls 110 to insert and press the preheated material (A) 1100 from above and below, three stages of a pair of hot water rolls 116 to insert and cool the material (A) 1100 pressed by the press roll 110 from above and below, and a winding roll 118 to wind the cooled and solidified fiber-reinforced plastic 1120.

The pair of press rolls 110 press the material (A) 1100 while rotating the material (A) 1100 passing therebetween in a direction to send the material (A) 1100 to the downstream side. In the hot press 11, the axial direction of the pair of press rolls 110 coincides with the direction orthogonal to the moving direction of the material (A) 1100 to be supplied. The pair of hot water rolls cools the material (A) 1100 while rotating the material (A) 1100 passing therebetween in a direction to send the material (A) 1100 to the downstream side.

The pair of belts 112 are each installed to be wrapped around a drive roll 120 equipped on the upstream side of the IR heater 114 and a flower roll 122 equipped on the downstream side of the hot water roll 116 and rotated by the drive roll 120. The material (A) 1100 moves as the pair of belts 112 rotate in a state of sandwiching the material (A) 1100.

In the aspect using this hot press 11, the band-like material (A) 1100 is continuously supplied to the hot press 11 so that the fiber axis direction of the reinforcing fiber in the material (A) 1100 intersects the moving direction of the material (A) 1100 as the step (ii-1). Specifically, the band-like material (A) 1100 in which the fiber axis direction of the reinforcing fiber intersects the machine direction is continuously supplied to the hot press 11 in the machine direction. The angle φ formed by the direction orthogonal to the moving direction of the material (A) 1100 and the fiber axis direction of the reinforcing fiber in the material (A) 1100 is set to from −20° to 20°.

In the hot press 11, the material (A) 1100 is preheated by the IR heater 114 and pressed in the state of being heated to the temperature T by the press roll 110 while being moved so that the material (A) 1100 passes between the pair of press rolls 110 in the state of being sandwiched between the pair of belts 112. By this, the matrix resin and the reinforcing fiber flow in the material (A) 1100 and the fiber axis directions of the reinforcing fibers are randomized.

In this example, it is preferable to heat the material (A) 1100 to the temperature T and, at the same time, to press the material (A) 1100 by using a heating roll as the press roll 110. Incidentally, only pressing may be conducted without heating the material (A) 1100 by the press roll 110 in a case in which the material (A) 1100 can be pressed by the press roll 110 in the state of being heated to the temperature T only through preheating by the IR heater 114.

Next, as the step (iii), the material (A) 1100 pressed by the press roll 110 is moved so as to pass between the pair of hot water rolls 116 in the state of being sandwiched between the pair of belts 112 and thus cooled by the hot water roll 116 to obtain the band-like fiber-reinforced plastic 1120.

The fiber-reinforced plastic 1120 obtained is separated from the pair of belts 112 on the downstream side of the flower roll 122 and then wound around the winding roll 118 via a guide roll 124.

The double belt hot press such as the hot press 11 is advantageous in that a series of steps from heating and pressing to cooling of the material (A) can be easily performed.

(Effect)

As described above, in the production method according to the first invention, the material (A) containing the prepreg base material in which the region (B) and the region (C) are alternately formed in the direction orthogonal to the fiber axis of the reinforcing fiber is used. Moreover, the material (A) is substantially uniformly pressed in the direction orthogonal to the moving direction of the material (A) while being moved so that the fiber axis direction of the reinforcing fiber intersects the orthogonal direction at a specific angle. By this, the fiber axis directions of the reinforcing fibers are uniformly randomized over the entire material (A) and a fiber-reinforced plastic which exhibits excellent mechanical properties such as strength, excellent isotropy thereof, and small variations due to location and direction and hardly causes swelling and warpage is thus obtained. In addition, the fiber-reinforced plastic to be obtained also exhibits excellent heat resistance since the reinforcing fibers are uniformly dispersed in the matrix resin and the cuts are also disappeared by the flow of the reinforcing fibers and the matrix resin.

In the first invention, the following factor is considered as the factor to favorably randomize the fiber axis directions of the reinforcing fibers. In the step (ii), the directions in which the reinforcing fibers easily flow are opposite to each other in the region (B) formed by the cuts (b) with a downward left shoulder and the region (C) formed by the cuts (c) with a downward right shoulder in a planar view. Hence, it is considered that the flow of the reinforcing fibers in the step (ii) is more complicated and irregular in the entire material (A) as the region (B) and the region (C) are alternately formed in the direction orthogonal to the fiber axis of the reinforcing fiber. It is considered that a fiber-reinforced plastic having more random fiber axis directions of reinforcing fibers is obtained by this.

In addition, by the method of the first invention, it is possible to produce a fiber-reinforced plastic exhibiting excellent mechanical properties and excellent isotropy thereof even when using the material (A) in which the fiber axis directions of the reinforcing fibers in the prepreg base material are biased in a specific range. Hence, the production is easy and it is also advantageous from the viewpoint of cost as it is not required to respectively produce prepreg base materials having different fiber axis directions of reinforcing fibers in the case of continuously producing a long fiber-reinforced plastic. In addition, it is not required to laminate the prepreg base materials while rotating the respective prepreg base materials at a predetermined rotation angle at all times so that the fiber axis directions of the reinforcing fibers are not biased in the case of producing a sheet-like fiber-reinforced plastic as well. Hence, the operation to laminate the prepreg base material is easy even in the case of using a prepreg laminate, the control is also easy, and it is also advantageous from the viewpoint of cost.

In addition, the fiber-reinforced plastic obtained by the production method of the first invention has the reinforcing fiber cut by the cuts formed on the prepreg base material and thus exhibits high fluidity at the time of shaping and can be suitably used in the production of a structural material having a complicated shape such as a three-dimensional shape.

It is possible to obtain a structural material which exhibits excellent mechanical properties, excellent isotropy thereof, small variations, and excellent heat resistance by shaping the fiber-reinforced plastic obtained by the production method of the first invention.

Incidentally, the production method of the first invention is not limited to the method using the hot press 11 described above. For example, the production method may be a method in which a sheet-like material (A) is supplied to a double belt hot press to produce a sheet-like fiber-reinforced plastic. In addition, the production method may be a method in which a plurality of a sheet-like material (A) is continuously supplied to a double belt hot press and these materials (A) are joined together in the moving direction to produce a long fiber-reinforced plastic.

In addition, the production method may be a method in which the material (A) is not preheated in the step (ii-1). In addition, the production method may be a method in which a double belt hot press equipped with two or more pairs of belts is used. In addition, the production method may be a method in which the step (ii-1) and the step (iii) are performed while moving the band-like material (A) as it is without sandwiching it between the belts in the case of continuously producing a band-like fiber-reinforced plastic and the like. In addition, the production method may be a method in which a device dedicated to preheating, a device dedicated to pressing, and a device dedicated to cooling are respectively used.

[Fiber-Reinforced Plastic]

The fiber-reinforced plastic of the first invention contains a reinforcing fiber and a matrix resin, and the wound diameter D (m) when the fiber-reinforced plastic is wound around a core material having a diameter of 0.091 m at a winding torque of 40 N·m by a length of 10 in satisfies a condition of the following Equation (a1).

The fiber-reinforced plastic of the first invention can be produced by the method for producing a fiber-reinforced plastic of the first invention described above.

[Math. 1]

$$1.0 < \frac{D}{\sqrt{\frac{4LW}{\pi\rho} + d^2}} < 1.5 \qquad (a1)$$

Where the symbols in Equation (a1) have the following meanings:

d: diameter (m) of core material,
W: weight per unit area (g/m$^2$) of fiber-reinforced plastic,
ρ: true density (g/m$^3$) of fiber-reinforced plastic, and
L: wound length (m) of fiber-reinforced plastic.

The wound diameter D (mm) means the outer diameter of a wound product obtained by winding the fiber-reinforced plastic around a core material and is the sum of the diameter of the core material and the thickness of the portion at which the fiber-reinforced plastic is wound in the wound product.

Hereinafter, $\{(4 \, LW/\pi\rho)+d^2\}^{1/2}$ is described as K.

The wound diameter D in the fiber-reinforced plastic of the first invention is 1.0<D/K<1.5, preferably 1.0<D/K≤1.35, and more preferably 1.0<D/K≤1.2. The swelling and warpage of the fiber-reinforced plastic decrease as the wound diameter D is smaller in the above range.

The average fiber length of the reinforcing fibers is from 1 to 100 mm, preferably from 3 to 70 mm, more preferably from 5 to 50 mm, still more preferably from 10 to 50 mm, and particularly preferably from 10 to 35 mm. It is likely to obtain required mechanical characteristics when the average fiber length of the reinforcing fibers is equal to or longer than the lower limit value. It is likely to obtain the fluidity required at the time of shaping when the average fiber length of the reinforcing fibers is equal to or shorter than the upper limit value.

(Method for Measuring Average Fiber Length)

The resin in the fiber-reinforced plastic is burnt off, only the reinforcing fiber is taken out, and the fiber length of the reinforcing fiber is measured by using a caliper or the like. The measurement is conducted for 100 randomly selected reinforcing fibers and the average fiber length is calculated as the average mass thereof.

The reinforcing fiber and matrix resin constituting the fiber-reinforced plastic of the first invention are as described in the method for producing a fiber-reinforced plastic described above.

The volume fraction (Vf) of the reinforcing fiber in the fiber-reinforced plastic is preferably from 5% to 70% by volume, more preferably from 10% to 60% by volume, and still more preferably from 15% to 50% by volume. A decrease in interface strength due to a decrease in toughness hardly occurs and the fluidity at the time of shaping hardly decreases when the Vf of the reinforcing fiber is equal to or lower than the upper limit value. It is likely to obtain mechanical characteristics required as a fiber-reinforced plastic when the Vf of the reinforcing fiber is equal to or higher than the lower limit value.

Incidentally, the Vf value in the fiber-reinforced plastic means the proportion of the reinforcing fiber to the total volume of other components such as additives excluding the reinforcing fiber, the matrix resin, and the void (gas) in the fiber-reinforced plastic. The Vf value measured based on JIS K7075 is a value which fluctuates depending on the abundance of voids in the fiber-reinforced plastic, and a volume fraction of fiber which does not depend on the abundance of voids is thus adopted in the invention.

Additives such as a non-fibrous filler, a flame retardant, a pigment, a release agent, a plasticizer, and a surfactant may be blended into the fiber-reinforced plastic of the first invention as long as the object of the first invention is not impaired.

The thickness of the fiber-reinforced plastic of the first invention is preferably from 0.25 to 6.0 mm, more preferably from 0.4 to 6.0 mm, and still more preferably from 0.5 to 4.0 mm. The matrix resin hardly bulge outs at the time of pressing in the step (ii) and it is easy to control the thickness when the thickness is equal to or thinner than the upper limit value. The shear stress is likely to be applied at the time of pressing in the step (ii) and the reinforcing fibers are more easily randomized when the thickness is equal to or thicker than the lower limit value.

Preferred aspects of the degree of orientation pf, elliptic divergence coefficient ec, and dispersion parameter dp in the fiber-reinforced plastic of the first invention are the same as those of the second invention to be described later.

<Second Invention>

The fiber-reinforced plastic of the second invention for achieving the second object is a fiber-reinforced plastic containing reinforcing fibers having an average fiber length of from 1 to 100 mm and a matrix resin.

The reinforcing fiber to be used in the second invention is not particularly limited, and examples thereof may include those mentioned in the first invention, and preferred aspects thereof are also the same.

The average fiber length of the reinforcing fibers is from 1 to 100 mm, preferably from 3 to 70 mm, more preferably from 5 to 50 mm, still more preferably from 10 to 50 mm, and particularly preferably from 10 to 35 mm.

The average fiber diameter of the reinforcing fibers is preferably from 1 to 50 μm and more preferably from 5 to 20 μm.

The matrix resin may be a thermoplastic resin or a thermosetting resin. One kind of matrix resin may be used singly or two or more kinds thereof may be used concurrently.

As the matrix resin, a thermoplastic resin is preferable for the same reason as in the first invention.

The thermoplastic resin is not particularly limited, and examples thereof may include those mentioned in the first invention, and preferred aspects thereof are also the same. One kind of thermoplastic resin may be used singly, two or more kinds thereof may be used concurrently, or two or more kinds thereof may be used as a polymer alloy.

The thermosetting resin is not particularly limited, and examples thereof may include those mentioned in the first invention, and preferred aspects thereof are also the same. One kind of thermosetting resin may be used singly or two or more kinds thereof may be used concurrently.

Additives the same as those mentioned in the first invention may be blended into the fiber-reinforced plastic of the second invention according to the characteristics required to the intended structural material.

(Viscoelastic Property Tan δ)

The fiber-reinforced plastic of the second invention has tan δ (ave) of from 0.01 to 0.25 and tan δ (max)−tan δ (ave) of from 0.15 or more. It is possible to achieve both excellent fluidity at the time of shaping and excellent mechanical properties of the structural material to be obtained after shaping as tan δ (ave) and tan δ (max)−tan δ (ave) respectively satisfy the above ranges.

"Tan δ (ave)" is the average value of the viscoelastic property tan δ of the fiber-reinforced plastic in a temperature range of from T−30 (° C.) to T−10 (° C.) (where T is the melting point of the matrix resin or the glass transition temperature of the matrix resin when the matrix resin does not have a melting point).

"Tan δ (max)" is the maximum value of the viscoelastic property tan δ in a temperature range of from T−10 (° C.) to T+10 (° C.).

The viscoelastic property tan δ is expressed by the following Equation (b1).

$$\text{Tan } \delta = G''/G' \tag{b1}$$

(where (G″) is the loss modulus of elasticity and G′ is the storage modulus of elasticity).

The tan δ (ave) of the fiber-reinforced plastic of the second invention is from 0.01 to 0.25, preferably from 0.02 to 0.20, and more preferably from 0.03 to 0.15. In a case in which tan δ (ave) is extremely low (close to zero), it means that the fiber-reinforced plastic is close to a perfect elastic body and the properties thereof are far from a plastic material, and the mechanical characteristics and fluidity as a plastic material cannot be expected. However, a fiber-reinforced plastic exhibiting mechanical characteristics and flow characteristics in a good balanced is obtained when tan δ (ave) is equal to or greater than the lower limit value. A structural material exhibiting excellent mechanical properties can be produced when tan δ (ave) is equal to or smaller than the upper limit value.

Tan δ (max)–tan δ (ave) of the fiber-reinforced plastic of the second invention is 0.15 or more, preferably 0.25 or more, and more preferably 0.35 or more. When tan δ (max)–tan δ (ave) is equal to or greater than the lower limit value, excellent fluidity is obtained at the time of shaping and it is thus possible to suppress that the reinforcing fiber is cut at the time of shaping and the mechanical properties of the structural material thus decrease.

When tan δ (max)–tan δ (ave) is extremely great, that is, tan δ (max) is extremely great, only the matrix resin flows at the time of shaping and the reinforcing fiber does not follow the flow of the matrix resin. From this viewpoint, tan δ (max)–tan δ (ave) of the fiber-reinforced plastic of the second invention is preferably 1.5 or less and more preferably 0.9 or less.

Tab δ of the fiber-reinforced plastic decreases as the dispersibility of the reinforcing fiber increases. Tan δ of the fiber-reinforced plastic can be adjusted, for example, by adjusting the clearance between the belts at the time of pressing in the method for producing a fiber-reinforced plastic to be described later. There is a tendency that the dispersibility of the reinforcing fiber in the fiber-reinforced plastic is further improved and tan δ further decreases as the clearance is narrower. In addition, the value of tan δ (max)–tan δ (ave) can be adjusted, for example, by adjusting the volume fraction (Vf) of the reinforcing fiber in the fiber-reinforced plastic. Tan δ (max) tends to decrease as Vf in the fiber-reinforced plastic increases.

In addition, the entanglement of the reinforcing fibers with one another and friction between the reinforcing fibers in the fiber-reinforced plastic also affect tan δ (max), and tan δ (max) tends to decrease as these entanglement and friction increase.

The volume fraction (Vf) of the reinforcing fiber in the fiber-reinforced plastic of the second invention is preferably from 5% to 70% by volume, more preferably from 10% to 60% by volume, and still more preferably from 15% to 50% by volume. A decrease in interface strength due to a decrease in toughness hardly occurs and the fluidity at the time of shaping hardly decreases when the Vf of the reinforcing fiber is equal to or lower than the upper limit value. It is likely to obtain mechanical properties required as a fiber-reinforced plastic when the Vf of the reinforcing fiber is equal to or higher than the lower limit value.

(Degree of Orientation Pf)

The degree of orientation pf of the reinforcing fiber in the direction orthogonal to the thickness direction in the fiber-reinforced plastic of the second invention is preferably from 0.001 to 0.8. pf is an index representing the orientated state of the reinforcing fiber in the direction orthogonal to the thickness direction in the fiber-reinforced plastic. The fact that pf is "0" means that the reinforcing fiber is oriented in an ideal state in the direction orthogonal to the thickness direction of the fiber-reinforced plastic. It indicates that the degree of disturbance of the reinforcing fiber toward the outer direction of the plane orthogonal to the thickness direction is higher as the value of pf is greater.

It is more difficult to obtain the fluidity at the time of shaping by the entanglement of the reinforcing fibers with one another and the friction between the reinforcing fibers as the value of pf is greater although it also depends on the fiber length of the reinforcing fiber. In other words, the entanglement of the reinforcing fibers with one another and the friction between the reinforcing fibers are more likely to occur and it is more difficult to obtain fluidity at the time of shaping as the reinforcing fiber is further disturbed toward the outer direction of the plane orthogonal to the thickness direction. In a case in which the average fiber length of the reinforcing fibers is from 1 mm to 100 mm, it is likely to obtain excellent fluidity at the time of shaping and a structural material exhibiting excellent mechanical properties when pf is 0.8 or less. The lower limit value of pf is not particularly limited in terms of the physical properties of the fiber-reinforced plastic. However, it is difficult to set pf to 0, and a value of 0.001 or more is a realistic value. The upper limit value of pf is preferably 0.5, more preferably 0.3, and still more preferably 0.15.

(Method for Measuring Pf)

Figure 5:
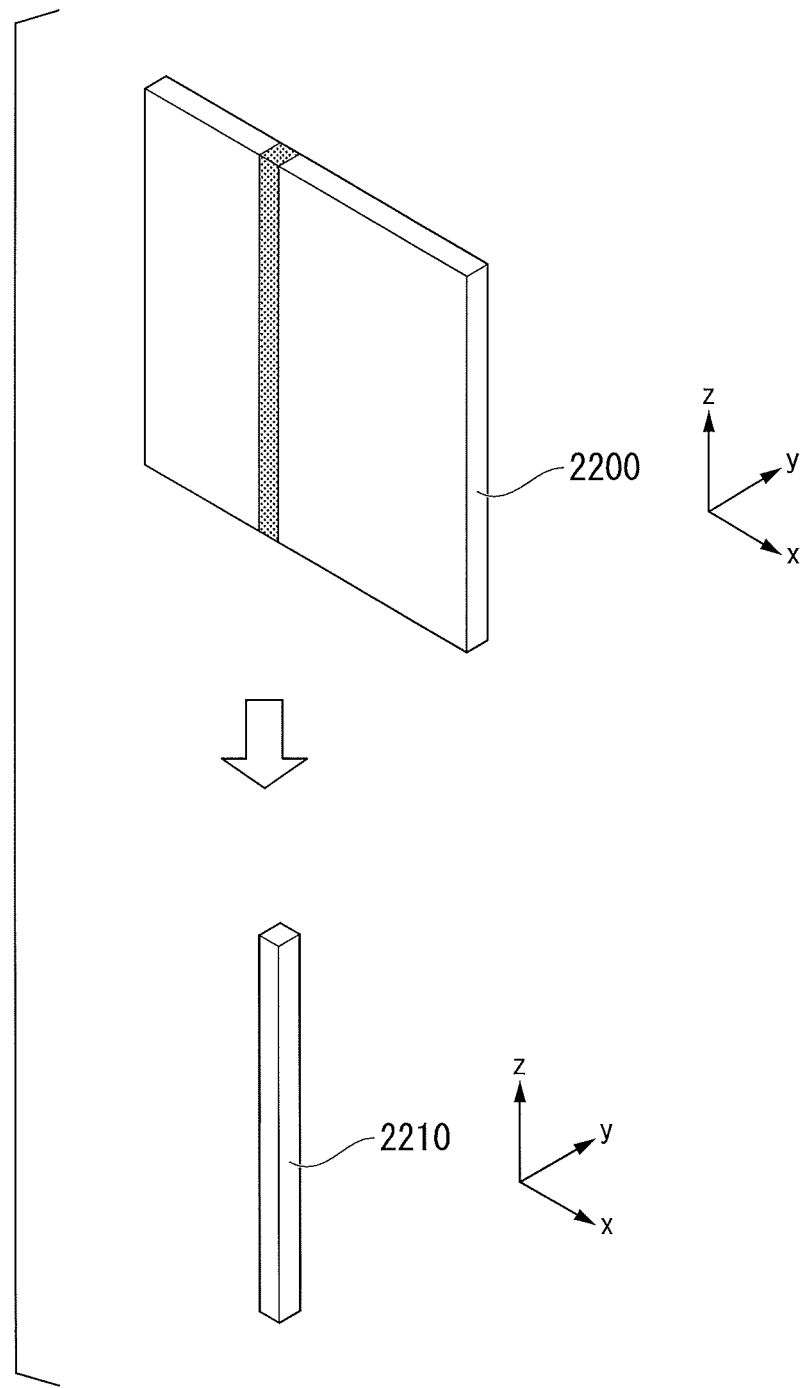
FIG. 5 is a schematic view illustrating a step in a method for measuring the degree of orientation pf.

As illustrated in FIG. 5, a measurement sample 2210 having a width of 2 mm is cut out from a fiber-reinforced plastic 2200 having a thickness of 2 mm, and the measurement is conducted as follows.

The width direction of the measurement sample 2210 is defined as the x direction, the thickness direction thereof is defined as the y direction, and the length direction thereof is defined as the z direction.

<Actually Measured Integral Value in x Direction>

A one-dimensional orientation profile derived from diffraction of the 002 plane of graphite is obtained by irradiating the measurement sample 2210 with X-rays in the x direction. A one-dimensional orientation profile derived from diffraction of the 002 plane of graphite can be obtained by capturing an image by using a two-dimensional detector and then obtaining a profile in the circumferential direction at the 002 diffraction portion by using analysis software. In addition, a one-dimensional orientation profile derived from diffraction of the 002 plane of graphite is obtained by fixing the detector at the 002 diffraction and rotating the sample by 360° in the case of a one-dimensional detector.

Subsequently, an actually measured integral value Sx in the x direction is calculated from the one-dimensional orientation profile thus obtained by the following Equation (b2).

[Math. 3]

$$Sx = \int_0^{2\pi} I(\delta)d\delta \quad (b2)$$

In Equation (b2), $I(\delta)$ is the intensity at the azimuth angle δ based on the z direction on the yz plane in the one-dimensional orientation profile.

Sx takes the maximum value when the reinforcing fiber is completely oriented in the x direction. The value of Sx decreases as the reinforcing fiber has an inclination with respect to the x direction. The factors which decrease Sx include a component in the thickness direction in the inclination of the reinforcing fiber with respect to the x direction and a component in the plane orthogonal to the thickness direction. In other words, both of the component in the yz plane and the component in the xz plane in the inclination of the reinforcing fiber with respect to the x direction cause a decrease in Sx. The degree of disturbance of the reinforcing fiber toward the outer direction of the plane orthogonal to the thickness direction is evaluated by pf, and the following operation is thus conducted in order to remove the influence of the component in the xz plane in the inclination of the reinforcing fiber.

<Predicted Integral Value in x Direction>

A one-dimensional orientation profile derived from diffraction of the 002 plane of graphite is obtained by irradiating the measurement sample 2210 with X-rays in the y direction. Subsequently, $I(\psi)$ is normalized by the following Equation (b3) and the fiber proportion $G(\psi)$ at the azimuth angle $\psi$ is calculated.

[Math. 4]

$$G(\psi) = \frac{I(\psi)}{\int_0^{2\pi} I(\psi)d\psi} \quad (b3)$$

In Equation (b3), $I(\psi)$ is the intensity at the azimuth angle $\psi$ based on the z direction on the xz plane in the one-dimensional orientation profile.

Subsequently, the predicted integral value F in the x direction is calculated by the following Equation (b4).

[Math. 5]

$$F = 2\frac{Va}{Vb} \int_0^{\pi} G(\psi)A(\psi)d\psi \quad (b4)$$

Where Va is the volume fraction (Vf) of the reinforcing fiber in the measurement sample 2210. Vb is the volume fraction (Vf) of the reinforcing fiber in the standard sample for correction to be described later. $A(\psi)$ is an intensity correction coefficient.

The intensity correction coefficient $A(\psi)$ is obtained as follows.

As the standard sample for correction, a UD material which has a thickness of 2 mm and in which reinforcing fibers are pulled and aligned in one direction so as to be completely oriented in the z direction is fabricated, and this is used as a 0° material. The reinforcing fiber and matrix resin to be used in the standard sample are the same kinds as those in the measurement sample 2210. Va which is the volume fraction (Vf) of the reinforcing fiber in the measurement sample 2210 and Vb which is the volume fraction (Vf) of the reinforcing fiber in the standard sample for correction may be the same as or different from each other.

Subsequently, as another standard sample, a 15° material is fabricated in the same manner as the 0° material except that the reinforcing fibers are pulled and aligned in one direction so that the azimuth angle $\psi$ is completely oriented in the direction of 15°. In the same manner, a 30° material, a 45° material, a 60° material, a 75° material, and a 90° material in which reinforcing fibers are pulled and aligned in one direction so that the azimuth angle $\psi$ is completely oriented in the direction of 30°, 45°, 60°, 75°, and 90°, respectively, are fabricated.

Subsequently, a standard measurement sample having a width of 2 mm is cut out from each standard sample in the same manner as the measurement sample 2210. A one-dimensional orientation profile derived from diffraction of the 002 plane of graphite is obtained by irradiating the standard measurement sample 2210 with X-rays in the x direction. In the one-dimensional orientation profile of the standard measurement sample derived from the 90° material, the intensity is a substantially constant value.

From the one-dimensional orientation profile of each standard measurement sample, the integral value $S(\psi)$ of the intensity $I(\psi, \delta)$ of the material having an azimuth angle $\psi$ is calculated by the following Equation (b5).

[Math. 6]

$$S(\psi) = \int_0^{2\pi} I(\psi,\delta)d\delta \quad (b5)$$

Where $I(\psi, \delta)$ is the intensity at the azimuth angle $\delta$ for the standard measurement sample having an azimuth angle $\psi$.

In the integral value $S(\psi)$, there is relation of $S(\psi)=S(\pi-\psi)$. $\psi$ is plotted on the horizontal axis and $S(\psi)$ is plotted on the vertical axis, and one approximating to the normal distribution in a $\psi$ range of from 0° to 180° is taken as the intensity correction coefficient $A(\psi)$ at the azimuth angle $\psi$.

<Predicted Integrated Intensity of Correction in x Direction>

The predicted integral value F in the x direction and the actually measured integral value Sx do not always coincide with each other. Hence, the integral value correction coefficient B(Sx) is calculated by using the standard sample.

A standard measurement sample is cut out from each standard sample in the same manner as in the calculation of the intensity correction coefficient $A(\psi)$. For each standard measurement sample, the actually measured integral value $Sx(\alpha)$ is calculated by the method for calculating the actually measured integral value in the x direction described above. Incidentally, $\alpha$ is 0°, 15°, 30°, 45°, 60°, 75°, and 90°. For each standard measurement sample, the predicted integral value $F(\alpha)$ in the x direction is determined by the method for calculating the predicted integral value in the x direction described above. There is a high correlation when $Sx(\alpha)$ is plotted on the horizontal axis and $Sx(\alpha)/F(\alpha)$ is plotted on the vertical axis, and linearly approximating one is taken as the integral value correction coefficient B(Sx).

The predicted integral value F in the x direction is multiplied by the integral value correction coefficient B(Sx) to take as the predicted integral intensity F' of correction in the x direction.

<Calculation of Pf> pf is calculated by the following Equation (b6).

[Math. 7]

$$pf = \left|\frac{F'}{Sx} - 1\right| \quad (b6)$$

(Elliptic Divergence Coefficient Ec)

The elliptic divergence coefficient ec in the orientation profile of the reinforcing fiber on the plane orthogonal to the thickness direction in the fiber-reinforced plastic of the second invention is preferably from $1\times10^{-5}$ to $9\times10^{-5}$. ec is an index representing the dispersibility of the reinforcing fiber in the two-dimensional orientation on the plane orthogonal to the thickness direction in the fiber-reinforced plastic of the second invention. ec is the divergence coefficient from the approximate ellipse of the orientation profile described above.

In a fiber-reinforced plastic in which reinforcing fibers are randomly oriented, it means that the variation in the mechanical properties is greater as ec is greater. The variation in mechanical properties is likely to be suppressed when ec is $9\times10^{-5}$ or less. cc in the fiber-reinforced plastic of the invention is preferably $8.5\times10^{-5}$ or less and more preferably $8\times10^{-5}$ or less.

A preferred lower limit value of ec is not particularly limited in terms of the mechanical properties of the fiber-reinforced plastic. However, the difficulty in producing the fiber-reinforced plastic having a smaller ec value increases, for example, as the fiber length of the reinforcing fiber is longer. The mechanical properties are improved when the fiber length of the reinforcing fiber is increased, but the value of ec tends to increase in association with it, and the variation in mechanical properties increases. When the balance between mechanical properties and variations thereof are taken into consideration, a preferred lower limit value of ec according to the average fiber length of the reinforcing fibers to be realistic from the viewpoint of production is as follows. ec is preferably $1\times10^{-5}$ or more in a case in which the average fiber length of the reinforcing fibers is from 1 to 3 mm. ec is preferably $1.5\times10^{-5}$ or more in a case in which the average fiber length of the reinforcing fibers is more than 3 mm and 10 mm or less. ec is preferably $2\times10^{-5}$ or more in a case in which the average fiber length of the reinforcing fibers is more than 10 mm and 35 mm or less. ec is preferably $3\times10^{-5}$ or more in a case in which the average fiber length of the reinforcing fibers is more than 35 mm and 70 mm or less. ec is preferably $4\times10^{-5}$ or more in a case in which the average fiber length of the reinforcing fibers is more than 70 mm and 100 mm or less.

(Method for Measuring Ec)

The profile of the intensity $I(\psi)$ at the azimuth angle $\psi$ measured when determining the predicted integral value in the x direction in the measurement of pf is approximated by an ellipse $Ia(\psi)$ expressed by the following Equation (b7).

[Math. 8]

$$Ia(\psi)=\{a^2\cos^2(\psi-\beta)+b^2\sin^2(\psi-\beta)\}^{1/2} \quad (b7)$$

In Equation (b7), $\alpha$ is the major axis of the ellipse. b is the minor axis of the ellipse. $\beta$ is the rotation angle.

a, b, and $\beta$ when $Ia(\psi)$ is closest to $I(\psi)$ may be numerically calculated so that the degree of divergence R from the ellipse expressed by the following Equation (b8) is minimized. Thereafter, the minimum value of the degree of divergence R at that time is taken as ec.

[Math. 9]

$$R = \frac{1}{\text{Number of measured points}}\Sigma(I(\psi)-Ia(\psi))^2 \quad (b8)$$

(Dispersion Parameter Dp)

The dispersion parameter dp of the reinforcing fiber in a cross section in the thickness direction of the fiber-reinforced plastic of the second invention is preferably from 100 to 80. dp is an index representing three-dimensional dispersion of the reinforcing fibers in fiber-reinforced plastic. The fact that dp is "100" means that the reinforcing fibers are dispersed in the matrix resin in an ideal state. It means that the proportion of the reinforcing fibers locally aggregated and the proportion of the resin-rich portion are higher as the value of dp is smaller.

The heat resistance deteriorates as the value of dp is smaller and the dispersibility of the reinforcing fiber deteriorates. Favorable heat resistance is likely to be obtained when dp is 80 or more. dp in the fiber-reinforced plastic of the second invention is more preferably 84 or more and still more preferably 88 or more. The upper limit value of dp in the fiber-reinforced plastic of the second invention is 100 as a theoretical value. The realistically preferred upper limit value of dp is 98 from the viewpoint of production.

The fluidity of the fiber-reinforced plastic at the time of shaping is generated by flow of the resin or slipping of the resin layer at the time of shaping. Hence, higher fluidity is obtained at the time of shaping as the pathway through which the resin in the fiber-reinforced plastic can flow is wider. In other words, the fluidity at the time of shaping is higher as dp is smaller. In the fiber-reinforced plastic of the second invention, high fluidity is exerted even though the value of dp is high by controlling pf to be in the above range.

(Method for Measuring Dp)

dp can be measured by processing a cross-sectional photograph in the thickness direction of a sample piece cut out from a fiber-reinforced plastic by using image editing software.

Specifically, for example, a sample piece is cut out from a fiber-reinforced plastic and a cross-sectional photograph of the sample piece is taken. For example, an optical microscope can be used for taking the cross-sectional photograph. From the viewpoint of higher accuracy of evaluation by dp, the dot pitch at the resolution at the time of photographing is preferably $1/10$ or less and more preferably $1/20$ or less of the diameter of the reinforcing fiber.

Subsequently, the cut photograph is processed as follows by using image editing software.

A portion corresponding to a rectangular range of 2 mm in the thickness direction of the cross section of the sample piece and 1.5 mm in the direction orthogonal to the thickness direction in the cut photograph is taken as the image to be processed. The reinforcing fiber portion, the resin portion, and the void portion in the image to be processed are binarized by the image editing software. For example, the reinforcing fiber portion is binarized to black and the resin portion and the void portion are binarized to green in the image to be processed in which the reinforcing fiber portion is white, the resin portion is gray, and the void portion is black.

Figure 6:
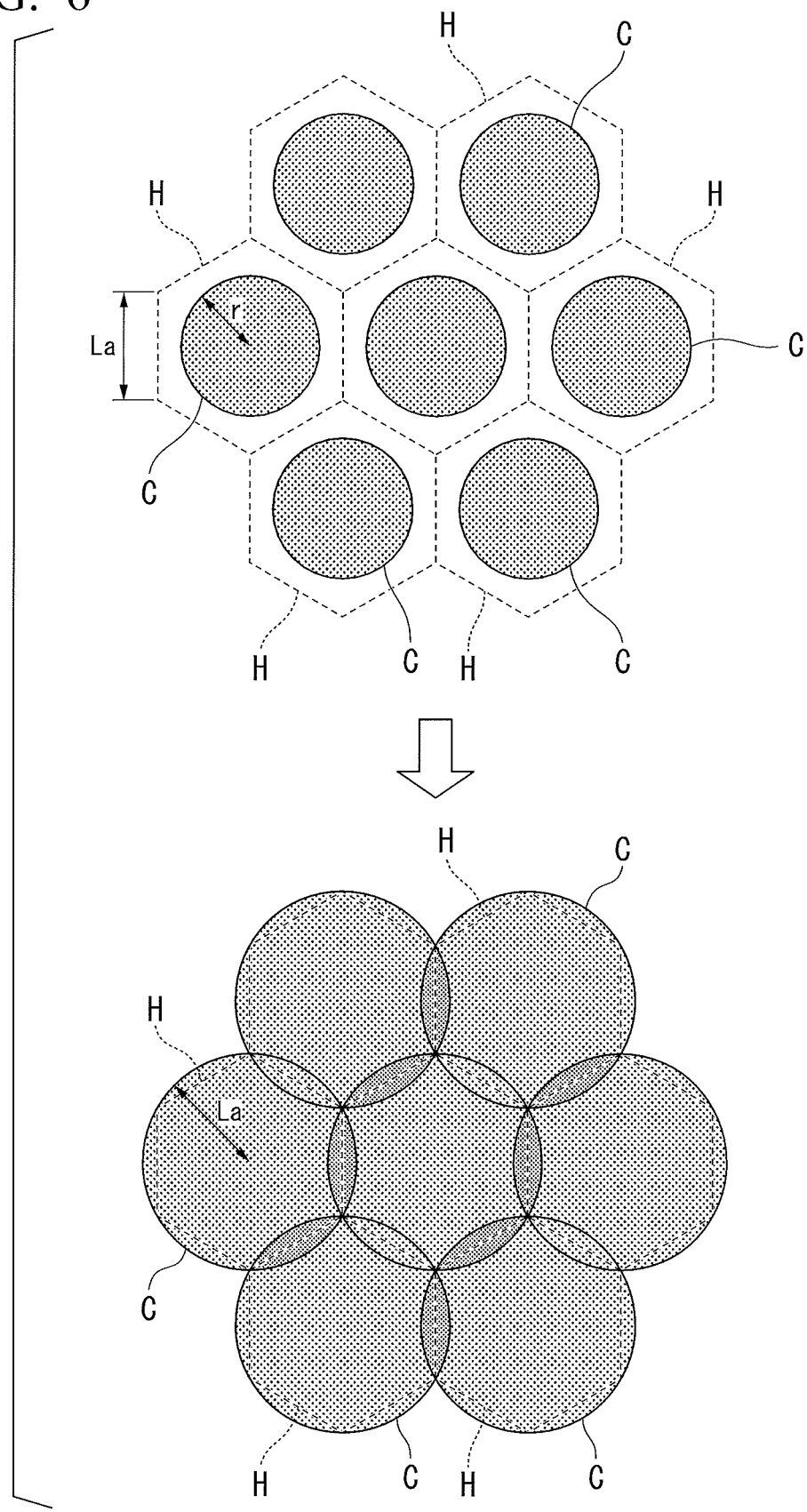
FIG. 6 is a schematic vie for explaining the processing by image processing software in calculation of the dispersion parameter dp.

The length La of one side of the unit regular hexagon H on a cut section of a fiber-reinforced plastic having a reinforcing fiber radius of r (µm) and a volume fraction Vf (% by volume) of fiber when the reinforcing fiber C is completely theoretically dispersed as illustrated in FIG. 6 is determined by the following Equation (b9).

[Math. 10]

$$La = \frac{\sqrt{\frac{2\pi}{Vf}}\times r}{\sqrt[4]{27}} \quad (b9)$$

It is assumed that the reinforcing fibers are completely theoretically dispersed in the reinforcing fiber portion in the image to be processed after binarization as illustrated in FIG. 6. Thereafter, the radius of the reinforcing fiber is increased by the length Le expressed by the following Equation (b10) and the reinforcing fiber portion after binarization is expanded by image editing software so that the radius of the reinforcing fiber becomes La as illustrated in FIG. 6. Incidentally, Le is the distance to be half of the distance at which the distance between the outer wall faces of the adjacent reinforcing fibers is the farthest in a state in which the reinforcing fibers are ideally dispersed. The reinforcing fiber portion occupies the entire area of the image to be processed by conducting the expansion processing when the reinforcing fiber is actually ideally dispersed in the reinforcing fiber portion after binarization.

After expansion processing by the image editing software, dp is calculated by the following Equation (b11).

[Math. 11]

$$Le = La - r = r \times \left( \frac{\sqrt{\frac{2\pi}{Vf}}}{\sqrt[4]{27}} - 1 \right) \quad (b10)$$

$$dp = (S1/S2) \times 100 \quad (b11)$$

In Equation (b11), S1 is the area of the reinforcing fiber portion after the expansion processing in the image to be processed. S2 is the total area of the image to be processed.

The thickness of the fiber-reinforced plastic of the invention is preferably from 0.1 to 10.0 mm, more preferably from 0.25 to 6.0 mm, and still more preferably from 0.4 to 4.0 mm. The matrix resin does not bulge out at the time of pressing in the production of the fiber-reinforced plastic and it is easy to control the thickness when the thickness is equal to or thinner than the upper limit value. When the thickness is equal to or thicker than the lower limit value, the shear stress is likely to be applied at the time of pressing in the production of the fiber-reinforced plastic and it is easy to control the isotropy and the anisotropy of the mechanical properties by randomizing the reinforcing fibers.

(Method for Producing Fiber-Reinforced Plastic)

As the method for producing a fiber-reinforced plastic of the second invention, a method including the following steps (i) to (iii) is preferable from the viewpoint of being easy to control tan δ (ave) and tan δ (max)−tan δ (ave) in the above ranges.

(i) A step of obtaining a material (A') containing a prepreg base material in which a reinforcing fiber pulled and aligned in one direction is impregnated with a matrix resin and a cut is formed so as to intersect a fiber axis.

(ii) A step of pressing the material (A') in a state of being heated to a temperature T equal to or higher than a melting point of a matrix resin or equal to or higher than a glass transition temperature of the matrix resin when the matrix resin does not have a melting point while moving the material (A') in one direction so that a fiber axis direction of the reinforcing fiber intersects a moving direction the material (A') by using a pressing device which substantially uniformly presses the material (A') in a direction orthogonal to the moving direction.

(iii) A step of cooling the material (A') pressed by the pressing device to obtain a fiber-reinforced plastic.

{Step (i)}

In the step (i) of the second invention, a material (A') containing a prepreg base material is obtained. The material (A') may be a single layer material compose only of one prepreg base material or a prepreg laminate formed by laminating two or more prepreg base materials.

The prepreg base material to be used in the step (i) is one in which reinforcing fibers pulled and aligned in one direction are impregnated with a matrix resin. Additives may be blended into the prepreg base material according to the characteristics required to the intended structural material.

A cut is formed on the prepreg base material to be used in the step (i) so as to intersect the fiber axis. By this, the reinforcing fibers which are pulled and aligned in one direction and have a long fiber length are cut by the cuts to have a fiber length of from 1 to 100 mm in the prepreg base material. When a sheet-like fiber-reinforced plastic is formed by dispersing and integrating prepreg pieces cut out from a prepreg base material, generally called a random material, the mechanical properties vary and it is thus difficult to design parts. On the contrary, a fiber-reinforced plastic is obtained by using a cut prepreg base material in the method by the steps (i) to (iii), and thus the mechanical properties are favorable as compared to the case of using a random material and the variations thereof can also be decreased.

The shape of the cut to be formed on the prepreg base material to be used in the second invention is not particularly limited, and it may be, for example, a straight line shape, a curved shape, or a polygonal line shape.

The angle of the cut to be formed on the prepreg base material to be used in the second invention with respect to the fiber axis of the reinforcing fiber is also not particularly limited.

The preferred range of the length of the reinforcing fiber cut by the cuts in the prepreg base material to be used in the second invention is the same as the preferred range of the fiber length of the reinforcing fiber in the fiber-reinforced plastic described above.

The volume fraction (Vf) of fiber in the prepreg base material to be used in the second invention is preferably from 5% to 70% by volume, more preferably from 10% to 60% by volume, and still more preferably from 15% to 50% by volume. It is likely to obtain a structural material exhibiting sufficient mechanical properties when Vf is equal to or higher than the lower limit value. It is likely to obtain favorable fluidity at the time of shaping when Vf is equal to or lower than the upper limit value.

The thickness of the prepreg base material to be used in the second invention is preferably 50 to 500 μm for the same reason as in the first invention.

In the second invention, the thickness of the prepreg base material hardly affects the strength of the structural material to be finally obtained.

A method for producing the prepreg base material to be used in the second invention is not particularly limited, and a known method can be adopted. As the prepreg base material, a commercially available prepreg base material may be used. Examples of the method for forming the cuts on the prepreg base material may include the same ones as those mentioned in the first invention, and preferred aspects thereof are also the same.

In a case in which the material (A') is a prepreg laminate, it is preferable to laminate a resin sheet between the prepreg base materials to be laminated to form a resin layer in the prepreg laminate in the same manner as in the first invention.

In a case in which the material (A') is a prepreg laminate, the aspect to laminate a plurality of prepreg base materials in the step (i) may be an aspect in which the fiber axis directions of the reinforcing fibers in the prepreg base materials intersect the moving direction of the material (A') in the step (ii).

Specific examples of the lamination aspect of the prepreg laminate of the material (A') may include the same ones as the lamination aspects of the prepreg laminate mentioned in the first invention.

The number of prepreg base materials laminated in the prepreg laminate of the material (A') is preferably from 2 to 16 and more preferably from 4 to 12 for the same reason as in the first invention.

The thickness of the material (A') is preferably from 0.25 to 6.0 mm, more preferably from 0.4 to 6.0 mm, and still more preferably from 0.5 to 4.0 mm. It is likely to obtain a fiber-reinforced plastic exhibiting sufficient mechanical properties when the thickness of the material (A') is equal to or thicker than the lower limit value. When the thickness of the material (A') is equal to or thinner than the upper limit value, the fiber axis directions of the reinforcing fibers in the material (A') are more likely to be randomized by the pressing in the step (ii) and a fiber-reinforced plastic exhibiting controlled isotropy and anisotropy of mechanical properties and small variations in mechanical properties is more likely to be obtained.

As the material (A'), the material (A) described in the first invention is preferable.

{Step (ii)}

In the step (ii), the material (A') is pressed in a state of being heated to a temperature T equal to or higher than a melting point of the matrix resin or equal to or higher than the glass transition temperature of the matrix resin when the matrix resin does not have a melting point while moving the material (A') in one direction by using a pressing device capable of pressing the material (A') in the thickness direction so that pressing is substantially uniformly conducted over the direction orthogonal to the moving direction of the material (A').

In the step (ii), the fiber axis direction of the reinforcing fiber in the material (A') is set so as to intersect the moving direction of the material (A') at the time of pressing by the pressing device. By this, the reinforcing fibers cut by the cuts flow together with the matrix resin and the fiber axis directions of the reinforcing fibers change to various directions. As a result, the fiber axis directions of the reinforcing fibers in the material (A') are randomized. In addition, it is possible to obtain a fiber-reinforced plastic of which tan δ is controlled to be low and set to be in the above range as the dispersibility of the reinforcing fiber is improved.

In the step (ii), the angle ϕ formed by the direction orthogonal to the moving direction of the material (A') and the fiber axis direction of the reinforcing fiber in the material (A') is preferably from −20° to 20° and more preferably from −5° to 5°. By this, the fiber axis directions of the reinforcing fibers are more likely to be randomized and the dispersibility of the reinforcing fibers is further improved. In the step (ii) of the second invention, it is preferable that the angle ϕ formed by the fiber axis directions of all the reinforcing fibers with respect to the direction orthogonal to the moving direction of the material (A') is set to from −20° to 20° in the same manner as in the step (ii) of the first invention.

Incidentally, the condition of angle ϕ may be set so as to be satisfied by 66% or more of the reinforcing fibers in the prepreg base material with respect to the number of the prepreg laminates laminated in the case of using the prepreg laminate as the material (A').

The preferred range of the temperature T in the step (ii) in the second invention is the same as the preferred range of the first invention.

In the step (ii) in the second invention, the material (A') may be preheated before heating the material (A') to the temperature T in the same manner as in the first invention. In the case of conducting preheating, the preferred range of the temperature for preheating and the method for preheating are the same as the range and method described in the first invention.

The clearance between the presses immediately below the roll at the point at which the material (A') is pressed by a pair of press rolls is preferably from 30% to 80% and more preferably from 40% to 70% with respect to the thickness of the material (A'). It is likely to be suppressed that the material (A') is excessively crushed and greatly deformed and a fiber-reinforced plastic having an intended shape is likely to be obtained when the clearance between the presses is equal to or greater than the lower limit value. When the clearance between the presses is equal to or smaller than the upper limit value, the dispersibility of the reinforcing fiber is improved and a fiber-reinforced plastic having a small value of tan δ and excellent mechanical properties is likely to be obtained. Incidentally, the clearance between the presses means the distance between the press surfaces in contact with the material (A') at the time of pressing. For example, the clearance between the presses is the distance between the belts in the case of using a double belt hot press. The clearance between the presses is the distance between the circumference surfaces of the rolls when directly pressing the material (A') by a pair of press rolls.

The following factor is considered as the factor to improve the dispersibility of the reinforcing fiber by decreasing the clearance between the presses at the point at which the material (A') is pressed by a pair of press rolls. At the point at which the material (A') is pressed by a pair of press rolls, the thickness of the material (A') is temporarily decreased at the portion sandwiched by the press rolls. At this time, the flow velocity of the reinforcing fiber and the matrix resin is about the same as the velocity of the material (A') in the vicinity of the press roll in the thickness direction of the material (A'). On the other hand, the reinforcing fiber and the matrix resin at the central portion in the thickness direction of the material (A') are pushed back by pressing immediately before the press rolls and the flow velocity thereof becomes slow and the reinforcing fiber and the matrix resin are pushed out by pressing immediately after the press rolls and the flow velocity thereof becomes faster. It is considered that the dispersibility of the reinforcing fiber is improved by the shear force due to the difference in the flow velocity in the thickness direction of this material (A').

The time for pressing the material (A') is preferably from 0.1 to 30 minutes and more preferably from 0.5 to 10 minutes for the same reason as in the first invention.

The moving speed of the material (A') in the step (ii) is preferably from 0.1 to 25 m/min, from more preferably 0.2 to 20 m/min, and still more preferably from 0.5 to 15 in/min for the same reason as in the first invention.

It is possible not only to achieve excellent isotropy of the mechanical properties of the fiber-reinforced plastic to be obtained but also to control the anisotropy of the mechanical properties as desired by controlling the clearance, time, and temperature T when pressing the material (A') in the step (ii).

As the step (ii) in the second invention, a step (ii-1) of pressing the material (A') in the state of being heated to the temperature T while moving the material (A) in one direction by using a pressing device which is equipped with at least a pair of press rolls and in which the axial direction of the roll is the direction orthogonal to the moving direction of the material (A') is preferable in the same manner as in the first invention.

{Step (iii)}

The step (iii) can be performed in the same manner as the step (iii) in the first invention.

In the fiber-reinforced plastic of the second invention described above, tan δ (ave) and tan δ (max)−tan δ (ave) are controlled to be in specific ranges and both of excellent fluidity at the time of shaping and excellent mechanical properties of the structural material to be obtained after shaping are thus achieved.

<Third Invention>

[Method for Producing Fiber-Reinforced Plastic]

The method for producing a fiber-reinforced plastic of the third invention for achieving the third object includes the following steps (i) to (iii). The method for producing a fiber-reinforced plastic of the third invention is the same as the method for producing a fiber-reinforced plastic of the first invention except that a material (A0) is obtained as the material (A) in the step (i).

(i) A step of obtaining a material (A0) containing a prepreg base material to be described later.

(ii) A step of pressing the material (A0) in a state of being heated to a temperature T equal to or higher than a melting point of a matrix resin or equal to or higher than a glass transition temperature of the matrix resin when the matrix resin does not have a melting point while moving the material (A0) in one direction by setting angles formed by fiber axis directions of all reinforcing fibers with respect to a direction orthogonal to a moving direction of the material (A0) to from −20° to 20° by using a pressing device which substantially uniformly presses the material (A0) in the orthogonal direction.

(iii) A step of cooling the material (A0) pressed by the pressing device to obtain a fiber-reinforced plastic.

(Step (i))

The material (A0) may be a single layer material compose only of one prepreg base material or a prepreg laminate formed by laminating two or more prepreg base materials.

The prepreg base material to be used in the step (i) is formed by impregnating reinforcing fibers pulled and aligned in one direction with a matrix resin so as to have a void fraction of from 5% to 75% to be described later. In the prepreg base material to be used in the third invention, the void fraction is set to be in the above range as a part of the matrix resin is impregnated into the reinforcing fiber in this manner.

The prepreg base material to be contained in the material (A0) is preferably a prepreg base material which exhibits the features of the prepreg base material to be contained in the material (A) of the first invention and has a void fraction from 5% to 75%. In other words, the prepreg base material to be contained in the material (A0) is preferably a prepreg base material in which the region (B) and the region (C) are alternately formed in the direction orthogonal to the fiber axis of the reinforcing fiber and the void fraction is from 5% to 75%. This makes it possible to achieve both the first object and the third object.

The reinforcing fiber to be used in the third invention is not particularly limited, examples thereof may include those mentioned in the first invention, and preferred aspects thereof are also the same.

The average fiber diameter of the reinforcing fibers is preferably from 1 to 50 μm and more preferably from 5 to 20 μm.

The matrix resin to be used in the third invention may be a thermoplastic resin or a thermosetting resin. One kind of matrix resin may be used singly or two or more kinds thereof may be used concurrently.

As the matrix resin to be used in the third invention, a thermoplastic resin is preferable for the same reason as in the first invention.

The thermoplastic resin is not particularly limited, and examples thereof may include the same ones as those mentioned in the first invention, and preferred aspects thereof are also the same. One kind of thermoplastic resin may be used singly, two or more kinds thereof may be used concurrently, or two or more kinds thereof may be used as a polymer alloy.

The thermosetting resin is not particularly limited, and examples thereof may include the same ones as those mentioned in the first invention, and preferred aspects thereof are also the same. One kind of thermosetting resin may be used singly or two or more kinds thereof may be used concurrently.

Additives may be blended into the prepreg base material to be used in the third invention according to the characteristics required to the intended structural material.

Examples of the additives may include the same ones as those mentioned in the first invention.

A cut is formed on the prepreg base material to be used in the step (i) so as to intersect the fiber axis. By this, the reinforcing fibers which are pulled and aligned in one direction and have a long fiber length are cut by the cuts to be shorter in the prepreg base material.

The shape of the cut to be formed on the prepreg base material is not particularly limited, and it may be, for example, a straight line shape, a curved shape, or a polygonal line shape.

The angle of the cut to be formed on the prepreg base material with respect to the fiber axis of the reinforcing fiber is also not particularly limited.

The average fiber length of the reinforcing fibers cut by the cuts in the prepreg base material is preferably from 1 to 100 mm, more preferably from 3 to 70 mm, still more preferably from 5 to 50 mm, particularly preferably from 10 to 50 mm, and most preferably from 10 to 35 mm for the same reason as in the first invention.

The void fraction in the cross section cut in the thickness direction of the prepreg base material to be used in the step (i) of the third invention is from 5% to 75%, preferably from 8% to 55%, and more preferably from 10% to 40%. When the void fraction is equal to or higher than the lower limit value, the fluidity of the matrix resin and the reinforcing fiber increases in the step (ii) and a fiber-reinforced plastic exhibiting excellent isotropy of mechanical properties is obtained. In addition, the operation to impregnate the matrix resin is simplified at the time of production of the prepreg base material and it is thus advantageous from the viewpoint of cost. When the void fraction is equal to or lower than the upper limit value, the voids are sufficiently decreased in the step (ii) and a fiber-reinforced plastic exhibiting excellent mechanical properties is obtained. In addition, handleability of the prepreg base material is excellent.

Incidentally, the void fraction in the prepreg base material is measured by the following method. The prepreg base material is cut in the thickness direction, the cut section is observed under an optical microscope, and the proportion of the area occupied by voids with respect to the cross-sectional area of the cut section is calculated as the void fraction. In addition, the void fraction in the prepreg base material is an average value determined by five times of measurement.

The volume fraction (Vf) of fiber in the prepreg base material to be used in the third invention is preferably from 5% to 70% by volume, more preferably from 10% to 60% by volume, and still more preferably from 15% to 50% by volume for the same reason as in the first invention.

The theoretical thickness of the prepreg base material to be used in the third invention is preferably from 0.2 to 2.0 mm and more preferably from 0.2 to 1.0 mm. When the theoretical thickness of the prepreg base material is equal to or thicker than the lower limit value, it is advantageous from the viewpoint of cost and it is easy to handle the prepreg base material. In addition, it is possible to suppress an excessive increase in the number of prepreg base materials laminated in the case of obtaining the material (A0) having a desired thickness by laminating two or more prepreg base materials, and the productivity thus increases. When the theoretical thickness of the prepreg base material is equal to or thinner than the upper limit value, it is possible to suppress an excessive increase in voids (pores) inside the prepreg base material to be generated at the time of production of the prepreg base material and it is likely to obtain a fiber-reinforced plastic exhibiting sufficient mechanical properties.

In the third invention, the theoretical thickness of the prepreg base material hardly affects the strength of the structural material (molded article) to be finally obtained.

Incidentally, the theoretical thickness of the prepreg base material means the thickness calculated from the weight per unit area of the reinforcing fiber and the weight per unit area of the matrix resin on the assumption that a void is not present in the prepreg base material at all. The theoretical thickness $T_{th}$ is calculated by the following Equation (c1), for example, in a case in which a prepreg base material is composed of two components of a reinforcing fiber and a matrix resin.

$$T_{th}=P\times[(Wf/\rho f)+(Wr/\rho r)] \quad (c1)$$

Where the abbreviations in Equation (c1) have the following meanings.

P: weight per unit area (mass per unit area) of prepreg base material,
Wf: mass fraction of reinforcing fiber in prepreg base material,
Wr: mass fraction of matrix resin in prepreg base material,
$\rho f$: specific gravity of reinforcing fiber, and
$\rho r$: specific gravity of matrix resin.

In addition, the theoretical thickness $T_{th}$ is calculated by the following Equation (c2) in a case in which a prepreg base material contains a third component in addition to the reinforcing fiber and the matrix resin.

$$T_{th}=P\times[(Wf/\rho f)+(Wr/\rho r)+(W3/\rho 3)] \quad (c2)$$

In Equation (c2), W3 is the mass fraction of the third component in the prepreg base material and $\rho 3$ is the specific gravity of the third component.

The same also applies to a case in which a prepreg base material contains a fourth component or more components.

A method for producing the prepreg base material is not particularly limited, and a known method can be adopted. The void fraction in the prepreg base material can be adjusted by adjusting the number of pressing and the pressure when impregnating the reinforcing fiber with the matrix resin.

Examples of the method for forming the cuts on the prepreg base material may include the same ones as those mentioned in the first invention, and preferred aspects thereof are also the same.

In a case in which the material (A0) is a prepreg laminate, it is preferable to laminate a resin sheet between the prepreg base materials to be laminated to form a resin layer in the prepreg laminate in the same manner as in the first invention.

In a case in which the material (A0) is a prepreg laminate, the aspect to laminate a plurality of prepreg base materials in the step (i) may be an aspect in which the fiber axis directions of the reinforcing fibers in the prepreg base materials intersect the moving direction of the material (A0) in the step (ii).

Specific examples of the lamination aspect of the prepreg laminate may include the lamination aspects mentioned in the first invention.

The number of prepreg base materials laminated in the prepreg laminate is preferably from 2 to 16 and more preferably from 4 to 12 for the same reason as in the first invention.

The thickness of the material (A0) is preferably from 0.25 to 6.0 mm, more preferably from 0.4 to 6.0 mm, and still more preferably from 0.5 to 4.0 mm for the same reason as in the first invention.

(Step (ii) and Step (iii))

The steps (ii) and (iii) can be performed in the same manner as the steps (ii) and (iii) in the first invention except that the material (A0) is used as the material (A).

In the step (ii), the reinforcing fiber cut by the cuts flows together with the matrix resin and the fiber axis directions of the reinforcing fibers are randomized. In addition, in the step (ii), the number of voids decreases as the voids in the material (A0) flow and reach the surface in association with the flow of the matrix resin and the reinforcing fibers.

(Effect)

As described above, in the method for producing a fiber-reinforced plastic according to the third invention, a material (A0) containing a prepreg base material in which the void fraction is controlled to be in a specific range is used. The respective prepreg base materials have a void and a resin reservoir as the matrix resin is not completely impregnated into the reinforcing fiber and the void fraction is thus controlled to be in a specific range. Moreover, the material (A0) is substantially uniformly pressed over the orthogonal direction while moving the material (A0) so that the fiber axis direction of the reinforcing fiber intersects the moving direction of the material (A0). The fluidity of the matrix resin and the reinforcing fiber in the step (ii) is improved as voids and a resin reservoir are present in the prepreg base material.

Hence, the fiber axis directions are favorably randomized and a fiber-reinforced plastic which exhibits excellent mechanical properties such as strength, excellent isotropy thereof, and small variations due to location and direction is obtained.

In addition, in the third invention, it is not required to impregnate the entire matrix resin into the reinforcing fiber so as not to generate voids when producing the prepreg base material and it is possible to easily produce a prepreg base material having a thicker theoretical thickness. Hence, it is possible to easily and inexpensively produce a fiber-reinforced plastic.

In addition, by the method for producing a fiber-reinforced plastic according to the third invention, it is possible to produce a fiber-reinforced plastic exhibiting excellent mechanical properties and excellent isotropy thereof even when using the material (A0) in which the fiber axis directions of the reinforcing fibers in the prepreg base material are biased in a specific range. Hence, the production is easy and it is also advantageous from the viewpoint of cost as it is not required to respectively produce prepreg base materials having different fiber axis directions of reinforcing fibers in the case of continuously producing a long fiber-reinforced plastic. In addition, it is not required to laminate the prepreg base materials while rotating the respective prepreg base materials at a predetermined rotation angle at all times so that the fiber axis directions of the reinforcing fibers are not biased in the case of producing a sheet-like fiber-reinforced plastic as well. Hence, the operation to laminate the prepreg base material is easy even in the case of using a prepreg laminate, the control is also easy, and it is also advantageous from the viewpoint of cost.

In addition, the fiber-reinforced plastic to be obtained by the production method of the third invention exhibits particularly excellent fluidity at the time of shaping since the reinforcing fibers are cut by the cuts formed on the prepreg base material and the voids and the resin reservoir remain to some extent in the fiber-reinforced plastic. Hence, the fiber-reinforced plastic can be suitably used in the production of a structural material (molded article) having a complicated shape such as a three-dimensional shape.

It is possible to obtain a structural material which exhibits excellent mechanical properties, excellent isotropy thereof, and small variations by shaping the fiber-reinforced plastic obtained by the production method of the third invention.

Incidentally, the method for producing a fiber-reinforced plastic of the third invention is not limited to the method described above. Examples of another aspect of the method for producing a fiber-reinforced plastic of the third invention may include other aspects mentioned in the first invention.

[Fiber-Reinforced Plastic]

The fiber-reinforced plastic of the third invention contains reinforcing fibers having an average fiber length of from 1 to 100 mm and a matrix resin. The fiber-reinforced plastic of the third invention can be produced, for example, by the method for producing a fiber-reinforced plastic of the third invention described above.

In the fiber-reinforced plastic of the third invention, a fiber-containing resin layer containing both the reinforcing fiber and the matrix resin and a fiber-free resin layer which does not contain the reinforcing fiber but contains the matrix resin form a layer structure in the thickness direction. Incidentally, in the third invention, a layer in which the distance between the reinforcing fibers adjacent in the thickness direction or the distance from the reinforcing fiber to the surface of the fiber-reinforced plastic is 0.015 mm (15 μm) or more, that is, the reinforcing fiber is not substantially present in the cross section obtained by cutting the fiber-reinforced plastic in the thickness direction is referred to as the fiber-free resin layer.

In the fiber-reinforced plastic obtained by the production method of the third invention, the number of voids decreases since the voids flow and reach the surface in association with the flow of the matrix resin and the reinforcing fibers in the step (ii). Hence, the void fraction in the fiber-reinforced plastic is lower than the void fraction in the prepreg base material to be used in the production thereof.

The void fraction in the fiber-containing resin layer in the cross section obtained by cutting the fiber-reinforced plastic of the third invention in the thickness direction is less than 4%, preferably less than 2%, and more preferably less than 1%. A structural material exhibiting excellent mechanical properties is obtained when the void fraction in the fiber-containing resin layer is less than 4%.

The void fraction in the fiber-free resin layer in the cross section obtained by cutting the fiber-reinforced plastic of the third invention in the thickness direction is 4% or more and less than 40%, preferably from 4% to 30%, and more preferably from 4% to 20%. When the void fraction in the fiber-free resin layer is equal to or higher than the lower limit value, the reinforcing fiber and the matrix resin exhibit excellent fluidity at the time of stamping molding and it is thus possible to easily produce a structural material having a complicated shape such as a three-dimensional shape. A structural material exhibiting excellent mechanical properties is obtained when the void fraction in the fiber-free resin layer is equal to or lower than the upper limit value.

Incidentally, the void fraction in each layer in the fiber-reinforced plastic is measured by the following method. The fiber-reinforced plastic is cut in the thickness direction, the cut section is observed under an optical microscope, and the proportion of the area occupied by voids in the layer with respect to the cross-sectional area of the fiber-containing resin layer or the fiber-free resin layer in the cut section is calculated as the void fraction. In addition, the void fraction in the fiber-containing resin layer or the fiber-free resin layer is an average value determined by five times of measurement.

The average fiber length of the reinforcing fibers is from 1 to 100 mm, preferably from 3 to 70 mm, more preferably from 5 to 50 mm, still more preferably from 10 to 50 mm, and particularly preferably from 10 to 35 mm for the same reason as in the first invention.

The reinforcing fiber and matrix resin constituting the fiber-reinforced plastic of the third invention are as described in the method for producing a fiber-reinforced plastic described above.

The volume fraction (Vf) of the reinforcing fiber in the fiber-reinforced plastic is preferably from 5% to 70% by volume, more preferably from 10% to 60% by volume, and still more preferably from 15% to 50% by volume for the same reason as in the first invention.

The same additives as those mentioned in the first invention may be blended into the fiber-reinforced plastic of the third invention as long as the object of the invention is not impaired.

The thickness of the fiber-reinforced plastic of the third invention is preferably from 0.25 to 6.0 mm, more preferably from 0.4 to 6.0 mm, and still more preferably from 0.5 to 4.0 mm for the same reason as in the first invention.

Figure 7:
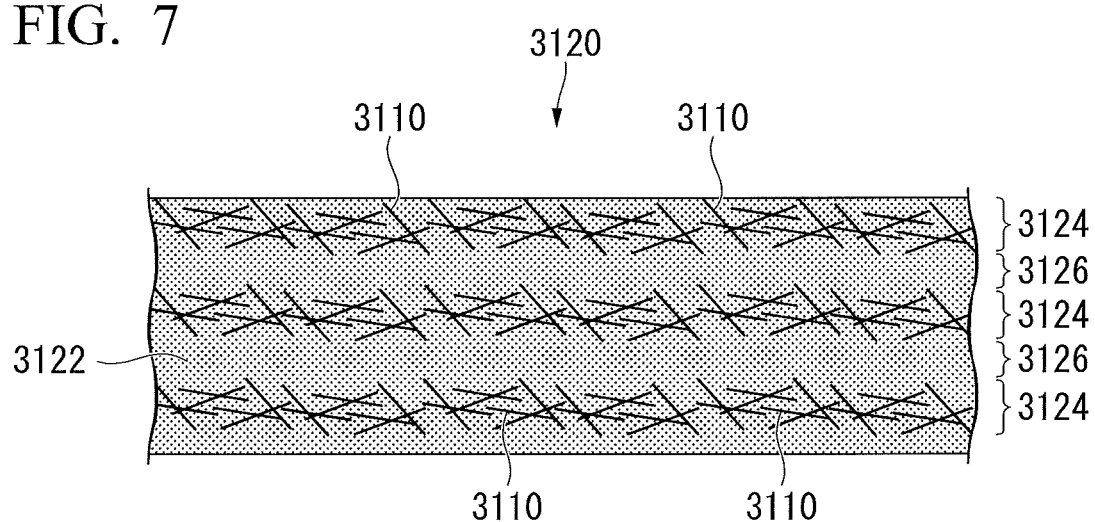
FIG. 7 is a cross-sectional view illustrating an example of a fiber-reinforced plastic of the invention.

An example of the fiber-reinforced plastic of the third invention is illustrated in FIG. 7.

A fiber-reinforced plastic 3120 of the present embodiment contains reinforcing fibers 3110 having an average fiber length of from 1 to 100 mm and a matrix resin 3122. In the fiber-reinforced plastic 3120, a fiber-containing resin layer 3124 containing both the reinforcing fiber 3110 and the matrix resin 3122 and a fiber-free resin layer 3126 which does not contain the reinforcing fiber 3110 but contains the matrix resin 3122 form a layer structure in the thickness direction. In this example, three fiber-containing resin layers 3124 and two fiber-free resin layers 3126 are alternately positioned in the thickness direction.

In the cross section obtained by cutting the fiber-reinforced plastic 3120 in the thickness direction, the void fraction in the fiber-containing resin layer 3124 is less than 4% and the void fraction in the fiber-free resin layer 3126 is 4% or more and less than 40%.

In the fiber-reinforced plastic of the third invention, the number of fiber-containing resin layers is not limited to three layers, and it may be two or fewer layers or four or more layers. The number of fiber-free resin layers is also not limited to two layers, and it may be one layer or three or more layers.

In addition, the fiber-reinforced plastic of the third invention is not limited to the aspect in which the fiber-containing resin layer is the outermost layer, and the aspect may be an aspect in which the fiber-free resin layer is the outermost layer.

Preferred aspects of the degree of orientation pf, the elliptic divergence coefficient ec, and the dispersion parameter dp in the fiber-reinforced plastic of the third invention are the same as the preferred aspects in the second invention described above.

The fiber-reinforced plastic of the third invention described above exhibits excellent mechanical characteristics and excellent isotropy thereof and can be easily and inexpensively produced.

In addition, in the conventional fiber-reinforced plastic, most of the voids are usually present in the portion at which the reinforcing fibers are present. However, in the fiber-reinforced plastic of the third invention, most of the voids are present in the fiber-free resin layer of a resin reservoir. By this, the matrix resin and the reinforcing fiber exhibit superior fluidity at the time of stamping molding as most of the voids are present in the fiber-free resin layer. Hence, the fiber-reinforced plastic of the third invention can be suitably utilized in the production of a structural material having a complicated shape such as a three-dimensional shape.

[Method for Producing Structural Material (Molded Article)]

Hereinafter, a method for producing a structural material utilizing the method for producing a fiber-reinforced plastic according to the third invention will be described.

The method for producing a structural material of the present embodiment includes the following steps (i) to (iv).

(i) A step of obtaining a material (A0) containing a prepreg base material.

(ii) A step of pressing the material (A0) in a state of being heated to a temperature T equal to or higher than the melting point of a matrix resin or equal to or higher than the glass transition temperature of the matrix resin when the matrix resin does not have a melting point while moving the material (A0) in one direction by setting angles formed by the fiber axis directions of all reinforcing fibers with respect to a direction orthogonal to a moving direction of the material (A0) to from −20° to 20° by using a pressing device which substantially uniformly presses the material (A0) in the orthogonal direction.

(iii) A step of cooling the material (A0) pressed by the pressing device to obtain a fiber-reinforced plastic.

(iv) A step of stamping-molding the fiber-reinforced plastic to obtain a structural material.

The steps (i) to (iii) in the method for producing a structural material of the present embodiment are the same as the steps (i) to (iii) in the method for producing a fiber-reinforced plastic of the third invention. In other words, the method for producing a structural material of the present embodiment is a method for obtaining a structural material by stamping-molding the fiber-reinforced plastic obtained by the method for producing a fiber-reinforced plastic of the third invention.

As the stamping molding in the step (iv), a known method can be adopted except that the fiber-reinforced plastic obtained in the step (iii) is used.

According to the method for producing a structural material of the present embodiment described above, the fiber-reinforced plastic exhibits excellent fluidity at the time of shaping, even a structural material having a complicated shape can be easily produced, and also a structural material exhibiting excellent mechanical characteristics and excellent isotropy thereof can be easily and inexpensively produced.

[Fourth Invention]

A fiber-reinforced plastic according to the fourth invention for achieving the third object contains a reinforcing fiber and a matrix resin. The volume fraction Vf(a) of fiber and void content Vv(a) in the fiber-reinforced plastic and the volume fraction Vf(b) of fiber and void content Vv(b) in the cross section obtained by cutting the fiber-reinforced plastic in the thickness direction satisfy the following Equation (c1) and the following Equation (c2). It is possible to easily and inexpensively produce the fiber-reinforced plastic while ensuring excellent mechanical characteristics, excellent isotropy thereof, and fluidity at the time of shaping by satisfying the conditions of Equation (c1) and Equation (c2).

$$Vf(a)-3(\%)<Vf(b)<Vf(a)<70(\%) \tag{c1}$$

$$2(\%)<Vv(b)-3(\%)<Vv(a)<Vv(b) \tag{c2}$$

Vf(a) is less than 70%, preferably less than 60%, and more preferably less than 50%.

Vv(b)−3(%) is greater than 2%, preferably greater than 3%, and more preferably greater than 5%.

Vf(a) and Vv(a) can be measured by the following method.

A test piece A is cut out from the fiber-reinforced plastic and the density ρA of the test piece A is measured in conformity to ISO 1183 "Immersion method".

The mass of the test piece A is measured to one place of decimals in mg and defined as $W_A$. The test piece A is tied with a nichrome wire, and the total mass of the test piece A and the nichrome wire is measured to one place of decimals in mg and defined as $W_B$. The Bunsen burner is ignited, the height of flame is adjusted to from 15 to 20 cm, the air is then gradually supplied thereto, and the height of the reducing flame (blue flame) is adjusted to about 2 cm. Subsequently, the nichrome wire with which the test piece A is tied is grasped with tweezers and the entire test piece A is horizontally brought into the flame at the part slightly above the reducing flame so as not to come into contact with the reducing flame of the Bunsen burner. The test piece A is heated until the lower surface of the test piece A glows, and the test piece A is then reversed and heated until the other side glows and red flame does not emit from the test piece A any longer. The time for heating is within 3 minutes. The test piece A is removed from the flame, immediately placed on a metal plate, cooled to room temperature, and then stored in a desiccator. Subsequently, the total mass of the test piece A and the nichrome wire after burning is measured to one place of decimals in mg and defined as $W_C$. The mass fraction Wf(a) (%) of fiber is calculated by the following Equation (c3).

$$Wf(a)=(W_A-W_B+W_C)/W_A \times 100 \tag{c3}$$

Subsequently, the volume fraction Vf(a) (%) of fiber is calculated by the following Equation (c4), and the void content Vv(a) (%) is further calculated by the following Equation (c5).

$$Vf(a)=Wf(a) \times \rho_A/\rho f_A \tag{c4}$$

$$Vv(a)=100-(Wf(a)+Vr(a)) \tag{c5}$$

Where the symbols in Equation (c4) and Equation (c5) have the following meanings.

$\rho f_A$: density (g/cm³) of carbon fiber used in test piece A, and

Vr(a): volume fraction (%) of resin in test piece.

Vf(b) and Vv(b) are measured by the following method.

A test piece B of 3 cm² is cut out from the fiber-reinforced plastic and embedded in the Technovit 4000 manufactured by Kulzer GmbH. After Technovit 4000 is cured, the test piece B is then polished so that the cross section thereof is exposed as a mirror surface treatment. Subsequently, a cross-sectional photograph of the test piece B is taken under the following conditions.

(Photographing Condition)
Apparatus: Industrial optical microscope BX51M manufactured by Olympus Corporation,
Magnification of lens: 500-fold, and
Dot pitch for photographing: 0.17 μm.

The portion corresponding to a range of 0.5 mm (thickness direction)×0.5 mm (direction orthogonal to thickness direction) in the cross-sectional photograph of the test piece B thus obtained is taken as the image to be processed. The image to be processed is subjected to image processing using the Software Win-Roof as the image editing software to respectively measure the area Sf of the fiber portion, the area Sr of the resin portion, and the area Sv of the void portion, and the volume fraction Vf(b) of fiber and the void content Vv(b) are calculated by the following Equations (c6) and (c7).

$$Vf(b)=Sf/(Sf+Sr+Sv) \tag{c6}$$

$$Vv(b)=Sv/(Sf+Sr+Sv) \tag{c7}$$

Examples of the reinforcing fiber and matrix resin constituting the fiber-reinforced plastic may include the same ones as those mentioned in the first invention, and preferred aspects are also the same. The same additives as those mentioned in the first invention may be blended into the fiber-reinforced plastic of the fourth invention as long as the object of the invention is not impaired.

In addition, preferred aspects of the average fiber length of the reinforcing fibers and the volume fraction (Vf) of the reinforcing fiber in the fiber-reinforced plastic are the same as the preferred ranges in the first invention.

The thickness of the fiber-reinforced plastic of the fourth invention is preferably from 0.25 to 6.0 mm, more preferably from 0.4 to 6.0 mm, and still more preferably from 0.5 to 4.0 mm for the same reason as in the first invention.

Preferred aspects of the degree of orientation pf, the elliptic divergence coefficient ec, and the dispersion parameter dp in the fiber-reinforced plastic of the fourth invention are the same as the preferred aspects in the second invention described above.

The fiber-reinforced plastic of the fourth invention can be produced, for example, by the method for producing a fiber-reinforced plastic of the third invention described above.

<Fifth Invention>

In the fifth invention, the angle $\phi_2$ formed by the direction orthogonal to the moving direction of a material (A1) and the fiber axis direction of a reinforcing fiber tow is an angle formed by the direction orthogonal to the moving direction of the material (A1) when the material (A1) is pressed while being moved in the step (ii) and the fiber axis direction of the reinforcing fiber tow in a tow prepreg base material of the material (A1). The angle $\phi_2$ takes the anticlockwise rotation when the material (A1) is viewed from above as the positive and the clockwise rotation as the negative.

In the case of using a pressing device which is equipped with at least a pair of press rolls and in which the axial direction of the roll coincides with the direction orthogonal to the moving direction of the material (A1) as the pressing device in the step (ii), the angle $\phi_2$ coincides with the angle formed by the axial direction of the press roll and the fiber axis direction of the reinforcing fiber tow in the tow prepreg base material of the material (A1).

[Method for Producing Fiber-Reinforced Plastic]

The method for producing a fiber-reinforced plastic according to the fifth invention for achieving the fourth object is a method including the following steps (i) to (iii). The method for producing a fiber-reinforced plastic according to the fifth invention is the same as the method for producing a fiber-reinforced plastic according to the first invention except that a material (A1) is obtained as the material (A) in the step (i).

(i) A step of obtaining a material (A1) containing a tow prepreg base material in which a reinforcing fiber tow having a plurality of tows having from 20,000 to 200,000 single fibers bundled pulled and aligned in one direction is impregnated with a matrix resin and a cut intersecting a fiber axis of the reinforcing fiber tow is formed.

(ii) A step of pressing the material (A1) in a state of being heated to a temperature T equal to or higher than a melting point of a matrix resin or equal to or higher than a glass transition temperature of the matrix resin when the matrix resin does not have a melting point while moving the material (A1) in one direction by setting angles ϕ formed by fiber axis directions of all reinforcing fibers with respect to a direction orthogonal to a moving direction of the material (A1) to from −20° to 20° by using a pressing device which substantially uniformly presses the material (A1) in the orthogonal direction.

(iii) A step of cooling the material (A1) pressed by the pressing device to obtain a fiber-reinforced plastic.

Incidentally, the angle θ coincides with the angle $\theta_2$ formed by the direction orthogonal to the moving direction of the material (A1) and the fiber axis direction of the reinforcing fiber tow.

(Step (i))

In the step (i), a material (A1) containing a tow prepreg base material is obtained.

The material (A1) may be a single layer material composed only of one tow prepreg base material or a prepreg laminate formed by laminating two or more tow prepreg base materials.

(Tow Prepreg Base Material)

The tow prepreg base material to be used in the step (i) is formed by impregnating a reinforcing fiber tow in which a plurality of tows are pulled and aligned in one direction with a matrix resin.

The tow is formed by bundling from 20,000 to 200,000 single fibers. When the number of single fibers constituting the tow is in the above range, the fiber axis directions of the reinforced fiber tows are likely to be randomized in the step (ii) and a fiber-reinforced plastic in which the isotropy and anisotropy of the mechanical properties are controlled and the variations in mechanical properties are small is obtained.

The number of single fibers constituting the tow is preferably from 25,000 to 150,000, more preferably from 30,000 to 100,000, still more preferably from 35,000 to 75,000.

The weight per unit length (mass per unit length) of the tow is preferably from 1.6 to 10 g/m, more preferably from 2.0 to 7.0 g/m, still more preferably from 2.3 to 5.0 g/m.

The tow prepreg base material to be contained in the material (A1) is preferably a tow prepreg base material having the features of the prepreg base material to be contained in the material (A) of the first invention. In other words, the prepreg base material to be contained in the material (A1) is preferably a tow prepreg base material in which the region (B) and the region (C) are alternately formed in the direction orthogonal to the fiber axis of the reinforcing fiber tow. This makes it possible to achieve both the first object and the fourth object.

By adopting a tow prepreg having both the features of the prepreg base material to be contained in the material (A) of the first invention and the features of the prepreg base material to be contained in the material (A0) of the third invention as the tow prepreg base material to be contained in the material (A1), it is possible to achieve all the first object, the third object, and the fourth object.

The single fibers forming the tow are not particularly limited, and for example, it is possible to use an inorganic fiber, an organic fiber, a metal fiber, or a reinforcing fiber having a hybrid configuration in which these are combined. Specific examples of the respective fibers may include the same ones as those mentioned in the first invention, and preferred aspects thereof are also the same.

A preferred tow obtained by bundling a carbon fiber is a tow having a strand tensile strength of 1.0 GPa or more and 9.0 GPa or less and a strand tensile modulus of elasticity of 150 GPa or more and 1000 GPa or less measured in conformity to JIS R7601 (1986).

A more preferred tow obtained by bundling a carbon fiber is a tow having a strand tensile strength of 1.5 GPa or more and 9.0 GPa or less and a strand tensile modulus of elasticity of 200 GPa or more and 1000 GPa or less measured in conformity to JIS R7601 (1986).

The average fiber diameter of the single fibers forming the tow is preferably from 1 to 50 µm and more preferably from 5 to 20 nm.

The roundness of the single fibers constituting the tow is not particularly limited, but it is preferably 0.70 or more and 0.94 or less. It is possible to suppress a decrease in the mechanical properties of the fiber-reinforced plastic due to local concentration of stress in the single fiber when the roundness is 0.70 or more. When the roundness is 0.94 or less, the fiber axis directions of the reinforced fiber tows is likely to be randomized and it is likely to obtain a fiber-reinforced plastic in which the isotropy and anisotropy of the mechanical properties are controlled and the variations in mechanical properties are small. A more preferred roundness is from 0.75 to 0.90.

Incidentally, the roundness is a value determined by the following Equation (d1), and S and Ld are the cross-sectional area and circumference of the single fiber to be obtained by image analysis of the cross section perpendicular to the fiber axis of the single fiber through SEM observation.

$$\text{Roundness}=4\pi S/Ld^2 \quad (d1)$$

The matrix resin to be used in the fifth invention may be a thermoplastic resin or a thermosetting resin. One kind of matrix resin may be used singly or two or more kinds thereof may be used concurrently.

As the matrix resin to be used in the fifth invention, a thermoplastic resin is preferable for the same reason as in the first invention.

The thermoplastic resin is not particularly limited, and examples thereof may include the same ones as those mentioned in the first invention, and preferred aspects thereof are also the same. One kind of thermoplastic resin may be used singly, two or more kinds thereof may be used concurrently, or two or more kinds thereof may be used as a polymer alloy.

The thermosetting resin is not particularly limited, and examples thereof may include the same ones as those mentioned in the first invention, and preferred aspects thereof are also the same. One kind of thermosetting resin may be used singly or two or more kinds thereof may be used concurrently.

The same additives as those mentioned in the first invention may be blended into the tow prepreg base material according to the characteristics required to the intended structural material.

In addition, a cut is formed on the tow prepreg base material to be used in the step (i) so as to intersect the fiber axis. By this, the tows which are pulled and aligned in one direction and have a long fiber length are in a state of being cut by the cuts in the tow prepreg base material.

Generally, a structural material exhibiting superior mechanical properties is obtained as the reinforcing fiber is longer, but it is difficult to obtain a structural material having a complicated three-dimensional shape since the fluidity decreases particularly at the time of stamping molding. In the fifth invention, the tow is cut and shortened by forming the cuts on the tow prepreg base material and thus the tow and the matrix resin are likely to flow even at the time of stamping molding. Hence, it is easy to obtain a structural material having a complicated three-dimensional shape such as ribs and bosses.

In addition, in the fifth invention, the fiber-reinforced plastic is obtained by using a cut tow prepreg base material and thus the mechanical properties are favorable as compared to the case of using a random material and the variations thereof can also be decreased.

The shape of the cut to be formed on the tow prepreg base material is not particularly limited, and it may be, for example, a straight line shape, a curved shape, or a polygonal line shape.

The angle of the cut to be formed on the tow prepreg base material with respect to the fiber axis of the reinforcing fiber is also not particularly limited.

The length of the tow cut by the cuts in the tow prepreg base material is preferably from 1 to 100 mm, more preferably from 3 to 70 mm, still more preferably from 5 to 50 mm, particularly preferably from 10 to 50 mm, and most preferably from 10 to 35 mm. It is likely to obtain a fiber-reinforced plastic exhibiting sufficient mechanical properties when the length of the tow is equal to or longer than the lower limit value. When the length of the tow is equal to or shorter than the upper limit value, the tow and the matrix resin are likely to flow at the time of molding and thus it is easy to shape the fiber-reinforced plastic obtained into a structural material having a complicated three-dimensional shape such as ribs.

The volume fraction (Vf) of fiber in the tow prepreg base material is preferably from 5% to 70% by volume, more preferably from 10% to 60% by volume, and still more preferably from 15% to 50% by volume. It is likely to obtain a structural material exhibiting sufficient mechanical properties when Vf is equal to or higher than the lower limit value. It is likely to obtain favorable fluidity at the time of shaping when Vf is equal to or lower than the upper limit value.

Incidentally, the Vf value in the tow prepreg base material means the proportion of the volume of the reinforcing fiber tow with respect to the total volume of other components such as additives excluding the reinforcing fiber tow, the matrix resin, and the void (gas) in the tow prepreg base material.

The thickness of the tow prepreg base material is preferably from 50 to 500 µm. When the thickness of the tow prepreg base material is equal to or thicker than the lower limit value, it is easy to handle the tow prepreg base material. In addition, it is possible to suppress an excessive increase in the number of tow prepreg base materials laminated in the case of obtaining the material (A1) having a desired thickness by laminating two or more tow prepreg base materials, and the productivity thus increases. When the thickness of the tow prepreg base material is equal to or thinner than the upper limit value, it is possible to suppress an excessive increase in voids (pores) inside the tow prepreg base material to be generated at the time of production of the tow prepreg base material and it is thus likely to obtain a fiber-reinforced plastic exhibiting sufficient mechanical properties.

In the fifth invention, the thickness of the tow prepreg base material hardly affects the strength of the structural material to be finally obtained.

A method for producing the tow prepreg base material is not particularly limited, and a known method can be adopted.

Examples of the method for forming the cuts on the tow prepreg base material may include the same ones as those mentioned in the first invention, and preferred aspects thereof are also the same.

In a case in which the material (A1) is a prepreg laminate, it is preferable to laminate a resin sheet between the tow prepreg base materials to be laminated to form a resin layer in the prepreg laminate in the same manner as in the first invention. By this, the fluidity is improved in the step (ii) and it is likely to obtain a fiber-reinforced plastic in which isotropy and anisotropy of the mechanical properties are controlled and the variations in mechanical properties are small.

The resin to be used in the resin layer is not particularly limited, and examples thereof may include the same ones as the matrix resin to be used in the tow prepreg base material. The resin to be used in the resin layer is preferably the same resin as the matrix resin to be used in the tow prepreg base material. Incidentally, the resin to be used in the resin layer may be a resin different from the matrix resin to be used in the tow prepreg base material.

In a case in which the material (A1) is a prepreg laminate, the aspect to laminate a plurality of tow prepreg base materials in the step (i) may be an aspect in which the fiber axis direction of the reinforcing fiber tow in the tow prepreg base materials intersect the moving direction of the material (A1) in the step (ii).

Specific examples of the aspect of the prepreg laminate may include an aspect in which two or more tow prepreg base materials are arranged and laminated so that the fiber axes of the reinforcing fiber tows in the respective tow prepreg base materials are in the same direction. In the aspect, the fiber axis directions of the reinforcing fiber tows in the respective tow prepreg base materials are arranged, and it is thus easy to control the angular relation of the respective tow prepreg base materials in the step (ii) so that the fiber axis directions of the reinforcing fiber tows and the moving direction of the material (A1) intersect each other.

In addition, it may be an aspect in which the fiber axis directions of the reinforcing fiber tows are deviated from each other between the respective tow prepreg base materials forming the prepreg laminate. In other words, it is not required to strictly control the angles of the respective tow prepreg base materials so that the fiber axis directions of the reinforcing fiber tows in the respective tow prepreg base materials are always completely arranged when laminating a plurality of prepreg base materials.

In addition, in a case in which the fiber axis directions of the reinforcing fiber tows are deviated from each other between the respective tow prepreg base materials laminated as well, the deviation of the fiber axis directions of the reinforcing fiber tows for 66% or more of the tow prepreg base materials with respect to the number of the tow prepreg base materials laminated in the prepreg laminate is preferably 40° or less and more preferably 10° or less. It is easier to control the angular relation between the moving direction of the material (A1) and the fiber axis directions of the reinforcing fiber tows in the respective tow prepreg base materials in the step (ii) as the deviation of the fiber axis directions of the reinforcing fiber tows between the respective tow prepreg base materials is smaller.

The number of tow prepreg base materials laminated in the prepreg laminate is preferably from 2 to 16 and more preferably from 4 to 12. It is likely to obtain a fiber-reinforced plastic exhibiting sufficient mechanical properties when the number of tow prepreg base materials laminated is equal to or larger than the lower limit value. The laminating work is facilitated and the productivity is excellent when the number of tow prepreg base materials laminated is equal to or smaller than the upper limit value.

The thickness of the material (A1) is preferably from 0.25 to 6.0 mm, more preferably from 0.4 to 6.0 mm, and still more preferably from 0.5 to 4.0 mm. It is likely to obtain a fiber-reinforced plastic exhibiting sufficient mechanical properties when the thickness of the material (A1 is equal to thicker than the lower limit value. When the thickness of the material (A1) is equal to or thinner than the upper limit value, the fiber axis directions of the reinforcing fiber tows in the material (A1) are more likely to be randomized by pressing in the step (ii) to be described later and it is likely to obtain a fiber-reinforced plastic in which isotropy and anisotropy of the mechanical properties are controlled and the variations in mechanical properties are small.

(Step (ii) and Step (iii))

The steps (ii) and (iii) can be performed in the same manner as the steps (ii) and (iii) in the first invention except that the material (A1) is used as the material (A).

In the step (ii), the tow cut by the cuts flows together with the matrix resin and the fiber axis directions of the reinforcing fiber tows change to various directions. As a result, the fiber axis directions of the reinforcing fiber tows in the material (A1) are randomized and it is possible to obtain a fiber-reinforced plastic in which isotropy and anisotropy of the mechanical properties are controlled and the variations in mechanical properties are small.

[Effect]

As described above, in the production method of the fifth invention, a material (A1) containing a tow prepreg base material equipped with a reinforced fiber tow formed by using a tow obtained by bundling a specific number of single fibers is used. Moreover, the material (A1) is substantially uniformly pressed over the orthogonal direction while being moved so that the fiber axis direction of the reinforcing fiber tow intersects the moving direction of the material (A1). By this, the fiber axis directions of the reinforced fiber tows are randomized and thus a fiber-reinforced plastic which exhibits excellent mechanical properties such as strength, controlled isotropy and anisotropy thereof, and small variations due to location and direction is obtained. In addition, the fiber-reinforced plastic to be obtained also exhibits excellent heat resistance since the tow is uniformly dispersed in the matrix resin.

In the fifth invention, the following factor is considered as the factor to favorably randomize the fiber axis directions of the reinforced fiber tows. Generally, in a case in which an inorganic substance is present in the resin, there is a tendency that the viscosity of the resin in the molten state decreases and the fluidity increases as the dispersibility of the inorganic substance deteriorates. In the fifth invention, a tow obtained by bundling 20,000 or more single fibers is used and thus the dispersibility of the single fibers in the matrix resin is deteriorated in the state of not being pressed as compared to a case in which the tow is not used. Hence, it is considered that the viscosity of the resin is lower and the fluidity is higher as compared to a case in which the tow is not used in the state of being melted in the step (ii). In addition, it is considered that the followability of tow to the flow of resin is sufficiently ensured as the number of single fibers forming the tow is 200,000 or less. From these facts, it is considered that the fiber axis directions of the reinforced fiber tows are favorably randomized since the tow also sufficiently flows to follow the resin exhibiting high fluidity.

In addition, by using a tow obtained by bundling 20,000 or more single fibers, it is possible to more inexpensively produce a fiber-reinforced plastic as compared to a case in which the tow is not used.

In addition, by the method of the fifth invention, it is possible to produce a fiber-reinforced plastic which exhibits excellent mechanical properties, controlled isotropy and anisotropy thereof, small variations, and excellent heat resistance even when using the material (A1) in which the fiber axis directions of the reinforcing fiber tows in the tow prepreg base material are biased in a specific range. Hence, the production is easy and it is also advantageous from the viewpoint of cost as it is not required to respectively produce tow prepreg base materials having different fiber axis directions of reinforcing fiber tows in the case of continuously producing a band-like fiber-reinforced plastic. In addition, it is not required to laminate the tow prepreg base materials while rotating the respective tow prepreg base materials at a predetermined rotation angle at all times so that the fiber axis directions of the reinforcing fiber tows are not biased in the case of producing a sheet-like fiber-reinforced plastic as well. Hence, the operation to laminate the tow prepreg base material is easy even in the case of using a prepreg laminate, the control is also easy, and it is also advantageous from the viewpoint of cost.

In addition, the fiber-reinforced plastic obtained by the production method of the fifth invention exhibits high fluidity at the time of shaping and can be suitably used in the production of a structural material having a complicated shape such as a three-dimensional shape since the tow is cut by the cuts formed on the tow prepreg base material in the fiber-reinforced plastic.

It is possible to obtain a structural material which exhibits excellent mechanical properties, controlled isotropy and anisotropy thereof, small variations, and excellent heat resistance by shaping the fiber-reinforced plastic obtained by the production method of the fifth invention.

Incidentally, the production method of the fifth invention is not limited to the method described above. Examples of another aspect of the method for producing a fiber-reinforced plastic of the fifth invention may include other aspects mentioned in the first invention.

<Sixth Invention>

The fiber-reinforced plastic according to the sixth invention for achieving the fifth object contains carbon fibers randomly disposed and a matrix resin.

[Carbon Fiber]

In the sixth invention, a carbon fiber (X) having a tensile modulus of elasticity of 350 GPa or more and a carbon fiber (Y) having a tensile modulus of elasticity of 200 GPa or more and less than 350 GPa are used as the carbon fibers.

(Tensile Modulus of Elasticity)

The tensile modulus of elasticity of carbon fiber is the tensile modulus of elasticity of carbon fiber measured by the method B of JIS R7608: 2007 (ISO 16018: 2004).

(Carbon Fiber (X))

The tensile modulus of elasticity of the carbon fiber (X) is 350 GPa or more, preferably 400 GPa or more, and more preferably 600 GPa or more. The upper limit value of the tensile modulus of elasticity is not substantially prescribed, but it is preferably 900 GPa or less, for example.

The carbon fiber (X) is preferably a pitch-based carbon fiber. The pitch-based carbon fiber means an aggregate of fibers containing "a filament fiber (p) which is produced by spinning a resin having a partially liquid crystal structure generated by being treated with mesophase pitch, namely, petroleum tar, coal tar, or the like or an artificially synthesized mesophase pitch and infusibilizing and further carbonizing the spun fiber, has a highly developed graphite crystal structure in the fiber axis direction, and is substantially composed only of carbon" as the main component. The pitch-based carbon fiber has advantages such as a high modulus of elasticity and low thermal expansion.

The carbon fiber (X) is preferably an aggregate of fibers substantially constituted only by the filament fiber (p).

The specific gravity of the carbon fiber (X) is preferably from 1.9 to 2.26 and more preferably from 2.05 to 2.20. The abundance ratio of the graphite structure is sufficiently high and an excellent strength and an excellent modulus of elasticity are likely to be obtained when the specific gravity is equal to higher than the lower limit value of the above range, and an excellent strength is likely to be obtained when the specific gravity is equal to lower than the upper limit value.

Examples of commercially available products suitable as the carbon fiber (X) may include DIALEAD (registered trademark) K1352U, K1392U, K13C2U, K13D2U, K13312, K63712, and K63A12 (these are trade names, manufactured by Mitsubishi Rayon Co., Ltd.).

[Carbon Fiber (Y)]

The tensile modulus of elasticity of the carbon fiber (Y) is 200 GPa or more and less than 350 GPa and preferably from 220 to 300 GPa.

The carbon fiber (Y) is preferably a polyacrylonitrile (PAN)-based carbon fiber. The polyacrylonitrile-based carbon fiber means an aggregate of fibers containing "a filament fiber (an) which is produced by infusibilizing and further carbonizing a fiber composed of a polyacrylonitrile-based resin obtained by polymerizing acrylonitrile as a main component and is substantially composed only of carbon" as the main component. The polyacrylonitrile-based carbon fiber has advantages such as a low density and a high specific strength.

The carbon fiber (Y) is preferably an aggregate of fibers substantially constituted only by the filament fiber (an).

The specific gravity of the carbon fiber (Y) is preferably from 1.7 to 1.9 and more preferably from 1.75 to 1.85. The abundance ratio of the graphite structure is sufficiently high and an excellent strength and an excellent modulus of elasticity are likely to be obtained when the specific gravity is equal to higher than the lower limit value of the above range, and the temperature for calcination is not too high and it is preferable from the viewpoint of cost when the specific gravity is equal to lower than the upper limit value.

Examples of commercially available products suitable as the carbon fiber (Y) may include PYROFIL (registered trademark) TR30S 3L, TR50S 6L, TRH50 12L, TRH50 18M, TR50S 12L, TR50S 15L, MR40 12M, MR60H 24P, MS40 12M, TRH50 60M, and TRW40 50 L (these are product names, manufactured by Mitsubishi Rayon Co., Ltd.).

It is preferable that the carbon fiber (X) is a pitch-based carbon fiber from the viewpoint that the cost is likely to be cut down.

It is preferable that the carbon fiber (Y) is a polyacrylonitrile-based carbon fiber from the viewpoint of more favorable exertion of strength.

It is particularly preferable that the carbon fiber (X) is a pitch-based carbon fiber and the carbon fiber (Y) is a polyacrylonitrile-based carbon fiber from the viewpoint of the balance between cost and mechanical characteristics.

[Average Fiber Length]

The average fiber length of the carbon fibers in the fiber-reinforced plastic is from 1 to 100 mm, preferably from 3 to 70 mm, more preferably from 5 to 50 mm, and still more preferably from 10 to 50 mm. It is likely to obtain required mechanical characteristics when the average fiber length of the carbon fibers is equal to or longer than the lower limit value. It is likely to obtain the fluidity required at the time of shaping when the average fiber length of the carbon fibers is equal to or shorter than the upper limit value.

[Matrix Resin]

The matrix resin to be used in the sixth invention may be a thermoplastic resin or a thermosetting resin. One kind of matrix resin may be used singly or two or more kinds thereof may be used concurrently.

As the matrix resin to be used in the sixth invention, a thermoplastic resin is preferable for the same reason as in the first invention.

The thermoplastic resin is not particularly limited, and examples thereof may include the same ones as those mentioned in the first invention, and preferred aspects thereof are also the same. One kind of thermoplastic resin may be used singly, two or more kinds thereof may be used concurrently, or two or more kinds thereof may be used as a polymer alloy.

The thermosetting resin is not particularly limited, and examples thereof may include the same ones as those mentioned in the first invention, and preferred aspects thereof are also the same. One kind of thermosetting resin may be used singly or two or more kinds thereof may be used concurrently.

<Fiber-Reinforced Plastic>

The fiber-reinforced plastic of the sixth invention contains a carbon fiber (X), a carbon fiber (Y), and a matrix resin, and the carbon fiber (X) is locally present in the surface layer.

The fact that the carbon fiber (X) is locally present in the surface layer means that the distribution of the carbon fibers (X) in the fiber-reinforced plastic is not uniform in the thickness direction but the carbon fiber (X) is present in the surface layer in the largest amount.

In the fiber-reinforced plastic, it is preferable that the surface layer is a layer containing only the carbon fiber (X) as the carbon fiber and a layer other than the surface layer is a layer containing the carbon fiber (X) and the carbon fiber (Y) and/or a layer containing only the carbon fiber (Y) as the carbon fibers. A matrix resin layer which does not contain a carbon fiber may be further present.

It is possible to efficiently improve the bending modulus of elasticity of the fiber-reinforced plastic by allowing the carbon fiber (X) having a higher tensile modulus of elasticity than the carbon fiber (Y) to be locally present in the surface layer in this manner.

The thickness of the layer which is present as the surface layer and contains only the carbon fiber (X) as the carbon fiber is preferably from 3% to 30% and more preferably from 6% to 20% with respect to the thickness of the fiber-reinforced plastic. An excellent modulus of elasticity is obtained when the thickness is equal to or thicker than the lower limit value of the above range, and an excellent strength is obtained when the thickness is equal to or thinner than the upper limit value.

The surface layer in which the carbon fibers are locally present may be present only on either of the front surface or the back surface of the fiber-reinforced plastic, but it is preferable that the surface layer is present on both surfaces. The thickness of each surface layer in which the carbon fibers are locally present is preferably from 3% to 30% and more preferably from 6% to 20% with respect to the thickness of the fiber-reinforced plastic in a case in which the surface layer is present on both surfaces.

Examples of the preferred aspect of the fiber-reinforced plastic may include the following first aspect or second aspect.

First aspect: an aspect in which the surface layer is a layer containing only the carbon fiber (X) as the carbon fiber and other layers are a layer containing the carbon fiber (X) and the carbon fiber (Y) and a layer containing only the carbon fiber (Y) as the carbon fiber.

Second aspect: an aspect in which the surface layer is a layer containing only the carbon fiber (X) as the carbon fiber and the other layer is a layer containing only the carbon fiber (Y) as the carbon fiber but a layer containing the carbon fiber (X) and the carbon fiber (Y) together is not included.

The fiber-reinforced plastic of the first aspect or the second aspect can be suitably produced by the first aspect or the second aspect of the method for producing a fiber-reinforced plastic to be described later, respectively.

In addition, the fiber-reinforced plastic of the second aspect can be produced by a method in which a fiber-reinforced plastic containing only the carbon fiber (X) randomly disposed as the carbon fiber and a fiber-reinforced plastic containing only the carbon fiber (Y) randomly disposed as the carbon fiber are respectively fabricated by known methods, these are laminated so that the fiber-reinforced plastic containing only the carbon fiber (X) is the outermost layer, and the fiber-reinforced plastics laminated are integrated by a known method.

The fiber-reinforced plastic may contain reinforcing fibers other than the carbon fiber and additives as long as the object of the invention is not impaired.

Examples of other reinforcing fibers may include a glass fiber, an organic fiber, and a metal fiber.

Examples of the additives may include a non-fibrous filler, a flame retardant, a pigment, a release agent, a plasticizer, and a surfactant.

(Volume Fraction (Vf) of Fiber)

The volume fraction (Vf) of the carbon fiber in the fiber-reinforced plastic is preferably from 5% to 70% by volume, more preferably from 10% to 60% by volume, and still more preferably from 15% to 50% by volume. A decrease in interface strength due to a decrease in toughness hardly occurs and the fluidity at the time of shaping hardly decreases when the Vf of the carbon fiber is equal to or lower than the upper limit value. It is likely to obtain mechanical characteristics required as a fiber-reinforced plastic when the Vf of the carbon fiber is equal to or higher than the lower limit value.

In the fiber-reinforced plastic of the sixth invention, the volume fraction (Vf) of fiber may not be uniform.

In the fiber-reinforced plastic of the first aspect, the Vf value in the layer containing only the carbon fiber (X) is preferably from 5% to 70% by volume, more preferably from 10% to 60% by volume, and still more preferably from 15% to 50% by volume. The Vf value in the layer containing the carbon fiber (X) and the carbon fiber (Y) is preferably from 5% to 70% by volume, more preferably from 10% to 60% by volume, and still more preferably from 15% to 50% by volume. The Vf value in the layer containing only the carbon fiber (Y) is preferably from 5% to 70% by volume, more preferably from 10% to 60% by volume, and still more preferably from 15% to 50% by volume.

[Degree of Orientation Pf]

pf in the fiber-reinforced plastic of the sixth invention is from 0.001 to 0.8. In a case in which the fiber length of the carbon fiber is from 1 mm to 100 mm, it is likely to obtain sufficient fluidity at the time of shaping and sufficient mechanical properties when pf is 0.8 or less. The lower limit value of pf is not particularly limited in terms of the physical properties of the fiber-reinforced plastic. However, it is difficult to set pf to 0, and a value of 0.001 or more is a realistic value. The upper limit value of pf is preferably 0.5, more preferably 0.3, and still more preferably 0.15.

[Elliptic Divergence Coefficient Ec]

ec in the fiber-reinforced plastic of the sixth invention is from $1 \times 10^{-5}$ to $9 \times 10^{-5}$. In a carbon fiber-reinforced plastic in which carbon fibers are randomly oriented, it means that the variation in mechanical properties is greater as ec is greater.

It is possible to suppress the variation in mechanical properties when ec is $9 \times 10^{-5}$ or less. ec in the carbon fiber-reinforced plastic of the invention is preferably $8.5 \times 10^{-5}$ or less and more preferably $8 \times 10^{-5}$ or less.

When the balance between mechanical properties and variations thereof are taken into consideration, a preferred lower limit value of ec according to the fiber length of the carbon fiber to be realistic from the viewpoint of production is as follows. ec is preferably $1.5 \times 10^5$ or more in a case in which the fiber length of the carbon fiber is from 5 to 10 mm. ec is preferably $2 \times 10^{-5}$ or more in a case in which the fiber length of the carbon fiber is more than 10 mm and 35 mm or less. ec is preferably $3 \times 10$- or more in a case in which the fiber length of the carbon fiber is more than 35 mm and 70 mm or less. ec is preferably $4 \times 10^5$ or more in a case in which the fiber length of the carbon fiber is more than 70 mm and 100 mm or less.

[Distribution Parameter Dp]

The three-dimensional dispersion of the carbon fiber in the carbon fiber-reinforced plastic of the sixth invention is represented by the dispersion parameter dp of the carbon fiber in the cross section in the thickness direction of the carbon fiber-reinforced plastic.

dp in the fiber-reinforced plastic of the sixth invention is preferably from 80 to 100.

The heat resistance deteriorates as the value of dp is smaller and the dispersibility of the reinforcing fiber deteriorates. Favorable heat resistance is likely to be obtained when dp is 80 or more. dp in the fiber-reinforced plastic is preferably 84 or more and still more preferably 88 or more. The upper limit value of dp in the fiber-reinforced plastic is 100 as a theoretical value. The realistically preferred upper limit value of dp is 98 from the viewpoint of production.

The fluidity of the fiber-reinforced plastic at the time of shaping is generated by flow of the resin or slipping of the resin layer at the time of shaping. Hence, higher fluidity is obtained at the time of shaping as the pathway through which the resin in the fiber-reinforced plastic can flow is wider. In other words, the fluidity at the time of shaping is higher as dp is smaller. However, in the carbon fiber-reinforced plastic of the sixth invention, high fluidity is exerted even though the value of dp is high by controlling pf to be in the above range.

dp of the respective layers in which the fibers contained are different from one another (a layer containing only the carbon fiber (X), a layer containing the carbon fiber (X) and the carbon fiber (Y), and a layer containing only the carbon fiber (Y)) are respectively calculated by the following operation and the average value (area average) multiplied by the area fraction of the respective layers in the cross section of the sample piece is determined and taken as the final dp. Incidentally, the radius r of the carbon fiber when applying Equation (b9) to the layer containing the carbon fiber (X) and the carbon fiber (Y) is the area average of the radius of the carbon fiber (X) and the radius of the carbon fiber (Y) on the cut section of the layer (average value multiplied by the area fraction of the total cross-sectional area of the carbon fibers (X) and the total cross-sectional area of the carbon fibers (Y)).

<Method for Producing Fiber-Reinforced Plastic>

A method for producing a fiber-reinforced plastic according to the sixth invention is a method including the following steps (i) to (iii).

(i) A step of obtaining a material (A2) containing a prepreg base material in which carbon fibers pulled and aligned in one direction are impregnated with a matrix resin and a cut is formed so as to intersect the fiber axis of the carbon fiber.

(ii) A step of pressing the material (A2) in a state of being heated to a temperature T equal to or higher than a melting point of a matrix resin or equal to or higher than a glass transition temperature of the matrix resin when the matrix resin does not have a melting point while moving the material (A2) in one direction by setting angles φ formed by fiber axis directions of all reinforcing fibers with respect to a direction orthogonal to a moving direction of the material (A2) to from −20° to 20° by using a pressing device which substantially uniformly presses the material (A2) in the orthogonal direction.

(iii) A step of cooling the material (A2) pressed by the pressing device to obtain a fiber-reinforced plastic.

[Prepreg Base Material]

The prepreg base material contains a carbon fiber and a matrix resin. Additives such as a flame retardant, a weathering resistance improver, an antioxidant, a thermal stabilizer, an ultraviolet absorber, a plasticizer, a lubricant, a colorant, a compatibilizer, and a conductive filler may be further blended into the prepreg base material, if necessary.

A cut is formed on the prepreg base material to be used in the step (i) so as to intersect the fiber axis. By this, the carbon fibers which are pulled and aligned in one direction and have a long fiber length are in a state of being cut by the cuts in the prepreg base material.

It is preferable that the prepreg base material to be used in the sixth invention further has the features of the prepreg base material to be used in the first invention. In other words, the prepreg base material to be used in the sixth invention is preferably a prepreg base material in which the region (B) and the region (C) are alternately formed in the direction orthogonal to the fiber axis of the reinforcing fiber. This makes it possible to achieve both the first object and the fifth object.

The shape of the cut to be formed on the prepreg base material is not particularly limited, and it may be, for example, a straight line shape, a curved shape or a polygonal line shape.

The angle of the cut to be formed on the prepreg base material with respect to the fiber axis of the carbon fiber is also not particularly limited.

The length of the carbon fiber cut by the cuts in the prepreg base material is preferably from 1 to 100 mm, more preferably from 3 to 70 mm, still more preferably from 5 to 50 mm, particularly preferably from 10 to 50 mm, most preferably from 10 to 35 mm. It is likely to obtain a fiber-reinforced plastic exhibiting sufficient mechanical properties when the length of the carbon fiber is equal to or longer than the lower limit value. When the length of the carbon fiber is equal to or shorter than the upper limit value, the carbon fiber and the matrix resin are likely to flow at the time of molding and it is thus easy to shape the fiber-reinforced plastic obtained into a structural material having a complicated three-dimensional shape such as ribs.

The volume fraction (Vf) of fiber in the prepreg base material is preferably from 5% to 70% by volume, more preferably from 10% to 60% by volume, and still more preferably from 15% to 50% by volume. It is likely to obtain a structural material exhibiting sufficient mechanical properties when the Vf value is equal to or greater than the lower limit value of the above range. It is likely to obtain excellent fluidity at the time of shaping when the Vf value is equal to or smaller than the upper limit value of the above range.

The thickness of the prepreg base material is preferably from 50 to 500 μm. When the thickness of the prepreg base material is equal to or thicker than the lower limit value, it is easy to handle the prepreg base material. In addition, it is possible to suppress an excessive increase in the number of prepreg base materials laminated in the case of obtaining the material (A2) having a desired thickness by laminating two or more prepreg base materials, and the productivity thus increases. When the thickness of the prepreg base material is equal to or thinner than the upper limit value, it is possible to suppress an excessive increase in voids (pores) inside the prepreg base material to be generated at the time of production of the prepreg base material and it is likely to obtain a fiber-reinforced plastic exhibiting sufficient mechanical properties.

In the sixth invention, the thickness of the prepreg base material hardly affects the strength of the structural material to be finally obtained.

The method for producing a prepreg base material is not particularly limited, and a known method can be adopted. As the prepreg base material, a commercially available prepreg base material may be used.

Examples of the method for forming the cuts on the prepreg base material may include the same ones as those mentioned in the first invention, and preferred aspects thereof are also the same.

[First Aspect of Method for Producing Fiber-Reinforced Plastic]

[Step (i)]

In the present aspect, a prepreg base material (X1) in which carbon fibers (X) pulled and aligned in one direction are impregnated with a matrix resin and a cut is formed so as to intersect the fiber axis of the carbon fiber and a prepreg base material (Y1) using the carbon fiber (Y) instead of the carbon fiber (X) are respectively formed and a laminate (prepreg laminate) containing the prepreg base material (X1) and the prepreg base material (Y1) is used as the material (A2).

The matrix resins in the prepreg base material (X1) and the prepreg base material (Y1) may be different from each other, but it is preferable that the matrix resins are the same as each other.

In the material (A2), the prepreg base material (X1) and the prepreg base material (Y1) are laminated so that the outermost prepreg base material is the prepreg base material (X1) and the fiber axis directions of the carbon fiber (X) and the carbon fiber (Y) in the laminate are substantially the same.

It is more preferable that all the prepreg base materials forming the material (A2) satisfy the condition of angle φ and the fiber axis directions of all the carbon fibers in the material (A2) are the same.

In addition, the deviation of the fiber axis directions of the carbon fibers between the respective prepreg base materials which satisfy the condition of angle in the step (ii) is preferably 40° or less and more preferably 10° or less.

When producing the material (A2), it is preferable to laminate a resin sheet between the prepreg base materials to be laminated to form a resin layer. By this, the fluidity is improved in the step (ii) and it is likely to obtain a fiber-reinforced plastic in which isotropy and anisotropy of the mechanical properties are controlled and the variations in mechanical properties are small.

The resin to be used in the resin layer is not particularly limited, and it may be the same as or different from the matrix resin to be used in the prepreg base material.

It is preferable that the matrix resins in the prepreg base material (X1) and the prepreg base material (Y1) and the resin in the resin layer are the same as each other.

The number of prepreg base materials laminated to constitute the material (A2) is preferably from 2 to 16 and more preferably from 4 to 12. It is likely to obtain a fiber-reinforced plastic exhibiting sufficient mechanical properties when the number of prepreg base materials laminated is equal to or larger than the lower limit value. The laminating work is facilitated and the productivity is excellent when the number of prepreg base materials laminated is equal to or smaller than the upper limit value.

The thickness of the material (A2) is preferably from 0.25 to 6.0 mm, more preferably from 0.4 to 6.0 mm, and still more preferably from 0.5 to 4.0 mm. It is likely to obtain a fiber-reinforced plastic exhibiting sufficient mechanical properties when the thickness of the material (A2) is equal to thicker than the lower limit value. When the thickness of the material (A2) is equal to or thinner than the upper limit value, the fiber axis directions of the carbon fibers in the material (A2) are more likely to be randomized by pressing in the step (ii) to be described later and it is likely to obtain a fiber-reinforced plastic in which isotropy and anisotropy of the mechanical properties are controlled and the variations in mechanical properties are small.

(Step (ii) and Step (iii))

The steps (ii) and (iii) can be performed in the same manner as the steps (ii) and (iii) in the first invention.

[Second Aspect of Method for Producing Fiber-Reinforced Plastic]

The present aspect is greatly different from the first aspect in that the laminate (prepreg laminate) containing the prepreg base material (X1) and the prepreg base material (Y1) is collectively heated and pressed in the step (ii) in the first aspect but a step of heating and pressing the prepreg base material (X1) or a laminate thereof to form an intermediate and a step of heating and pressing the prepreg base material (Y1) or a laminate thereof to form an intermediate are performed separately and the intermediates separately obtained are then integrated to produce the intended fiber-reinforced plastic in the step (ii) in the second aspect.

The prepreg base material (X1) and the prepreg base material (Y1) are respectively the same as those in the first aspect.

[Step (i)]

[Production of Material (A-X)]

In the present aspect, a material (A-X) containing the prepreg base material (X1) is obtained in the step (i). The material (A-X) may be a single layer material composed only of one prepreg base material (X1) or a prepreg laminate formed by laminating two or more prepreg base materials (X1).

In a case in which the material (A-X) is a prepreg laminate, the prepreg base material (X1) is laminated so that the fiber axis directions of the carbon fibers (X) in the laminate are substantially the same.

It is more preferable that all the prepreg base materials (X1) forming the material (A-X) satisfy the condition of angle θ and the fiber axis directions of all the carbon fibers (X) in the material (A-X) are the same.

In addition, the deviation of the fiber axis directions of the carbon fibers (X) between the respective prepreg base materials (X1) which satisfy the condition of angle φ in the step (ii) is preferably 40° or less and more preferably 100 or less.

When producing the material (A-X), it is preferable to laminate a resin sheet between the prepreg base materials (X1) to be laminated to form a resin layer in the same manner as in the first aspect.

The number of prepreg base materials (X1) laminated to constitute the material (A-X) is preferably from 2 to 16 and more preferably from 4 to 12. It is likely to obtain a fiber-reinforced plastic exhibiting sufficient mechanical properties when the number of prepreg base materials laminated is equal to or larger than the lower limit value. The laminating work is facilitated and the productivity is excellent when the number of prepreg base materials laminated is equal to or smaller than the upper limit value.

The thickness of the material (A-X) is preferably from 0.25 to 6.0 mm, more preferably from 0.4 to 6.0 mm, and still more preferably from 0.6 to 4.0 mm. It is likely to obtain a fiber-reinforced plastic exhibiting sufficient mechanical properties when the thickness of the material (A-X) is equal to or thicker than the lower limit value.

When the thickness of the material (A-X) is equal to or thinner than the upper limit value, the fiber axis directions of the carbon fibers in the material (A-X) are more likely to be randomized by pressing in the step (ii) to be described later and it is likely to obtain a fiber-reinforced plastic in which isotropy and anisotropy of the mechanical properties are controlled and the variations in mechanical properties are small.

[Production of Material (A-Y)]

In addition, in the production of a material (A-Y), the material (A-Y) is obtained in the same manner by using the prepreg base material (Y1) instead of the prepreg base material (X1).

(Step (ii) and Step (iii))

In the present aspect, a fiber-reinforced plastic (X2) is obtained in the same manner as in the first aspect by using the material (A-X) instead of the material (A) in the step (ii) and the step (iii). The fiber-reinforced plastic (X2) to be obtained has a sheet shape in which the respective prepreg base materials (X1) constituting the material (A-X) are bonded to each other and integrated, and the carbon fibers (X) in the prepreg base material (X1) are randomized in the fiber-reinforced plastic (X2).

In addition, a fiber-reinforced plastic (Y2) is obtained in the same manner as in the first aspect by using the material (A-Y) instead of the material (A) in the step (ii) and the step (iii) apart from this. The fiber-reinforced plastic (Y2) to be obtained has a sheet shape in which the respective prepreg base materials (Y1) constituting the material (A-Y) are bonded to each other and integrated, and the carbon fibers (Y) in the prepreg base material (Y1) are randomized in the fiber-reinforced plastic (Y2).

[Step (iv)]

The fiber-reinforced plastic (X2) and the fiber-reinforced plastic (Y2) thus obtained are integrated so that the outermost fiber-reinforced plastic is the fiber-reinforced plastic (X2) to obtain the intended fiber-reinforced plastic.

Specifically, it is preferable to laminate one or more layers of fiber-reinforced plastic (X2), one or more layers of fiber-reinforced plastic (Y2), and one or more layers of fiber-reinforced plastic (X2) in this order and to integrate these. For the step of laminating and integrating these, it is possible to use, for example, a thermal welding method, a vibration welding method, a hot pressing method, a heating roll pressing method, or the like.

[Effect]

In the production method of the invention, the carbon fibers (X) and the carbon fibers (Y) flow and the fiber axis directions thereof are randomized by controlling the angle φ to be in a specific range and pressing the material (A), (A-X), or (A-Y) by using a specific pressing device in the step (ii).

In the first aspect, a fiber-reinforced plastic in which the carbon fiber (X) is locally present in the surface layer is obtained by disposing the prepreg base material (X1) as the outermost prepreg base material of the material (A).

In addition, in the second aspect, a fiber-reinforced plastic in which the carbon fiber (X) is locally present in the surface layer is obtained by integrating the fiber-reinforced plastic (X2) and the fiber-reinforced plastic (Y2) so that the outermost fiber-reinforced plastic is the fiber-reinforced plastic (X2).

It is possible not only to achieve excellent isotropy of the mechanical properties of the fiber-reinforced plastic to be obtained but also to control the anisotropy of the mechanical properties as desired by controlling the linear pressure, time, and temperature T at the time of pressing in the step (ii).

For example, it is possible to obtain a fiber-reinforced plastic in which $\sigma_M/\sigma_T$ which represents the ratio of the bending strength in the MD direction to that in the TD direction and is measured by the method to be described later is less than 3.0. It is preferable that $\sigma_M/\sigma_T$ is less than 3.0 from the viewpoint that the fiber-reinforced plastic is particularly isotropic, fracture started from the defect point (place having an extremely weak strength) is likely to be suppressed, and excellent mechanical properties are exhibited.

<Measurement of Bending Strength Ratio ($\sigma_M/\sigma_T$)>

A bending test piece having a length of 100 mm and a width of 25 mm is cut out from the fiber-reinforced plastic to be measured by using a wet cutter and subjected to the three point bending test conducted according to the test method prescribed in JIS K7074 to measure the bending strength. At this time, one in which the longitudinal direction of the bending test piece coincides with the MD direction (direction at 90° with respect to the axial direction of the roll) at the time of production of the fiber-reinforced plastic and one in which the longitudinal direction of the bending test piece coincides with the TD direction (axial direction of the roll) are respectively fabricated and tested. Examples of the testing machine may include the Instron Universal Testing Machine Model 4465. The test is conducted at room temperature (about 23°). The number of test pieces to be measured is set to n=6, respectively, and the average value thereof is calculated to take as the bending strength. Furthermore, the standard deviation is calculated from the measured value of bending strength, and the standard deviation is divided by the average value to calculate the coefficient of variation (CV value, unit: %) which is an index of variation.

The bending strength ratio $\sigma_M/\sigma_T$ is calculated. However, $\sigma_M$ is a bending strength measured at room temperature for a bending test piece in which the longitudinal direction is set to the MD direction at the time of production of the fiber-reinforced plastic. $\sigma_T$ is a bending strength measured at room temperature for a bending test piece in which the longitudinal direction is set to the TD direction at the time of production of the fiber-reinforced plastic.

According to the sixth invention, the bending modulus of elasticity is efficiently improved and a fiber-reinforced plastic having a bending modulus of elasticity and strength in an excellent balance is obtained by using both the carbon fiber (X) and the carbon fiber (Y) as the carbon fiber and allowing the carbon fiber (X) having a particularly high tensile modulus of elasticity to be locally present in the surface layer.

In addition, the fiber-reinforced plastic exhibits favorable fluidity at the time of shaping and can be shaped into a complicated shape such as a three-dimensional shape since the fibers in the fiber-reinforced plastic are randomly disposed.

By shaping the fiber-reinforced plastic of the sixth invention, it is possible to produce a structural material in which the mechanical properties are favorable, isotropy and anisotropy of the mechanical properties are controlled, and the modulus of elasticity is particularly excellent.

Incidentally, in the method for producing a fiber-reinforced plastic of the invention, the method for producing a fiber-reinforced plastic of the first invention can be combined with one or more of the methods for producing a fiber-reinforced plastic described in the third invention, the fifth invention, and the sixth invention.

Hereinafter, the invention will be described in detail with reference to Examples, but the invention is not limited by the description below.

[Evaluation on Swelling]

The evaluation on swelling was conducted by measuring the wound diameter D (m) when the fiber-reinforced plastic was wound around a paper tube having an outer diameter of 0.091 m at a winding torque of 40 N/m by a length of 10 m and calculating D/K described above.

$$K=\{(4LW/\pi\rho)+d^2\}^{1/2}$$

d: diameter (m) of core material,
W: weight per unit area (g/m²) of fiber-reinforced plastic,
$\rho$: true density (g/m³) of fiber-reinforced plastic, and
L: wound length (m) of fiber-reinforced plastic.

[Measurement of Viscoelastic Property (tan δ)]

A circular plate having a diameter of 25 mm was cut out from the fiber-reinforced plastic obtained in each example by using a water jet cutter and used as a specimen.

As a testing device, a rheometer (product name: "AR-G2") manufactured by TA Instruments was used. Two upper and lower parallel plates which had a diameter of 25 mm and was made of aluminum were attached to the testing device, and mapping was conducted to remove residual torque. By conducting this "mapping", accurate measurement is possible. The zero point of the parallel plate gap at the melting point (165° C.) of the matrix resin of the specimen was adjusted, the specimen was then set on the lower plate of the upper and lower parallel plates, and the upper plate was lowered to the position at which the entire surface thereof was in contact with the specimen. The gap (clearance) between the upper and lower parallel plates at this time was taken as the thickness of the specimen at the time of measurement. The specimen was sandwiched between the two parallel plates under the following measurement conditions, a certain distortion was applied thereto, and the storage modulus of elasticity G' and loss modulus of elasticity G", which were the responses at this time, were recorded from a temperature of 135° C. (190° C. in a case in which the matrix resin was nylon 6) which was 30° C. lower than the melting point of the measurement starting temperature while keeping the clearance constant. The value obtained by dividing the loss modulus of elasticity G" by storage modulus of elasticity G' was defined as tan δ.

(Measurement Conditions)
Frequency: 1 Hz,
Distortion: 0.1%,
Temperature range for measurement: 135° C. to 175° C. (190° C. to 230° C. in a case in which the matrix resin was nylon 6),
Rate of temperature rise: 2° C./min, and
Measurement point: every 30 seconds (every 1° C.).

[Fluidity at Time of Shaping]

The fluidity of the fiber-reinforced plastic obtained in each example at the time of shaping was evaluated by the following method.

A plate-like product having a length of 78 mm and a width of 78 mm was cut out from the fiber-reinforced plastic obtained. The plate-like product was superposed one on top of another by the number to have a thickness of about 4 mm, heated at 230° C. for 10 minutes, and pressed under the conditions of 145° C. and 5 MPa for 60 seconds by using a mini test press (product name: MP-2FH, manufactured by Toyo Seiki Seisaku-sho, Ltd.). The initial thickness hA (mm) before press molding and the final thickness hB (mm) after press molding were measured, and the fluidity was evaluated by the ratio hA/hB obtained by dividing the initial thickness by the final thickness.

[Mechanical Properties of Structural Material after Shaping]

The mechanical properties of the structural material after shaping of the fiber-reinforced plastic obtained in each example were evaluated by the following method.

The fiber-reinforced plastic obtained in each example was cut into 220 mm² and superposed one on top of another in the same direction (so that MD, TD, and the direction at the time of lamination were the same) to have a thickness of 4 mm, charged in a far infrared heater type heating device (product name: H7GS-71289, manufactured by NGK Kiln-Tech Co., Ltd.) set at 270° C. (320° C. in a case in which the matrix resin was nylon 6), and heated for 6 minutes. By using a 300 t pressing machine (manufactured by Kawasaki Hydromachanics Corporation) attached with a seal case mold (concave lower mold and convex upper mold) having an area of 310 mm² and a depth of 40 mm, the mold temperature was set to 90° C. and the molding pressure was set to 18 MPa, the fiber-reinforced plastic in which the resin was melted by heating was charged in the central portion of the lower mold of the mold and pressed for 1 minute to obtain a stamping-molded article (structural material) having an area of 310 mm² and a thickness of 2 mm. At this time, the time from when the fiber-reinforced plastic was taken out from the far infrared heater type heating device to when it was pressed was 25 seconds.

A bending test piece having a length of 100 mm and a width of 25 mm was cut out from the stamping-molded article thus obtained by using a wet cutter and subjected to the three-point bending test conducted according to the test method prescribed in JIS K7074. At this time, six bending test pieces in which the longitudinal direction of the bending test piece coincided with the MD direction (direction at 90° with respect to the axial direction of the roll) at the time of production of the fiber-reinforced plastic and six bending test pieces in which the longitudinal direction of the bending test piece coincided with the TD direction (axial direction of the roll) were respectively fabricated, 12 bending test pieces were subjected to the test in total, and the average value thereof was recorded as the bending strength. As the testing machine, Instron Universal Testing Machine Model 4465 was used. In addition, the test was conducted at room temperature (23° C.) and 80° C. Furthermore, the standard deviation was calculated from the measured value of bending strength at room temperature (23° C.), and the coefficient of variation (CV value, unit: %), which was an index of variation, was calculated by dividing the standard deviation by the average value.

In addition, the ratio $\sigma_{80°\ C.}/\sigma_{RT}$ (unit: %) was calculated as the bending strength retention rate at 80° C. Where, $\sigma_{80°\ C.}$ is a bending strength measured at 80° C. $\sigma_{RT}$ is the bending strength measured at room temperature.

Incidentally, with regard to Comparative Examples 2 to 10 in which a clear MD direction and a clear TD direction were not decided at the time of production, an arbitrary direction was defined as the MD direction and the direction orthogonal to the MD direction was defined as the TD direction.

[Measurement of Void Fraction]

A fiber-reinforced plastic was cut in the thickness direction by using a wet cutter, the cross section thereof was mirror polished and then observed under an optical microscope, and the proportion of the area occupied by voids with respect to the cross sectional area of the cut section was measured as the void fraction.

[Evaluation on Mechanical Properties]

<Measurement of Bending Strength, Coefficient of Variation (CV Value), and Bending Strength Retention Rate at 80° C.>

The fiber-reinforced plastic obtained in each example was cut into 300 mm², and this was superposed one on top of another in the same direction (so that MD, TD, and the direction at the time of lamination were the same) to have a thickness of 2 mm. The laminate was placed in a seal case mold having an area of 310 mm² and a depth of 15 mm and heated to 200° C. (250° C. in a case in which the matrix resin was nylon 6) and then heated and pressed from both sides at a pressure of 0.1 Mpa for 2 minutes by the face of a board at 200° C. (250° C. in a case in which the matrix resin was nylon 6) by using a multistage press (compression molding machine manufactured by SHINTO Metal Industries Corporation, product name: SFA-50HH0). Thereafter, the resultant was cooled to room temperature at the same pressure, thereby obtaining a plate-like fiber-reinforced plastic plate having a thickness of 2 mm. A bending test piece having a length of 100 mm and a width of 25 mm was cut out from the fiber-reinforced plastic plate thus obtained by using a wet cutter and subjected to the three point bending test conducted according to the test method prescribed in JIS K7074 to measure the bending strength. At this time, six bending test pieces in which the longitudinal direction of the bending test piece coincided with the MD direction (direction at 90° with respect to the axial direction of the roll) at the time of production of the fiber-reinforced plastic and six bending test pieces in which the longitudinal direction of the bending test piece coincided with the TD direction (axial direction of the roll) were respectively fabricated, 12 bending test pieces were subjected to the test in total, and the average value thereof was recorded as the bending strength. As the testing machine, Instron Universal Testing Machine Model 4465 was used. In addition, the test was conducted at room temperature (23° C.) and 80° C. Furthermore, the standard deviation was calculated from the measured value of bending strength at room temperature (23° C.), and the coefficient of variation (CV value, unit: %), which was an index of variation, was calculated by dividing the standard deviation by the average value.

In addition, the ratio $\sigma_{80°\ C.}/\sigma_{RT}$ (unit: %) was calculated as the bending strength retention rate at 80° C. Where, $\sigma_{80°\ C.}$ is a bending strength measured at 80° C. $\sigma_{RT}$ is the bending strength measured at room temperature.

Incidentally, with regard to Comparative Examples 2 to 10 in which a clear MD direction and a clear TD direction were not decided at the time of production, an arbitrary direction was defined as the MD direction and the direction orthogonal to the MD direction was defined as the TD direction.

[Evaluation on Pf and Ec]

pf and ec were measured according to the pf measurement method and ec measurement method described above, respectively. The X-ray diffraction measurement was conducted by placing the measurement sample on the platform, taking Cu as the target, and using an X-ray diffraction apparatus (TTR-III, manufactured by Rigaku Corporation) equipped with a fiber sample platform.

Specifically, the measurement sample was rotated by taking the thickness direction thereof as the axis while being irradiated with X-rays from above of the measurement sample, and the diffracted X-ray was captured by a detector disposed at a diffraction angle 2θ=24.5°. As a standard sample, one having Vf of 35% by volume was used.

[Evaluation on Dp]

A sample piece of 3 cm² was cut out from a fiber-reinforced plastic and embedded in the Technovit 4000 manufactured by Kulzer GmbH. After Technovit 4000 was cured, the sample piece was then polished so that the cross section thereof was exposed as a mirror surface treatment.

Subsequently, a cross-sectional photograph of the sample piece was taken under the following conditions.

(Photographing Condition)

Apparatus: Industrial optical microscope BX51M manufactured by Olympus Corporation, Magnification of lens: 500-fold, and Dot pitch for photographing: 0.17 μm.

The portion corresponding to a range of (0.5 mm in the thickness direction×0.5 mm in the direction orthogonal to the thickness direction) in the cross section of the sample piece in the cross-sectional photograph thus obtained was taken as the image to be processed. dp was calculated according to the measurement method of dp described above by using the Software Win-Roof as the image editing software. The calculation of dp was conducted for five places in the cross section of each sample piece, and the average value thereof was determined.

[Measurement of Vf(a) and Vv(a)]

A test piece A was cut out from the fiber-reinforced plastic and the density ρA of the test piece A was measured in conformity to ISO 1183 "Immersion method".

The mass of the test piece A was measured to one place of decimals in mg and defined as $W_A$. The test piece A was tied with a nichrome wire, and the total mass of the test piece A and the nichrome wire was measured to one place of decimals in mg and defined as $W_B$. The Bunsen burner was ignited, the height of flame was adjusted to from 15 to 20 cm, the air was then gradually supplied thereto, and the height of the reducing flame (blue flame) was adjusted to about 2 cm. Subsequently, the nichrome wire with which the test piece A was tied was grasped with tweezers and the entire test piece A was horizontally brought into the flame at the part slightly above the reducing flame so as not to come into contact with the reducing flame of the Bunsen burner. The test piece A was heated until the lower surface of the test piece A glowed, and the test piece A was then reversed and heated until the other side glowed and red flame did not emit from the test piece A any longer. The time for heating was within 3 minutes. The test piece A was removed from the flame, immediately placed on a metal plate, cooled to room temperature, and then stored in a desiccator. Subsequently, the total mass of the test piece A and the nichrome wire after burning was measured to one place of decimals in mg and defined as $W_C$. The mass fraction Wf(a) (%) of fiber was calculated by the following Equation (c3).

$$Wf(a)=(W_A-W_B+W_C)/W_A\times100 \quad (c3)$$

Subsequently, the volume fraction Vf(a) (%) of fiber was calculated by the following Equation (c4), and the void content Vv(a) (%) was further calculated by the following Equation (c5).

$$Vf(a)=Wf(a)\times\rho_A/\rho f_A \quad (c4)$$

$$Vv(a)=100-(Wf(a)+Vr(a)) \quad (c5)$$

Where, the symbols in Equation (c4) and Equation (c5) have the following meanings.

$\rho f_A$: density (g/cm$^3$) of carbon fiber used in test piece A, and

Vr(a): volume fraction (%) of resin in test piece.
[Measurement of Vf(b) and Vv(b)]

A test piece B of 3 cm$^2$ was cut out from the fiber-reinforced plastic and embedded in the Technovit 4000 manufactured by Kulzer GmbH. After Technovit 4000 was cured, the test piece B was then polished so that the cross section thereof was exposed as a mirror surface treatment. Subsequently, a cross-sectional photograph of the test piece B was taken under the following conditions.

(Photographing Condition)
Apparatus: Industrial optical microscope BX51M manufactured by Olympus Corporation,
Magnification of lens: 500-fold, and
Dot pitch for photographing: 0.17 μm.

The portion corresponding to a range of (0.5 mm in the thickness direction×0.5 mm in the direction orthogonal to thickness direction) in the cross-sectional photograph of the test piece B thus obtained was taken as the image to be processed. The image to be processed was subjected to image processing using the Software Win-Roof as the image editing software to respectively measure the area Sf of the fiber portion, the area Sr of the resin portion, and the area Sv of the void portion, and the volume fraction Vf(b) of fiber and the void content Vv(b) were calculated by the following Equations (c6) and (c7).

$$Vf(b)=Sf/(Sf+Sr+Sv) \quad (c6)$$

$$Vv(b)=Sv/(Sf+Sr+Sv) \quad (c7)$$

Production Example 1: Production of Prepreg Base Material (X-1)

A PAN-based carbon fiber (PYROFIL CF TOW manufactured by Mitsubishi Rayon Co., Ltd., product number: TR50S 15L, diameter of carbon fiber: 7 μm, number of filaments: 15,000, weight per unit length of tow: 1.0 g/m, and specific gravity: 1.82) was pulled and aligned in one direction and into a flat shape to obtain a fiber sheet having a weight per unit area of 72 g/m$^2$. The fiber sheet was sandwiched from both sides by a film which was composed of an acid-modified polypropylene resin (MODIC manufactured by Mitsubishi Chemical Corporation, product number: P958V, MFR: 50, and specific gravity: 0.91) and had a weight per unit area of 36 g/m$^2$ and heated and pressed by being allowed to pass through the calender roll plural times to impregnate the fiber sheet with the resin, thereby fabricating a prepreg base material (X-1) having a volume fraction (Vf) of fiber of 33% by volume, a weight per unit area of 149 g/m$^2$, and a theoretical thickness of 123 μm.

Production Example 2: Production of Prepreg Base Material (X-2)

A carbon fiber (PYROFIL CF TOW manufactured by Mitsubishi Rayon Co., Ltd., product number: TR50S 15L, diameter of carbon fiber: 7 μm, number of filaments: 15,000, weight per unit length of tow: 1.0 g/m, and specific gravity: 1.82) was pulled and aligned in one direction and into a flat shape to obtain a fiber sheet having a weight per unit area of 150 g/m$^2$. The fiber sheet was sandwiched from both sides by a film which was composed of an acid-modified polypropylene resin (MODIC manufactured by Mitsubishi Chemical Corporation, product number: P958V, MFR: 50, and specific gravity: 0.91) and had a weight per unit area of 72 g/m$^2$ and heated and pressed by being allowed to pass through the calender roll two times to semi-impregnate the fiber sheet with the resin, thereby fabricating a prepreg base material (X-2) having a void fraction of 35%, a volume fraction (Vf) of fiber of 34% by volume, a weight per unit area of 296 g/m$^2$, and a theoretical thickness of 242 μm.

Production Example 3: Production of Prepreg Base Material (X-3)

A prepreg base material (X-3) having a void fraction of 35%, a volume fraction (Vf) of fiber of 34% by volume, a weight per unit area of 296 g/m$^2$, and a theoretical thickness of 242 μm was fabricated in the same manner as in Production Example 2 except that a tow using a carbon fiber (PYROFIL CF TOW manufactured by Mitsubishi Rayon Co., Ltd., product number: TRW40 50L, diameter of single fiber: 7 μm, roundness of single fiber: 0.9, number of filaments: 50,000, weight per unit length of tow: 3.75 g/m) as a single fiber was used.

Production Example 4: Production of Pitch-Based Prepreg Base Material

A pitch-based carbon fiber (manufactured by Mitsubishi Rayon Co., Ltd., product name: DIALEAD K63712, tensile modulus of elasticity: 640 GPa, and specific gravity: 2.12) of the carbon fiber (X) was pulled and aligned in one direction and into a flat shape to obtain a fiber sheet having a weight per unit area of 83 g/m$^2$. The fiber sheet was sandwiched from both sides by a film which was composed of an acid-modified polypropylene resin (MODIC manufactured by Mitsubishi Chemical Corporation, product number: P958V, and MFR: 50) and had a weight per unit area of 36 g/m² and heated and pressed by being allowed to pass through the calender roll plural times to impregnate the fiber sheet with the resin, thereby fabricating a pitch-based prepreg base material having a volume fraction (Vf) of fiber of 33% by volume and a thickness of 120 μm.

Production Example 5: Production of Prepreg Base Material (X-4)

A carbon fiber (PYROFIL CF TOW manufactured by Mitsubishi Rayon Co., Ltd., product number: TR50S 15L) was pulled and aligned in one direction and into a flat shape to obtain a fiber sheet having a weight per unit area of 105 g/m². The fiber sheet was sandwiched from both sides by a film which was composed of an acid-modified polypropylene resin (MODIC manufactured by Mitsubishi Chemical Corporation, product number: P958V) and had a weight per unit area of 27 g/m². This was heated and pressed by being allowed to pass through the calender roll plural times to impregnate the fiber sheet with the resin, thereby fabricating a prepreg base material (X-4) having a volume fraction (Vf) of fiber of 49% by volume and a theoretical thickness of 120 m.

Production Example 6: Production of Prepreg Base Material (X-5)

A prepreg base material (X-5) having a volume fraction (Vf) of fiber of 33% by volume, a weight per unit area of 149 g/m², and a theoretical thickness of 123 μm was fabricated in the same manner as in Production Example 1 except that a film composed of a polypropylene resin (NOVATEC manufactured by Japan Polypropylene Corporation, product number: SA06GA, MFR: 60, and specific gravity: 0.91) was used.

Production Example 7: Production of Prepreg Base Material (X-6)

A prepreg base material (X-6) having a volume fraction (Vf) of fiber of 33% by volume, a weight per unit area of 170 g/m², and a theoretical thickness of 125 μm was fabricated in the same manner as in Production Example 1 except that a film which was composed of a nylon 6 resin (UBE Nylon manufactured by UBE INDUSTRIES, LTD., product number: 1013B, and specific gravity: 1.14) and had a weight per unit area of 45 g/m² was used.

Production Example 8: Production of Prepreg Base Material (X-7)

A prepreg base material (X-7) having a volume fraction (Vf) of fiber of 49% by volume, a weight per unit area of 174 g/m², and a theoretical thickness of 120 μm was fabricated in the same manner as in Production Example 6 except that a film which was composed of a nylon 6 resin (UBE Nylon manufactured by UBE INDUSTRIES, LTD., product number: 1013B, and specific gravity: 1.14) and had a weight per unit area of 34 g/m² was used.

Production Example 9: Production of Prepreg Base Material (X-8)

A prepreg base material (X-8) having a void fraction of 35%, a volume fraction (Vf) of fiber of 34% by volume, a weight per unit area of 332 g/m², and a theoretical thickness of 242 μm was fabricated in the same manner as in Production Example 1 except that a film which was composed of a nylon 6 resin (UBE Nylon manufactured by UBE INDUSTRIES, LTD., product number: 1013B, and specific gravity: 1.14) and had a weight per unit area of 91 g/m² was used.

Example 1

A rectangular prepreg base material of 300 mm (direction at 0° with respect to the fiber axis)×900 mm (direction at 90° with respect to the fiber axis) was cut out from the prepreg base material (X-1) obtained in Production Example 1. A cut having a depth to cut the reinforcing fiber was formed on the prepreg base material by using a cutting plotter (L-2500 Cutting Plotter manufactured by LASERCK), thereby obtaining a cut prepreg base material. The cutting was conducted so that a region (B) in which a plurality of cuts (b) to form an angle θ of +45° with the fiber axis of the reinforcing fiber were formed in the fiber axis direction of the reinforcing fiber in one row and a region (C) in which a plurality of cuts (c) to form an angle θ of −45° with the fiber axis of the reinforcing fiber were formed in the fiber axis direction of the reinforcing fiber in one row were alternately formed in the direction orthogonal to the fiber axis of the reinforcing fiber as illustrated in FIG. 1. The angle θ took the anticlockwise rotation with respect to the fiber axis of the reinforcing fiber in a planar view as the positive. The fiber length of the reinforcing fiber cut by the cuts was 25 mm.

A prepreg laminate was obtained by laminating four prepreg base materials so that the fiber axes of the reinforcing fibers were in the same direction. The thickness of the prepreg laminate was 0.5 mm.

A plurality of prepreg laminates were continuously charged in a double belt hot press which was equipped with upper and lower belts to drive at 1.0 m/min and illustrated in FIG. 4 so as to have an angle φ formed by the fiber axis directions of the reinforcing fibers in the prepreg laminate with respect to the direction orthogonal to the moving direction of the prepreg laminate (the axial direction of the press roll) of 0° and to prevent the formation of gaps before and after the respective prepreg laminates. In the double belt hot press, the prepreg laminate was heated and pressed in a state in which the thermoplastic resin was melted by a two-stage press roll under the conditions of a roll temperature of 270° C. and a linear pressure of 10.7 N/m. Thereafter, the resultant was allowed to pass through a 1.5 m cooling section equipped with a single-stage hot water roll under the conditions of a roll temperature of 30° C. and a linear pressure of 2.5 N/m to solidify the thermoplastic resin, thereby obtaining a fiber-reinforced plastic. Incidentally, the apparent moving speed of the prepreg laminate is the same as the driving speed of the belt.

The thickness of the fiber-reinforced plastic thus obtained was 0.45 mm, the weight per unit area W thereof was 545 g/m, and the true density ρ thereof was $1.21 \times 10^6$ g/m³ (1.21 g/cm³).

Swelling and warpage were not observed from the fiber-reinforced plastic when the fiber-reinforced plastic thus obtained was wound around a core material (paper tube) having a diameter d of 0.091 m at a winding torque of 40 N·m. In addition, the wound diameter D when the wound length L was set to 10 m was 0.135 m, and the fiber-reinforced plastic was wound without collapse.

Incidentally, D/K at this time was 1.14.

Example 2

A prepreg laminate was obtained in the same manner as in Example 1 by using the prepreg base material (X-1) obtained in Production Example 1.

The prepreg laminate was charged in a double belt hot press which was equipped with upper and lower belts to drive at 1.0 m/min and illustrated in FIG. 4 so as to have the angle φ of 0°. In the double belt hot press, the prepreg laminate was heated and pressed in a state in which the thermoplastic resin was melted by a two-stage press roll under the conditions of a roll temperature of 270° C. and a clearance between the belts directly under the roll of 300 μm. Thereafter, the resultant was allowed to pass through a 1.5 m cooling section equipped with a single-stage hot water roll under the conditions of a roll temperature of 30° C. and a clearance between the belts directly under the roll of 300 μm to solidify the thermoplastic resin, thereby obtaining a fiber-reinforced plastic.

Incidentally, the apparent moving speed of the prepreg laminate is the same as the driving speed of the belt.

Example 3

A prepreg laminate was obtained in the same manner as in Example 1 by using the prepreg base material (X-2) obtained in Production Example 2. The thickness of the prepreg laminate was 485 m. Subsequently, a fiber-reinforced plastic was obtained in the same manner as in Example 1 by using the prepreg laminate thus obtained.

Example 4

A prepreg laminate was obtained in the same manner as in Example 1 by using the prepreg base material (X-3) obtained in Production Example 3. The thickness of the prepreg laminate was 485 μm. Subsequently, a fiber-reinforced plastic was obtained in the same manner as in Example 1 by using the prepreg laminate thus obtained.

Example 5

A rectangular prepreg base material of 300 mm (direction at 0° with respect to the fiber axis)×900 mm (direction at 90° with respect to the fiber axis) was cut out from the prepreg base materials obtained in Production Example 1 and Production Example 4, respectively. The same cutting as in Example 1 was conducted, thereby obtaining PAN-based and pitch-based cut prepreg base materials (X1) and (Y1). These cut prepreg base materials were laminated by four sheets in the order of [pitch-based prepreg base material (X1)/PAN-based prepreg base material (Y1)/PAN-based prepreg base material (Y1)/pitch-based prepreg base material (X1)] so that the fiber axes of the carbon fibers were in the same direction, thereby obtaining a prepreg laminate. The thickness of the prepreg laminate is 0.5 mm. A fiber-reinforced plastic is obtained in the same manner as in Example 1 by using the prepreg laminate.

An excellent modulus of elasticity is obtained from the fiber-reinforced plastic thus obtained.

Example 6

Cut prepreg base materials (X1) and (Y1) are obtained in the same manner as in Example 5.

These cut prepreg base materials (X1) are laminated by four sheets so that the fiber axes of the carbon fibers (X) are in the same direction, thereby obtaining a prepreg laminate (a). The prepreg laminate (a) was heated and pressed by a double belt hot press and then cooled to solidify the thermoplastic resin in the same manner as in Example 1, thereby obtaining a fiber-reinforced plastic (a). The thickness of the fiber-reinforced plastic (a) is 0.5 mm.

A prepreg laminate (b) is obtained by laminating four sheets of the cut prepreg base material (Y1) so that the fiber axes of the carbon fibers (Y) are in the same direction apart from this. The prepreg laminate (b) was heated and pressed by a double belt hot press and then cooled to solidify the thermoplastic resin in the same manner as in Example 1, thereby obtaining a fiber-reinforced plastic (b). The thickness of the fiber-reinforced plastic (b) is 0.5 mm.

The fiber-reinforced plastic (a) and fiber-reinforced plastic (b) thus obtained are laminated in the order of [fiber-reinforced plastic (a)/fiber-reinforced plastic (b)/fiber-reinforced plastic (b)/fiber-reinforced plastic (a)] and heated and pressed from both sides at a pressure of 0.1 Mpa for 2 minutes by the face of a board at 200° C. by using a multistage press (compression molding machine manufactured by SHINTO Metal Industries Corporation, product name: SFA-50HH0). Thereafter, the resultant was cooled to room temperature at the same pressure, thereby obtaining a plate-like fiber-reinforced plastic plate having a thickness of 2 mm. The volume fraction of fiber in the fiber-reinforced plastic thus obtained is 33% by volume.

An excellent modulus of elasticity is obtained from the fiber-reinforced plastic thus obtained.

Example 7

A fiber-reinforced plastic was obtained in the same manner as in Example 1 except that the prepreg base material (X-4) obtained in Production Example 5 was used and the belt driving speed was set to 0.5 m/min.

Example 8

A fiber-reinforced plastic was obtained in the same manner as in Example 1 except that the prepreg base material (X-5) obtained in Production Example 6 was used.

Example 9

A fiber-reinforced plastic was obtained in the same manner as in Example 1 except that the prepreg base material (X-5) obtained in Production Example 6 was used and the fiber length of the reinforcing fiber cut by the cuts was set to 12.5 mm.

Example 10

A fiber-reinforced plastic was obtained in the same manner as in Example 1 except that the prepreg base material (X-6) obtained in Production Example 7 was used, the roll temperature at the time of heating and pressing was set to 380° C., and the belt driving speed was set to 0.8 m/min.

Example 11

A fiber-reinforced plastic was obtained in the same manner as in Example 1 except that the prepreg base material (X-7) obtained in Production Example 8 was used, the roll temperature at the time of heating and pressing was set to 380° C., and the belt driving speed was set to 0.4 m/min.

Example 12

A fiber-reinforced plastic was obtained in the same manner as in Example 1 except that the angle θ of the cut (b) was set to +300 and the angle θ of the cut (c) was set to −30°.

Example 13

A fiber-reinforced plastic was obtained in the same manner as in Example 1 except that the angle θ of the cut (b) was set to +600 and the angle θ of the cut (c) was set to −60°.

Example 14

A fiber-reinforced plastic was obtained in the same manner as in Example 1 except that the prepreg base material (X-8) obtained in Production Example 9 was used.

Comparative Example 1

A fiber-reinforced plastic was obtained in the same manner as in Example 1 except that cuts were formed so that the angles θ formed by the fiber axes of the reinforcing fibers and the cuts were all +45°.

Swelling and warpage were observed from the fiber-reinforced plastic when the fiber-reinforced plastic thus obtained was wound around a core material (paper tube) having a diameter d of 0.091 m at a winding torque of 40 N·m. In addition, the wound diameter D when the wound length L was set to 10 m was 180 mm, and the fiber-reinforced plastic was greatly collapsed.

Comparative Example 2

A prepreg base material of 300 mm² was cut out from the prepreg base material (X-1) obtained in Production Example 1, and a cut having a straight line shape was formed on the prepreg base material at regular intervals by using a cutting plotter (L-2500 Cutting Plotter manufactured by LASERCK), thereby obtaining a cut prepreg base material. The cutting was conducted in the portion on the inner side of the portion at 5 mm from the periphery of the prepreg base material so that the fiber length of the carbon fiber was 25.0 mm, the length of the cut was 20.0 mm, and the angles θ formed by the fiber axes of the reinforcing fibers and the cuts were all +45°. Sixteen cut prepreg base materials were laminated so that the fiber directions of the respective cut prepreg base materials were 0°/45°/90°/−45°/−45°/90°/45°/0°/0°/45°/90°/−45°/−45°/90°/45°/0° from the top. The cut prepreg base materials thus laminated were spot-welded to one another by using an ultrasonic welding machine (manufactured by Emerson Japan, Ltd., product name: 2000 LPT), thereby fabricating a quasi-isotropic ([0/45/90/−45]s2) prepreg laminate.

The prepreg laminate was placed in a seal case mold having an area of 310 mm² and a depth of 15 mm and heated to 200° C. and then heated and pressed at a pressure of 0.1 Mpa for 2 minutes by the face of a board at 200° C. by using a multistage press (compression molding machine manufactured by SHINTO Metal Industries Corporation, product name: SFA-50HH0). Thereafter, the laminate was cooled to room temperature at the same pressure, thereby obtaining a plate-like fiber-reinforced plastic having a thickness of 2 mm.

Comparative Example 3

A cut prepreg base material was obtained in the same manner as in Example 1 by using the prepreg base material (X-5) obtained in Production Example 6.

Subsequently, a prepreg laminate was formed in the same manner as in Comparative Example 2 by using the cut prepreg base material, thereby obtaining a fiber-reinforced plastic.

Comparative Example 4

A quasi-isotropic ([0/45/90/−45]s) prepreg laminate was fabricated by laminating eight prepreg base materials (X-2) obtained in Production Example 2 so that the fiber directions of the respective cut prepreg base materials were 0°/45°/90°/−45°/−45°/90°/45°/0°. Subsequently, a fiber-reinforced plastic was obtained in the same manner as in Comparative Example 2 by using the prepreg laminate.

Comparative Example 5

In the present example, a sheet-like fiber-reinforced plastic is produced by dispersing tape-like prepreg base material pieces having a narrow width on a flat surface and integrating these by press molding.

The pitch-based prepreg base material obtained in Production Example 4 was slit into a band shape having a width of 15.0 mm and then continuously cut to have a length of 25.0 mm by using a guillotine-type cutting machine, thereby obtaining a chopped strand prepreg (pitch-based) having a fiber length of 25.0 mm.

The PAN-based prepreg base material obtained in Production Example 1 was slit into a band shape having a width of 15.0 mm and then continuously cut to have a length of 25.0 mm by using a guillotine-type cutting machine, thereby obtaining a chopped strand prepreg (PAN-based) having a fiber length of 25.0 mm.

A mixture obtained by mixing 118 g of the chopped strand prepreg (pitch-based) and 109 g of chopped strand prepreg (PAN-based) thus obtained is freely dropped one by one from a height of 30 cm into a seal case mold having an area of 300 mm² and a depth of 15 mm and laminated so that the fibers are randomly oriented. The volumes of the pitch-based and PAN-based chopped strand prepregs to be mixed are equal to each other.

Thereafter, the seal case mold is heated to 200° C. and heated and pressed at a pressure of 0.1 Mpa for 2 minutes by the face of a board at 200° C. by using the multistage press. Thereafter, the resultant was cooled to room temperature at the same pressure, thereby obtaining a plate-like fiber-reinforced plastic having a thickness of 2 mm.

The volume fraction of fiber in the fiber-reinforced plastic thus obtained is 33% by volume.

The fiber-reinforced plastic thus obtained is inferior in modulus of elasticity to Examples 5 and 6.

Comparative Example 6

In the present example, a fiber-reinforced plastic is produced by dispersing a carbon fiber through papermaking.

The pitch-based carbon fiber used in Production Example 4 was cut into 6 mm by using a rotary cutter to obtain a chopped pitch-based carbon fiber. The PAN-based carbon fiber used in Production Example 1 was cut into 6 mm to obtain a chopped PAN-based carbon fiber. A fiber composed of an acid-modified polypropylene resin (manufactured by Mitsubishi Chemical Corporation, product name: MODIC P958V, and MFR: 50) are cut into 3 mm to obtain a chopped polypropylene fiber.

To 110 kg of an aqueous solution of polyethylene oxide having a mass concentration of 0.12%, 0.74 kg of the chopped polypropylene fiber is added and sufficiently stirred by using a stirrer. Subsequently, 0.215 kg of the chopped pitch-based carbon fiber and 0.185 kg of the chopped PAN-based carbon fiber are added thereto and stirred for 10 seconds, thereby obtaining a dispersion. The volumes of the pitch-based and PAN-based chopped strand prepregs to be mixed are equal to each other.

The dispersion thus obtained was poured into a mesh frame of 100 cm$^2$, and the aqueous solution of polyethylene oxide is filtered and the moisture is then completely removed in a dryer at 120° C., thereby obtaining a prepreg base material having a volume fraction of fiber of 20% by volume (mass fraction of fiber of 35% by mass) and a weight per unit area of 1.12 kg/m$^2$.

The prepreg base material thus obtained is cut into 30 cm$^2$, and two prepreg base materials are superposed one on top of the other to obtain a prepreg laminate. The prepreg laminate was placed in a seal case mold having an area of 310 mm$^2$ and a depth of 15 mm and heated to 200° C. and then heated and pressed at a pressure of 0.1 Mpa for 2 minutes by the face of a board at 200° C. by using a multistage press, and the resultant was then cooled to room temperature at the same pressure, thereby obtaining a plate-like fiber-reinforced plastic having a thickness of 2 mm.

The volume fraction of fiber in the fiber-reinforced plastic thus obtained is 20% by volume.

The fiber-reinforced plastic thus obtained is inferior in modulus of elasticity to Examples 5 and 6.

Comparative Example 7

The prepreg base material X-4 obtained in Production Example 5 was slit into a band shape having a width of 15.0 mm and then continuously cut to have a length of 25.0 mm by using a guillotine-type cutting machine, thereby obtaining a chopped strand prepreg having a fiber length of 25.0 mm. The chopped strand prepreg thus obtained was weighed by 244 g and freely dropped one by one from a height of 30 cm into a seal case mold having an area of 300 mm$^2$ and a depth of 15 mm and laminated so that the fibers are randomly oriented.

The seal case mold in which the chopped strand prepreg was laminated was heated to 200° C. and heated and pressed at a pressure of 0.1 Mpa for 2 minutes by the face of a board at 200° C. by using a multistage press (compression molding machine manufactured by SHINTO Metal Industries Corporation, product name: SFA-50HH0). Thereafter, the resultant was cooled to room temperature at the same pressure, thereby obtaining a plate-like fiber-reinforced plastic plate having a thickness of 2 mm. The fiber-reinforced plastic which was thus obtained and had a thickness of 2 mm was subjected to the measurement of pf, ec, and dp.

Comparative Example 8

A carbon fiber (PYROFIL TR50S manufactured by Mitsubishi Rayon Co., Ltd.) was cut into 6 mm by using a rotary cutter to obtain a chopped carbon fiber. In the same manner, a fiber composed of an acid-modified polypropylene resin (MODIC P958V manufactured by Mitsubishi Chemical Corporation, MFR: 50) were cut into 3 mm to obtain a chopped polypropylene fiber. To 110 kg of an aqueous solution of polyethylene oxide having a mass concentration of 0.12%, 0.74 kg of the chopped polypropylene fiber was added and sufficiently stirred by using a stirrer. Subsequently, 0.37 kg of the chopped carbon fiber was added thereto and stirred for 10 seconds, thereby obtaining a dispersion. The dispersion thus obtained was poured into a mesh frame of 100 cm$^2$, and the aqueous solution of polyethylene oxide was filtered and the moisture was then completely removed in a dryer at 120° C., thereby obtaining a prepreg base material having a volume fraction of fiber of 20% by volume (mass fraction of fiber of 33% by mass) and a weight per unit area of 1.11 kg/m$^2$. The prepreg base material thus obtained was cut into 30 cm$^2$, and two prepreg base materials were superposed one on top of the other to obtain a prepreg laminate. The prepreg laminate was placed in a seal case mold having an area of 310 mm$^2$ and a depth of 15 mm and heated to 200° C. and then heated and pressed at a pressure of 0.1 Mpa for 2 minutes by the face of a board at 200° C. by using a multistage press (compression molding machine manufactured by SHINTO Metal Industries Corporation, product name: SFA-50HH0). Thereafter, the prepreg laminate was cooled to room temperature at the same pressure, thereby obtaining a plate-like fiber-reinforced plastic having a thickness of 2 mm.

Comparative Example 9

A chopped carbon fiber and a chopped polypropylene fiber were obtained in the same manner as in Comparative Example 8. To 115 kg of an aqueous solution of polyethylene oxide having a mass concentration of 0.12%, 0.63 kg of the chopped polypropylene fiber was added and sufficiently stirred by using a stirrer. Subsequently, 0.54 kg of the chopped carbon fiber was added thereto and stirred for 10 seconds, thereby obtaining a dispersion. The dispersion thus obtained was poured into a mesh frame of 100 cm$^2$, and the aqueous solution of polyethylene oxide was filtered and the moisture was then completely removed in a dryer at 120° C., thereby obtaining a prepreg base material having a volume fraction of fiber of 30% by volume (mass fraction of fiber of 46% by mass) and a weight per unit area of 1.17 kg/m$^2$. The prepreg base material thus obtained was cut into 30 cm$^2$, and two prepreg base materials were superposed one on top of the other to obtain a prepreg laminate. A plate-like fiber-reinforced plastic having a thickness of 2 mm was obtained in the same manner as in Comparative Example 8 by using this prepreg laminate.

Comparative Example 10

A fiber-reinforced plastic was obtained in the same manner as in Comparative Example 2 except that the prepreg base material (X-5) obtained in Production Example 6 was used.

Comparative Example 11

A fiber-reinforced plastic was obtained in the same manner as in Example 1 except that the angle θ of the cut (b) was set to +90° and the angle θ of the cut (c) was set to −90°.

The conditions and evaluation results for each example are presented in Tables 1 to 3.

Incidentally, "DBP randomization" in Tables 1 to 3 means a method for randomizing the fiber axis directions of reinforcing fibers through pressing using a double belt hot press.

TABLE 1

| | Prepreg base material | | | | | |
|---|---|---|---|---|---|---|
| | Kind | Matrix resin | Shape of slit | Fiber length mm | Volume fraction of fiber % | Production method of fiber-reinforced plastic |
| Example 1 | Production Example 1 | Acid-modified PP | +45° and −45° | 25 | 33 | DBP randomization |
| Example 7 | Production Example 5 | Acid-modified PP | +45° and −45° | 25 | 49 | DBP randomization |
| Example 8 | Production Example 6 | PP (unmodified) | +45° and −45° | 25 | 33 | DBP randomization |
| Example 9 | Production Example 6 | PP (unmodified) | +45° and −45° | 12.5 | 33 | DBP randomization |
| Example 10 | Production Example 7 | Nylon 6 | +45° and −45° | 25 | 33 | DBP randomization |
| Example 11 | Production Example 8 | Nylon 6 | +45° and −45° | 25 | 49 | DBP randomization |
| Example 12 | Production Example 1 | Acid-modified PP | +30° and −30° | 25 | 33 | DBP randomization |
| Example 13 | Production Example 1 | Acid-modified PP | +60° and −60° | 25 | 33 | DBP randomization |
| Comparative Example 1 | Production Example 1 | Acid-modified PP | +45° only | 25 | 33 | DBP randomization |
| Comparative Example 2 | Production Example 1 | Acid-modified PP | +45° only | 25 | 33 | Method (I) |
| Comparative Example 10 | Production Example 6 | PP (unmodified) | +45° only | 25 | 33 | Method (I) |
| Comparative Example 3 | Production Example 6 | PP (unmodified) | +45° and −45° | 25 | 33 | Method (I) |
| Comparative Example 7 | Production Example 5 | Acid-modified PP | — | 25 | 49 | Method (II) |
| Comparative Example 8 | — | Acid-modified PP | — | 6 | 20 | Method (III) |
| Comparative Example 9 | — | Acid-modified PP | — | 6 | 30 | Method (III) |
| Comparative Example 11 | Production Example 1 | Acid-modified PP | +90° and −90° | 25 | 33 | DBP randomization |

| | Mechanical properties | | | | | Elliptic | |
| | Room temperature | | | | Degree of orientation | divergence coefficient | Dispersion parameter |
| | $\sigma_{RT}$ MPa | CV % | $\sigma_{80°C}/\sigma_{RT}$ % | $h_A/h_B$ Fold | D/K — | pf | ec (×10$^{-5}$) | dp |
|---|---|---|---|---|---|---|---|---|
| Example 1 | 353 | 5.4 | 61 | 1.5 | 1.14 | 0.03 | 6.2 | 94 |
| Example 7 | 393 | 6.0 | 63 | 1.4 | 1.10 | No data | No data | No data |
| Example 8 | 247 | 4.8 | 56 | 1.5 | 1.10 | No data | No data | 92 |
| Example 9 | 233 | 4.1 | 56 | 1.7 | 1.10 | No data | No data | 96 |
| Example 10 | 388 | 8.9 | 62 | 1.5 | 1.20 | No data | No data | 94 |
| Example 11 | 480 | 8.9 | 65 | 1.4 | 1.20 | No data | No data | No data |
| Example 12 | 351 | 5.1 | 60 | No data | 1.10 | No data | No data | No data |
| Example 13 | 332 | 5.8 | 63 | No data | 1.10 | No data | No data | No data |
| Comparative Example 1 | — | — | — | No data | 1.52 | No data | No data | No data |
| Comparative Example 2 | 290 | 5.9 | 48 | 2.8 | — | 0.04 | 9.4 | 75 |
| Comparative Example 10 | 231 | 8.1 | | | No data | | | |
| Comparative Example 3 | 225 | 6.3 | 47 | 2.7 | No data | 0.05 | 9.4 | 77 |
| Comparative Example 7 | 228 | 20.3 | 45 | 2.4 | No data | 0.36 | 8.5 | 72 |
| Comparative Example 8 | 270 | 7.1 | 59 | x | No data | 1.2 | 2.8 | 95 |
| Comparative Example 9 | 292 | 5.2 | 57 | x | No data | No data | No data | No data |
| Comparative Example 11 | 334 | 7.7 | 53 | No data | 1.04 | No data | No data | No data |

TABLE 2

| | Prepreg base material | | | Production | Mechanical properties | | |
|---|---|---|---|---|---|---|---|
| | Kind | Matrix resin | Fiber length mm | Volume fraction of fiber % | method of fiber-reinforced plastic | Room temperature $\sigma_{RT}$ MPa | CV % | $\sigma_{80°C}/\sigma_{RT}$ % |
| Example 2 | Production Example 1 | Acid-modified PP | 25 | 33 | DBP randomization | 322 | 4.9 | 57 |
| Example 10 | Production Example 7 | Nylon 6 | 25 | 33 | DBP randomization | 388 | 8.9 | 62 |
| Comparative Example 2 | Production Example 1 | Acid-modified PP | 25 | 33 | Method (I) | 290 | 5.9 | 48 |
| Comparative Example 7 | Production Example 5 | Acid-modified PP | 25 | 49 | Method (II) | 228 | 20.3 | 45 |
| Comparative Example 8 | — | Acid-modified PP | 6 | 20 | Method (III) | 270 | 7.1 | 59 |

| | Viscoelastic property | | | Degree of orientation pf | Elliptic divergence coefficient ec (×10$^{-5}$) | Dispersion parameter dp |
|---|---|---|---|---|---|---|
| | $h_A/h_B$ Fold | tanδ (ave) | tanδ (max) | | | |
| Example 2 | 1.5 | 0.123 | 0.382 | No data | No data | No data |
| Example 10 | 1.5 | 0.094 | 0.329 | No data | No data | No data |
| Comparative Example 2 | 2.8 | 0.655 | 0.612 | 0.04 | 9.4 | 75 |
| Comparative Example 7 | 2.4 | No data | No data | 0.36 | 8.5 | 72 |
| Comparative Example 8 | x | No data | No data | 1.2 | 2.8 | 95 |

TABLE 3

| | Prepreg base material | | | | | Production | Mechanical properties (after shaping) | | |
|---|---|---|---|---|---|---|---|---|---|
| | Kind | Matrix resin | Void fraction in prepreg % | Number of CF filaments Pieces | Volume fraction of fiber % | method of fiber-reinforced plastic | Room temperature $\sigma_{RT}$ MPa | CV % | $\sigma_{80°C}/\sigma_{RT}$ % |
| Example 3 | Production Example 2 | Acid-modified PP | 35 | 15000 | 33 | DBP randomization | 361 | 3.8 | 59 |
| Example 4 | Production Example 3 | Acid-modified PP | 35 | 50000 | 33 | DBP randomization | 360 | 4.7 | 58 |
| Example 14 | Production Example 9 | Nylon 6 | 35 | 50000 | 33 | DBP randomization | 402 | 4.0 | 65 |
| Comparative Example 4 | Production Example 2 | Acid-modified PP | 35 | 15000 | 33 | Method (I) | 198 | 11.2 | 58 |

| | Void fraction | | | Volume fraction of fiber and void content | | | |
|---|---|---|---|---|---|---|---|
| | $h_A/h_B$ Fold | Fiber-containing resin layer — | Fiber-free resin layer % | Vv (a) % | Vf (a) % | Vv (b) % | Vf (b) % |
| Example 3 | 1.8 | 1 | 16 | 10 | 30 | 11 | 29 |
| Example 4 | 1.9 | 1 | 20 | 9 | 31 | 10 | 30 |
| Example 14 | 1.7 | 1 | 20 | 9 | 31 | 10 | 30 |
| Comparative Example 4 | 3.0 | 35 | 3 | 18 | 28 | 31 | 20 |

INDUSTRIAL APPLICABILITY

The fiber-reinforced plastic of the invention can be molded in a short time since it exhibits excellent property to be shaped into a complicated three-dimensional shape such as ribs and bosses. In addition, the fiber reinforced plastic provides favorable mechanical properties, particularly an excellent bending strength to a structural material to be obtained after shaping. Furthermore, the variations in mechanical properties are small and isotropy and anisotropy of the mechanical properties can also be controlled.

Hence, the fiber-reinforced plastic is suitably used in aircraft members, automobile members, wind turbine members for wind power generation, and sports goods, and the like.

EXPLANATIONS OF LETTERS OR NUMERALS

11 Double belt hot press
12 and 12A Prepreg base material
13 Reinforcing fiber
14 Matrix resin
15 Cut (b)
16 Cut (c)
17 and 17A Region (B)
18 and 18A Region (C)
110 Press roll
112 Belt
114 IR heater
116 Hot water roll
118 Winding roll
120 Drive roll
122 Follower roll
124 Guide roll
1100 Material (A)
1110 Reinforcing fiber
1120 Fiber-reinforced plastic
X Direction orthogonal to moving direction of material (A)
Y Fiber axis direction of reinforcing fiber

The invention claimed is:

1. A method for producing a fiber-reinforced plastic, the method comprising:
   (i) obtaining a material (A) comprising the following prepreg base material;
   (ii) pressing the material (A) in a state of being heated to a temperature T equal to or higher than a melting point of a matrix resin or equal to or higher than a glass transition temperature of the matrix resin when the matrix resin does not have a melting point while moving the material (A) in one direction by setting angles formed by fiber axis directions of all reinforcing fibers with respect to a direction orthogonal to a moving direction of the material (A) to from −20° to 20° by using a pressing device which substantially uniformly presses the material (A) in the orthogonal direction; and
   (iii) cooling the material (A) pressed by the pressing device to obtain a fiber-reinforced plastic:
   wherein a prepreg base material in which a reinforcing fiber pulled and aligned in one direction is impregnated with a matrix resin and a cut is formed so as to intersect a fiber axis of the reinforcing fiber and
   a region in which a plurality of cuts to form an angle θ of 0°<θ<90° with the fiber axis of the reinforcing fiber are formed in a fiber axis direction of the reinforcing fiber and a region in which a plurality of cuts to form an angle θ of −90°<θ<0° with the fiber axis of the reinforcing fiber are formed in a fiber axis direction of the reinforcing fiber when anticlockwise rotation with respect to the fiber axis of the reinforcing fiber in a planar view is defined as a positive are alternately formed in a direction orthogonal to the fiber axis of the reinforcing fiber.

2. The method for producing a fiber-reinforced plastic according to claim 1, wherein a void fraction in a cross section obtained by cutting the prepreg base material in a thickness direction is from 5% to 75%.

3. The method for producing a fiber-reinforced plastic according to claim 1, wherein a material (A1) comprising a tow prepreg base material in which a reinforcing fiber tow having a plurality of tows having from 20,000 to 200,000 single fibers bundled pulled and aligned in one direction is impregnated with a matrix resin and a cut intersecting a fiber axis of the reinforcing fiber tow is formed as the prepreg base material is obtained in (i).

4. The method for producing a fiber-reinforced plastic according to claim 1, wherein a prepreg base material (X1) in which the reinforcing fiber is a carbon fiber (X) having a tensile modulus of elasticity of 350 GPa or more and a prepreg base material (Y1) in which the reinforcing fiber is a carbon fiber (Y) having a tensile modulus of elasticity of 200 GPa or more and less than 350 GPa are respectively formed as the prepreg base material and
   a laminate in which the prepreg base material (X1) is positioned on an outer side of the prepreg base material (Y1) in a thickness direction and fiber axis directions of the carbon fiber (X) and carbon fiber (Y) in the laminate are substantially the same is formed and used as a material (A2) in (i).

5. A method for producing a fiber-reinforced plastic, the method comprising:
   (i) obtaining a material (A) comprising a prepreg base material in which a reinforcing fiber pulled and aligned in one direction is impregnated with a matrix resin and a cut is formed so as to intersect a fiber axis of the reinforcing fiber and a region in which a plurality of cuts to form an angle θ of 0°<θ<90° with the fiber axis of the reinforcing fiber are formed in a fiber axis direction of the reinforcing fiber and a region in which a plurality of cuts to form an angle θ of −90°<θ<0° with the fiber axis of the reinforcing fiber are formed in a fiber axis direction of the reinforcing fiber when anticlockwise rotation with respect to the fiber axis of the reinforcing fiber in a planar view is defined as a positive are alternately formed in a direction orthogonal to the fiber axis of the reinforcing fiber;
   (ii) pressing the material (A) in a state of being heated to a temperature T equal to or higher than a melting point of a matrix resin or equal to or higher than a glass transition temperature of the matrix resin when the matrix resin does not have a melting point while moving the material (A) in one direction by setting angles formed by fiber axis directions of all reinforcing fibers with respect to a direction orthogonal to a moving direction of the material (A) to from −20° to 20° by using a pressing device which substantially uniformly presses the material (A) in the orthogonal direction; and
   (iii) cooling the material (A) pressed by the pressing device to obtain a fiber-reinforced plastic, wherein
   a fiber-reinforced plastic (X2) is formed by performing (i) to (iii) by using a material (A-X) comprising a prepreg base material (X1) in which the reinforcing fiber is a carbon fiber (X) having a tensile modulus of elasticity of 350 GPa or more as the material (A),
   a fiber-reinforced plastic (Y2) is formed by performing (i) to (iii) by using a material (A-Y) comprising a prepreg base material (Y1) in which the reinforcing fiber is a carbon fiber (Y) having a tensile modulus of elasticity of 200 GPa or more and less than 350 GPa as the material (A), and the fiber-reinforced plastic (X2) and fiber-reinforced plastic (Y2) thus obtained are integrated so that an outermost fiber-reinforced plastic is the fiber-reinforced plastic (X2).

6. A fiber-reinforced plastic comprising:
reinforcing fibers having an average fiber length of from 1 to 100 mm; and
a matrix resin, wherein
a wound diameter D (m) when the fiber-reinforced plastic is wound around a core material having a diameter of 0.091 m at a winding torque of 40 N·m by a length of 10 m satisfies a condition of the following Equation (a1):

$$1.0 < \frac{D}{\sqrt{\frac{4LW}{\pi\rho} + d^2}} < 1.5 \quad \text{(a1)}$$

where symbols in Equation (a1) have the following meanings:
d: diameter (m) of core material,
W: weight per unit area (g/m$^2$) of fiber-reinforced plastic,
p: true density (g/m$^3$) of fiber-reinforced plastic, and
L: wound length (m) of fiber-reinforced plastic.

7. A fiber-reinforced plastic comprising:
a reinforcing fiber; and
a matrix resin, wherein
an average fiber length of the reinforcing fibers is from 1 to 100 mm, and
tan δ (ave) is from 0.01 to 0.25 and tan δ (max)—tan δ (ave) is 0.15 or more when an average value of viscoelastic property tan δ of the fiber-reinforced plastic in a temperature range of from T−30° C. to T−10° C., where T is a melting point of the matrix resin or a glass transition temperature of the matrix resin when the matrix resin does not have a melting point, expressed by the following Equation (1) is defined as tan δ (ave) and a maximum value of the viscoelastic property tan δ in a temperature range of from T−10° C. to T+10° C. is defined as tan δ (max):

$$\tan \delta = G''/G' \quad \text{(1)}$$

where symbols in Equation (1) have the following meanings:
G'': loss modulus of elasticity, and
G': storage modulus of elasticity.

8. A fiber-reinforced plastic comprising:
a reinforcing fiber; and
a matrix resin, wherein
a fiber-containing resin layer comprising both the reinforcing fiber and the matrix resin and a fiber-free resin layer which does not contain the reinforcing fiber but contains the matrix resin form a layer structure in a thickness direction, and
a void fraction in the fiber-containing resin layer is less than 4% and a void fraction in the fiber-free resin layer is 4% or more and less than 40%.

9. A fiber-reinforced plastic comprising:
a reinforcing fiber; and
a matrix resin, wherein
a volume fraction Vf (a) of fiber and a void content Vv (a) in the fiber-reinforced plastic and a volume fraction Vf (b) of fiber and void content Vv (b) in a cross section obtained by cutting the fiber-reinforced plastic in a thickness direction satisfy the following Equation (c1) and the following Equation (c2):

$$Vf (a)-3(\%)<Vf (b)<Vf (a)<70(\%) \ldots \quad \text{(c1)}$$

$$2(\%)<Vv (b)-3(\%)<Vv (a)<Vv (b) \ldots \quad \text{(c2).}$$

10. The fiber-reinforced plastic according to claim 6, wherein
carbon fibers having an average fiber length of from 5 to 100 mm are randomly disposed as the reinforcing fiber,
the carbon fiber comprises a carbon fiber (X) having a tensile modulus of elasticity of 350 GPa or more and a carbon fiber (Y) having a tensile modulus of elasticity of 200 GPa or more and less than 350 GPa, and
the carbon fiber (X) is locally present in the surface layer.

11. The fiber-reinforced plastic according to claim 10, comprising a layer comprising only the carbon fiber (X) and a layer comprising the carbon fiber (X) and the carbon fiber (Y).

12. The fiber-reinforced plastic according to claim 11, further comprising a layer comprising only the carbon fiber (Y).

13. The fiber-reinforced plastic according to claim 6, wherein a degree of orientation pf of the reinforcing fiber in a direction perpendicular to a thickness direction is from 0.001 to 0.8.

14. The fiber-reinforced plastic according to claim 6, wherein an elliptic divergence coefficient ec in an orientation profile of the reinforcing fiber on a plane perpendicular to a thickness direction is from $1\times10^{-5}$ to $9\times10^{-5}$.

15. The fiber-reinforced plastic according to claim 6, wherein a dispersion parameter dp of the reinforcing fiber is from 100 to 80 in a cross section in a thickness direction.

16. The fiber-reinforced plastic according to claim 6, wherein the matrix resin is a thermoplastic resin.

17. The fiber-reinforced plastic according to claim 6, wherein a volume fraction of the reinforcing fiber is from 5% to 70% by volume.

18. The fiber-reinforced plastic according to claim 6, wherein an average fiber length of the reinforcing fibers is from 10 to 50 mm.

* * * * *